United States Patent
Davies et al.

(10) Patent No.: US 7,334,064 B2
(45) Date of Patent: Feb. 19, 2008

(54) APPLICATION SERVER BLADE FOR EMBEDDED STORAGE APPLIANCE

(75) Inventors: Ian Robert Davies, Longmont, CO (US); George Alexander Kalwitz, Mead, CO (US); Victor Key Pecone, Lyons, CO (US)

(73) Assignee: Dot Hill Systems Corporation, Carlsbad, CA (US)

( * ) Notice: Subject to any disclaimer, the term of this patent is extended or adjusted under 35 U.S.C. 154(b) by 398 days.

(21) Appl. No.: 10/831,690

(22) Filed: Apr. 23, 2004

(65) Prior Publication Data

US 2005/0010709 A1    Jan. 13, 2005

Related U.S. Application Data

(60) Provisional application No. 60/554,052, filed on Mar. 17, 2004, provisional application No. 60/473,355, filed on Apr. 23, 2003.

(51) Int. Cl.
*G06F 13/12*    (2006.01)
(52) U.S. Cl. .......................................... 710/62; 710/74
(58) Field of Classification Search ...................... None
See application file for complete search history.

(56) References Cited

U.S. PATENT DOCUMENTS

| | | |
|---|---|---|
| 4,159,516 A | 6/1979 | Henrion et al. |
| 4,245,344 A | 1/1981 | Richter |
| 4,275,458 A | 6/1981 | Khera |
| 5,175,849 A | 12/1992 | Schneider |
| 5,274,645 A | 12/1993 | Idleman et al. |
| 5,546,272 A | 8/1996 | Moss et al. |
| 5,590,381 A | 12/1996 | Mourad |

(Continued)

FOREIGN PATENT DOCUMENTS

WO     WO02101573     12/2002

(Continued)

OTHER PUBLICATIONS

"Bus Bandwidth"—http://www.pcguide.com/ref/mbsys/buses/funcBandwidth-c.html Apr. 17, 2001.*

(Continued)

*Primary Examiner*—Alford Kindred
*Assistant Examiner*—David Martinez
(74) *Attorney, Agent, or Firm*—E. Alan Davis; James W. Huffman

(57) ABSTRACT

An application server blade for an embedded storage appliance is disclosed. The blade includes a printed circuit board (PCB) with a connector for connecting to a chassis backplane including a local bus. Affixed on the PCB is a server, a portion of a storage controller, and an I/O link coupling the server and storage controller portion. The server transmits packets on the I/O link to the storage controller portion. The packets include commands to transfer data to a storage device controlled by the storage controller. The storage controller portion receives the packets from the server on the I/O link and forwards the commands on the backplane local bus to another portion of the storage controller affixed on a separate PCB also enclosed in the chassis. The blade also includes a removal mechanism for hot-replacement of the blade in the chassis. The blade architecture facilitates software reuse.

35 Claims, 25 Drawing Sheets

U.S. PATENT DOCUMENTS

| | | | |
|---|---|---|---|
| 5,594,900 A | 1/1997 | Cohn et al. | |
| 5,790,775 A | 8/1998 | Marks et al. | |
| 5,884,098 A | 3/1999 | Mason, Jr. | |
| 5,986,880 A | 11/1999 | Santeler et al. | |
| 6,134,673 A | 10/2000 | Chrabaszcz | |
| 6,272,591 B2 | 8/2001 | Grun | |
| 6,289,376 B1 | 9/2001 | Taylor et al. | |
| 6,389,432 B1 | 5/2002 | Pothapragada et al. | |
| 6,526,477 B1 | 2/2003 | Yuan et al. | |
| 6,609,213 B1 | 8/2003 | Nguyen et al. | |
| 6,654,831 B1 | 11/2003 | Otterness et al. | |
| 6,658,504 B1 | 12/2003 | Lieber et al. | |
| 6,691,184 B2 | 2/2004 | Odenwald et al. | |
| 6,715,098 B2 | 3/2004 | Chen et al. | |
| 6,728,781 B1 | 4/2004 | Aguilera et al. | |
| 6,826,714 B2 | 11/2004 | Coffey et al. | |
| 6,839,788 B2 | 1/2005 | Pecone | |
| 6,854,069 B2 | 2/2005 | Kampe et al. | |
| 6,874,103 B2 | 3/2005 | Cepulis | |
| 6,883,065 B1 | 4/2005 | Pittelkow et al. | |
| 6,895,467 B2 | 5/2005 | Lubbers et al. | |
| 6,971,016 B1* | 11/2005 | Barnett | 713/182 |
| 6,983,396 B2 | 1/2006 | Brant et al. | |
| 6,990,547 B2 | 1/2006 | Ulrich et al. | |
| 7,076,555 B1 | 7/2006 | Orman et al. | |
| 7,127,633 B1 | 10/2006 | Olson et al. | |
| 7,246,256 B2 | 7/2007 | De La Cruz et al. | |
| 2001/0009014 A1 | 7/2001 | Savage et al. | |
| 2002/0010881 A1 | 1/2002 | White | |
| 2002/0049924 A1 | 4/2002 | Kato | |
| 2002/0124128 A1* | 9/2002 | Qiu | 710/302 |
| 2002/0159311 A1 | 10/2002 | Coffey et al. | |
| 2003/0007339 A1* | 1/2003 | Harris et al. | 361/788 |
| 2003/0014684 A1 | 1/2003 | Kashyap | |
| 2003/0018927 A1 | 1/2003 | Gadir et al. | |
| 2003/0048613 A1* | 3/2003 | Garnett et al. | 361/724 |
| 2003/0065733 A1 | 4/2003 | Pecone | |
| 2003/0065836 A1 | 4/2003 | Pecone | |
| 2003/0065841 A1 | 4/2003 | Pecone | |
| 2003/0099254 A1* | 5/2003 | Richter | 370/466 |
| 2003/0112582 A1 | 6/2003 | Sanders et al. | |
| 2003/0115010 A1* | 6/2003 | Estep | 702/127 |
| 2003/0140270 A1 | 7/2003 | Lehmann | |
| 2003/0154279 A1* | 8/2003 | Aziz | 709/225 |
| 2003/0233595 A1 | 12/2003 | Charny et al. | |
| 2003/0236880 A1 | 12/2003 | Srivastava et al. | |
| 2004/0066246 A1* | 4/2004 | Cherniski et al. | 333/12 |
| 2004/0073816 A1 | 4/2004 | Hansen | |
| 2004/0111559 A1 | 6/2004 | Heil | |
| 2004/0148380 A1 | 7/2004 | Meyer et al. | |
| 2004/0168008 A1 | 8/2004 | Benson et al. | |
| 2004/0230660 A1 | 11/2004 | Abjanic et al. | |
| 2004/0268175 A1 | 12/2004 | Koch et al. | |
| 2005/0010709 A1 | 1/2005 | Davies et al. | |
| 2005/0010715 A1 | 1/2005 | Davies et al. | |
| 2005/0010838 A1 | 1/2005 | Davies et al. | |
| 2005/0021605 A1 | 1/2005 | Davies et al. | |
| 2005/0021606 A1 | 1/2005 | Davies et al. | |
| 2005/0027751 A1 | 2/2005 | Davies et al. | |
| 2005/0102549 A1 | 5/2005 | Davies et al. | |

FOREIGN PATENT DOCUMENTS

| | | |
|---|---|---|
| WO | WO2004095304 | 11/2004 |

OTHER PUBLICATIONS

Wikipedia's Local Area Network.
Wikipedia's "Ethernet".
Wikipedia's "SCSI". Revision from Apr. 17, 2003.
Wikipedia's "Infiniband". Revision from Mar. 9, 2003.
"M-Systems Raises Top Capacity of DiskOnCHip to 1 Gigabyte." Embedded Star Article from Jun. 18, 2002.
Wikipedia's "Magnetic Tape". Revision from Mar. 21, 2003.
Asthana et al. "Kaleido: An Integrated Architecture for Interactive Multimedia Systems." from Sixth IEEE Internation Symposium of High Performance Distributed Computing. 1997 Proceedings.
Wikipedia's "CompactPCI".
PCI-X Addendum to the PCI Local Bus Specification. Revision 1.0 from Sep. 22, 1999.
T. Okano. "Future Trends of BladeServer: Virtualization and Optimization." NEC Journal of Advanced Technology (online) vol. 1, No. 2, Jun. 20, 2004.
J. Regula. "Using PCI Express and Non-transparent Bridging in Blade Servers." Blade Letter (online) Mar. 2004 p. 12.
Farid Neema. "Network Attached Storage Servers Take Storage-Centric Tiger by the Tail." *Computer Technology Review.* Westworld Production, Beverly Hills, CA, US. vol. SUPPL, Sep. 21, 1997, pp. 26, 28-31 XP000720428 ISSN: 0278-9647 the whole document.
*RIO DISK Storage Subsystem.* 04.03v04;2003.Chapparral Network Storage, Inc. 7420 East Dry Creek Parkway, Longmont, CO 80503.
*RIO RAID External RAID Controller.* 2002. Chapparral Network Storage, Inc. 7420 East Dry Creek Parkway, Longmont, CO 80503.
http://www.chaparralnet.com/part/sales_marketing_resources/RIO_RAID_datasheet_scn.pdf.
http://www.chaparralnet.com/part/sales_markeitng_resources/CNS-RIODISK-0403v04-scn.pdf.
Wikipedia's "Blade Server" retrieved Apr. 23, 2007.
Wikipedia's "RAID" retrieved Apr. 24, 2007.
Wikipedia's "PCI-X" retrieved Sep. 28, 2007. http://en.wikipedia.org/wiki/PCIX.

* cited by examiner

Storage Appliance Data Paths

APPLICATION SERVER BLADE FOR EMBEDDED STORAGE APPLIANCE

CROSS REFERENCE TO RELATED APPLICATION(S)

This application claims the benefit of the following U.S. Provisional Application(s) which are incorporated herein by reference for all intents and purposes:

| Ser. No. | Filing Date | Title |
| --- | --- | --- |
| 60/473355 | Apr. 23, 2003 | LIBERTY APPLICATION BLADE |
| 60/554052 | Mar. 17, 2004 | LIBERTY APPLICATION BLADE |

This application is related to the following co-pending U.S. Patent Applications, all of which are being filed on the same day, and all having a common assignee and common inventors:

| Ser. No. | Filing Date | Title |
| --- | --- | --- |
| 10/831,689 | Apr. 23, 2004 | NETWORK STORAGE APPLIANCE WITH INTEGRATED REDUNDANT SERVERS AND STORAGE CONTROLLERS |
| 10/830,876 | Apr. 23, 2004 | NETWORK, STORAGE APPLIANCE, AND METHOD FOR EXTERNALIZING AN INTERNAL I/O LINK BETWEEN A SERVER AND A STORAGE CONTROLLER INTEGRATED WITHIN THE STORAGE APPLIANCE CHASSIS |
| 10/831,688 | Apr. 23, 2004 | APPARATUS AND METHOD FOR STORAGE CONTROLLER TO DETERMINISTICALLY KILL ONE OF REDUNDANT SERVERS INTEGRATED WITHIN THE STORAGE CONTROLLED CHASSIS |
| 10/830,875 | Apr. 23, 2004 | APPARATUS AND METHOD FOR DETERMINISTICALLY PERFORMING ACTIVE-ACTIVE FAILOVER OF REDUNDANT SERVERS IN RESPONSE TO A HEARTBEAT LINK FAILURE |
| 10/831,661 | Apr. 23, 2004 | NETWORK STORAGE APPLIANCE WITH INTEGRATED SERVER AND REDUNDANT STORAGE CONTROLLERS |

FIELD OF THE INVENTION

This invention relates in general to the field of network storage in a computer network and particularly to the integration of server computers into a network storage appliance.

BACKGROUND OF THE INVENTION

Historically, computer systems have each included their own storage within the computer system enclosure, or chassis, or "box." A typical computer system included a hard disk, such as an IDE or SCSI disk, directly attached to a disk controller, which was in turn connected to the motherboard by a local bus. This model is commonly referred to as direct attached storage (DAS).

However, this model has certain disadvantages in an enterprise, such as a business or university, in which many computers are networked together, each having its own DAS. One potential disadvantage is the inefficient use of the storage devices. Each computer may only use a relatively small percentage of the space on its disk drive with the remainder of the space being wasted. A second potential disadvantage is the difficulty of managing the storage devices for the potentially many computers in the network. A third potential disadvantage is that the DAS model does not facilitate applications in which the various users of the network need to access a common large set of data, such as a database. These disadvantages, among others, have caused a trend toward more centralized, shared storage in computer networks.

Initially the solution was to employ centralized servers, such as file servers, which included large amounts of storage shared by the various workstations in the network. That is, each server had its own DAS that was shared by the other computers in the network. The centralized server DAS could be managed more easily by network administrators since it presented a single set of storage to manage, rather than many smaller storage sets on each of the individual workstations. Additionally, the network administrators could monitor the amount of storage space needed and incrementally add storage devices on the server DAS on an as-needed basis, thereby more efficiently using storage device space. Furthermore, because the data was centralized, all the users of the network who needed to access a database, for example, could do so without overloading one user's computer.

However, a concurrent trend was toward a proliferation of servers. Today, many enterprises include multiple servers, such as a file server, a print server, an email server, a web server, a database server, etc., and potentially multiple of each of these types of servers. Consequently, the same types of problems that existed with the workstation DAS model existed again with the server DAS model.

Network attached storage (NAS) and storage area network (SAN) models were developed to address this problem. In a NAS/SAN model, a storage controller that controls storage devices (typically representing a large amount of storage) exists as a distinct entity on a network, such as an Ethernet or FibreChannel network, that is accessed by each of the servers in the enterprise. That is, the servers share the storage controlled by the storage controller over the network. In the NAS model, the storage controller presents the storage at a filesystem level, whereas in the SAN model, the storage controller presents the storage at a block level, such as in the SCSI block level protocol. The NAS/SAN model provides similar solutions to the fileserver DAS model problems that the fileserver DAS model provided to the workstation DAS problems. In the NAS/SAN model, the storage controllers have their own enclosures, or chassis, or boxes, discrete from the server boxes. Each chassis provides its own power and cooling, and since the chassis are discrete, they require networking cables to connect them, such as Ethernet or FibreChannel cables.

Another recent trend is toward storage application servers. In a common NAS/SAN model, one or more storage application servers resides in the network between the storage controller and the other servers, and executes storage software applications that provided value-added storage functions that benefit all of the servers accessing the common storage controller. These storage applications are also commonly referred to as "middleware." Examples of middleware include data backup, remote mirroring, data snapshot, storage virtualization, data replication, hierarchical storage management (HSM), data content caching, data storage provisioning, and file service applications. The storage application servers provide a valuable function; however, they introduce yet another set of discrete separately powered and cooled boxes that must be managed, require additional space and cost, and introduce additional cabling in the network.

Therefore, what is needed is a way to improve the reliability and manageability and reduce the cost and physical space of a NAS/SAN system. It is also desirable to obtain these improvements in a manner that capitalizes on the use of existing software to minimize the amount of software development necessary, thereby achieving improved time to market and a reduction in development cost and resources.

SUMMARY OF THE INVENTION

In one aspect, the present invention provides a server blade. The server blade includes a computer having an input/output (I/O) port. The server blade also includes an I/O interface controller. The I/O interface controller includes an I/O port coupled via an I/O link to the I/O port of the computer, for transferring data therewith. The I/O interface controller also includes a local bus interface, for interfacing to a local bus. The server blade comprises a field replaceable unit (FRU) including the computer and the I/O interface controller, configured to plug into a backplane comprising the local bus, thereby enabling data transfers with other FRUs coupled to the backplane. The I/O interface controller comprises a portion of a storage controller whose remaining portions are comprised in the other FRUs coupled to the backplane. The I/O interface controller is programmable via the local bus by a microprocessor of the storage controller to perform data transfers between the computer and storage devices controlled by the storage controller. At least one of the other FRUs comprises the microprocessor.

An advantage of the present invention is that it facilitates software reuse, thereby potentially reducing software development time and cost. In one aspect, having the server and storage controller communicate via the I/O link (rather than via a local bus, for example) even though they are in the same chassis, and particularly the portion of the storage controller that communicates with the server being on the same blade as the server, causes the storage controller to retain its stand-alone nature. Consequently, device drivers for stand-alone storage controllers, such as FibreChannel SCSI or iSCSI drivers, that already exist, or require minor modification, may be executed by the server to communicate with the storage controller rather than having to develop new device drivers. Furthermore, the stand-along nature of the storage controller provides operating system independence and interoperability advantages. Still further, the presence of the I/O link enables the I/O link to be externalized, thereby enabling other servers outside the chassis to access the storage controller in addition to the server inside the chassis accessing the storage controller. In another aspect, the firmware of the storage controller may require relatively small modifications since the portion of the storage controller on the server blade is similar to existing architectures, and communicates via the local bus comprised in the backplane connecting the server blade and the other portions of the storage controller. In another aspect, because the server substantially conforms to a standard server architecture, such as an x86 PC architecture with standard peripheral mappings, operating systems may be ported to the server with a relatively small software development effort, and storage application software may execute on the server with little or no software development required.

DETAILED DESCRIPTION

Figure 1:
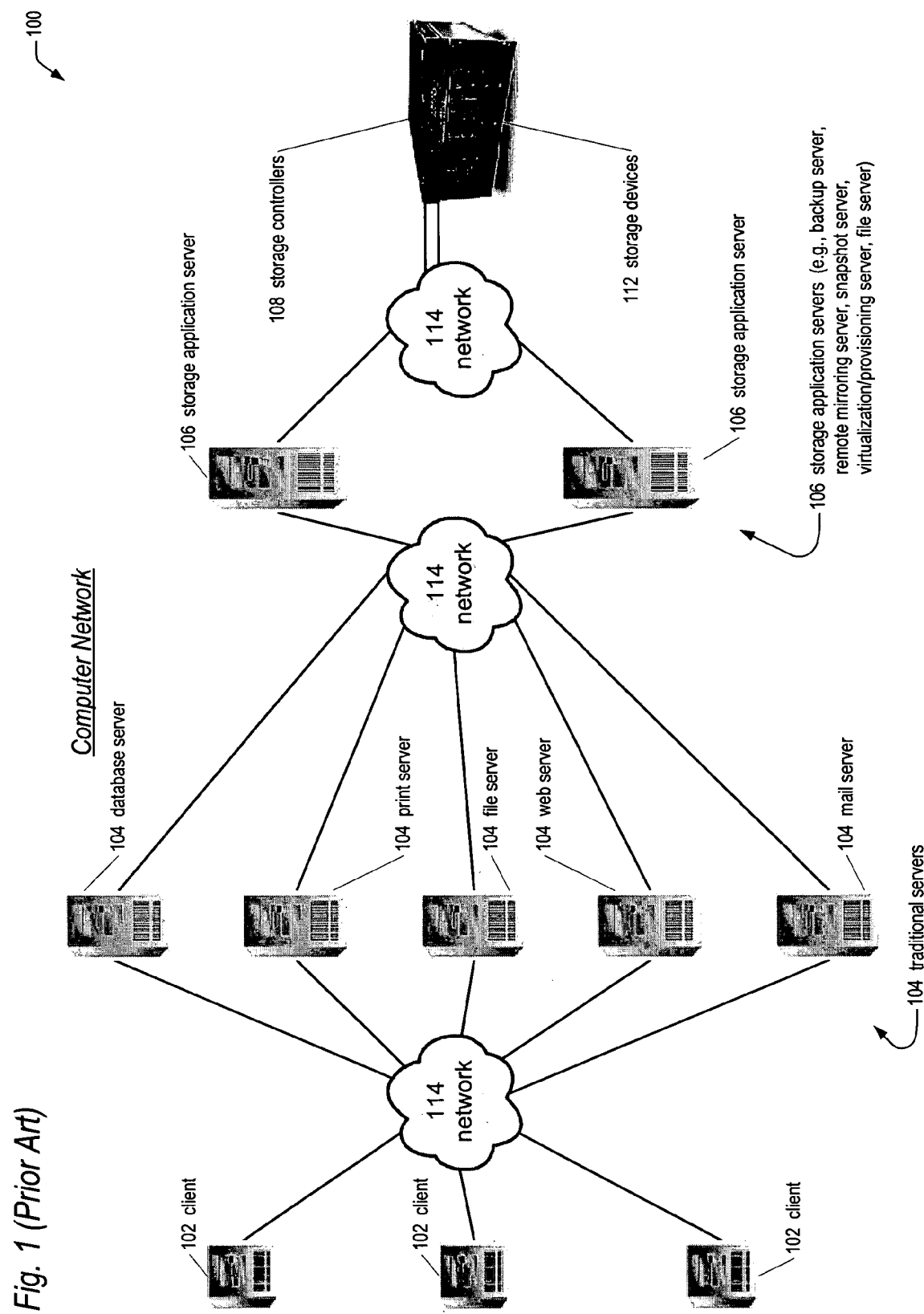
FIG. 1 is a diagram of a prior art computer network.

Referring now to FIG. 1, a diagram of a prior art computer network 100 is shown. The computer network 100 includes a plurality of client computers 102 coupled to a plurality of traditional server computers 104 via a network 114. The network 114 components may include switches, hubs, routers, and the like. The computer network 100 also includes a plurality of storage application servers 106 coupled to the traditional servers 104 via the network 114. The computer network 100 also includes one or more storage controllers 108 coupled to the storage application servers 106 via the network 114. The computer network 100 also includes storage devices 112 coupled to the storage controllers 108.

The clients 102 may include, but are not limited to workstations, personal computers, notebook computers, or personal digital assistants (PDAs), and the like. Typically, the clients 102 are used by end users to perform computing tasks, including but not limited to, word processing, database access, data entry, email access, internet access, spreadsheet access, graphic development, scientific calculations, or any other computing tasks commonly performed by users of computing systems. The clients 102 may also include a computer used by a system administrator to administer the various manageable elements of the network 100. The clients 102 may or may not include direct attached storage (DAS), such as a hard disk drive.

Portions of the network 114 may include, but are not limited to, links, switches, routers, hubs, directors, etc. performing the following protocols: FibreChannel (FC), Ethernet, Infiniband, TCP/IP, Small Computer Systems Interface (SCSI), HIPPI, Token Ring, Arcnet, FDDI, LocalTalk, ESCON, FICON, ATM, Serial Attached SCSI (SAS), Serial Advanced Technology Attachment (SATA), and the like, and relevant combinations thereof.

The traditional servers 104 may include, but are not limited to file servers, print servers, enterprise servers, mail servers, web servers, database servers, departmental servers, and the like. Typically, the traditional servers 104 are accessed by the clients 102 via the network 114 to access shared files, shared databases, shared printers, email, the internet, or other computing services provided by the traditional servers 104. The traditional servers 104 may or may not include direct attached storage (DAS), such as a hard disk drive. However, at least a portion of the storage utilized by the traditional servers 104 comprises detached storage provided on the storage devices 112 controlled by the storage controllers 108.

The storage devices 112 may include, but are not limited to, disk drives, tape drives, or optical drives. The storage devices 112 may be grouped by the storage application servers 106 and/or storage controllers 108 into logical storage devices using any of well-known methods for grouping physical storage devices, including but not limited to mirroring, striping, or other redundant array of inexpensive disks (RAID) methods. The logical storage devices may also comprise a portion of a single physical storage device or a portion of a grouping of storage devices.

The storage controllers 108 may include, but are not limited to, a redundant array of inexpensive disks (RAID) controller. The storage controllers 108 control the storage devices 112 and interface with the storage application servers 106 via the network 114 to provide storage for the traditional servers 104.

The storage application servers 106 comprise computers capable of executing storage application software, such as data backup, remote mirroring, data snapshot, storage virtualization, data replication, hierarchical storage management (HSM), data content caching, data storage provisioning, and file service applications.

As may be observed from FIG. 1, in the prior art computer network 100 the storage application servers 106 are physically discrete from the storage controllers 108. That is, they reside in physically discrete enclosures, or chassis. Consequently, network cables must be run externally between the two or more chassis to connect the storage controllers 108 and the storage application servers 106. This exposes the external cables for potential damage, for example by network administrators, thereby jeopardizing the reliability of the computer network 100. Also, the cabling may be complex, and therefore prone to be connected incorrectly by users. Additionally, there is cost and space associated with each chassis of the storage controllers 108 and the storage application servers 106, and each chassis must typically include its own separate cooling and power system. Furthermore, the discrete storage controllers 108 and storage application servers 106 constitute discrete entities to be configured and managed by network administrators. However, many of these disadvantages are overcome by the presently disclosed network storage appliance of the present invention, as will now be described.

Figure 2:
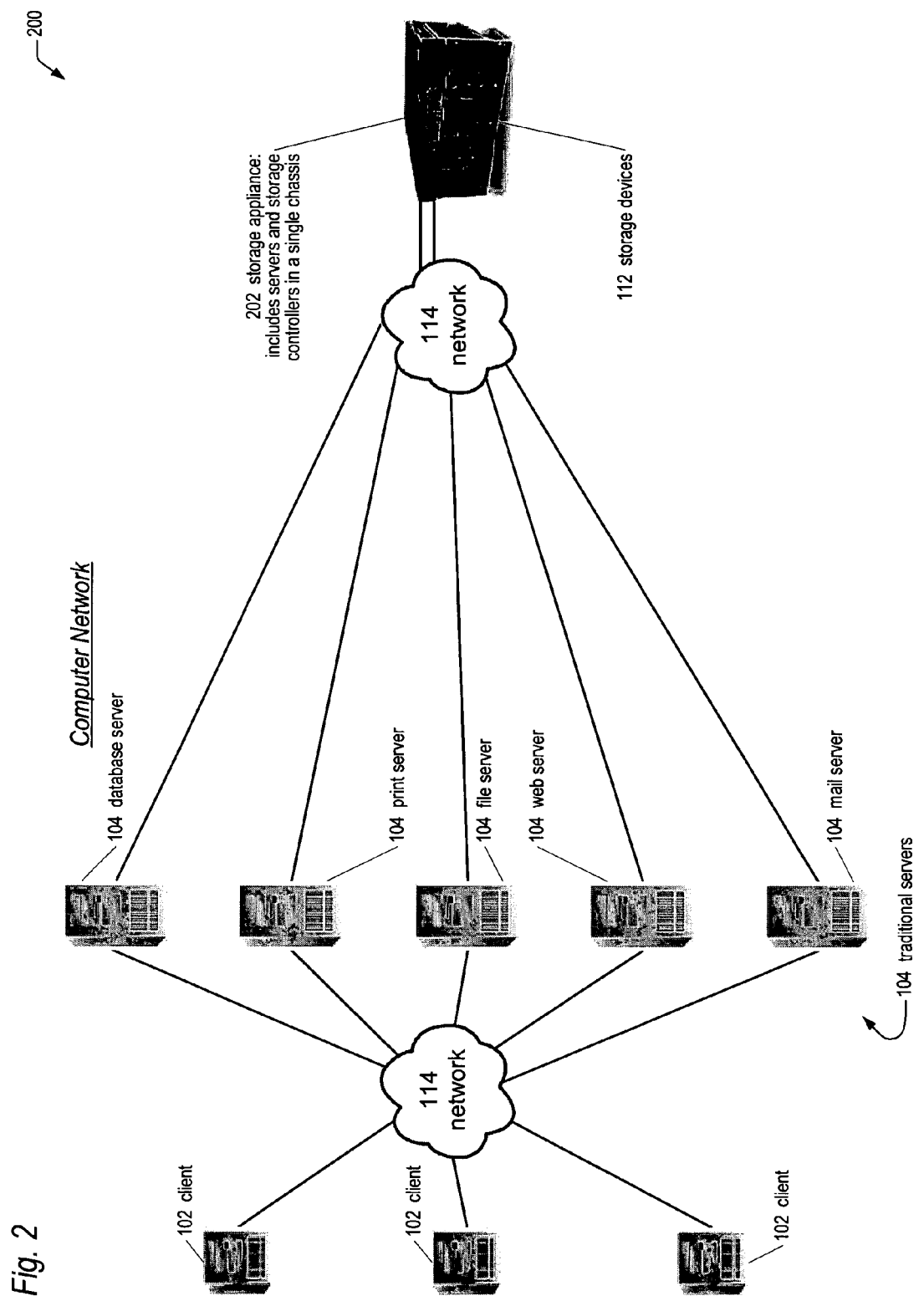
FIG. 2 is a diagram of a computer network according to the present invention.

Referring now to FIG. 2, a diagram of a computer network 200 according to the present invention is shown. In one embodiment, the clients 102, traditional servers 104, storage devices 112, and network 114 are similar to like-numbered elements of FIG. 1. The computer network 200 of FIG. 2 includes a network storage appliance 202, which integrates storage application servers and storage controllers in a single chassis. The storage appliance 202 is coupled to the traditional servers 104 via the network 114, as shown, to provide detached storage, such as storage area network (SAN) storage or network attached storage (NAS), for the traditional servers 104 by controlling the storage devices 112 coupled to the storage appliance 202. Advantageously, the storage appliance 202 provides the traditional servers 104 with two interfaces to the detached storage: one directly to the storage controllers within the storage appliance 202, and another to the servers integrated into the storage appliance 202 chassis, which in turn directly access the storage controllers via internal high speed I/O links within the storage appliance 202 chassis. In one embodiment, the servers and storage controllers in the storage appliance 202 comprise redundant hot-replaceable field replaceable units (FRUs), thereby providing fault-tolerance and high data availability. That is, one of the redundant FRUs may be replaced during operation of the storage appliance 202 without loss of availability of the data stored on the storage devices 112. However, single storage controller and single server embodiments are also contemplated. Advantageously, the integration of the storage application servers into a single chassis with the storage controllers provides the potential for improved manageability, lower cost, less space, better diagnosability, and better cabling for improved reliability.

Figure 3:
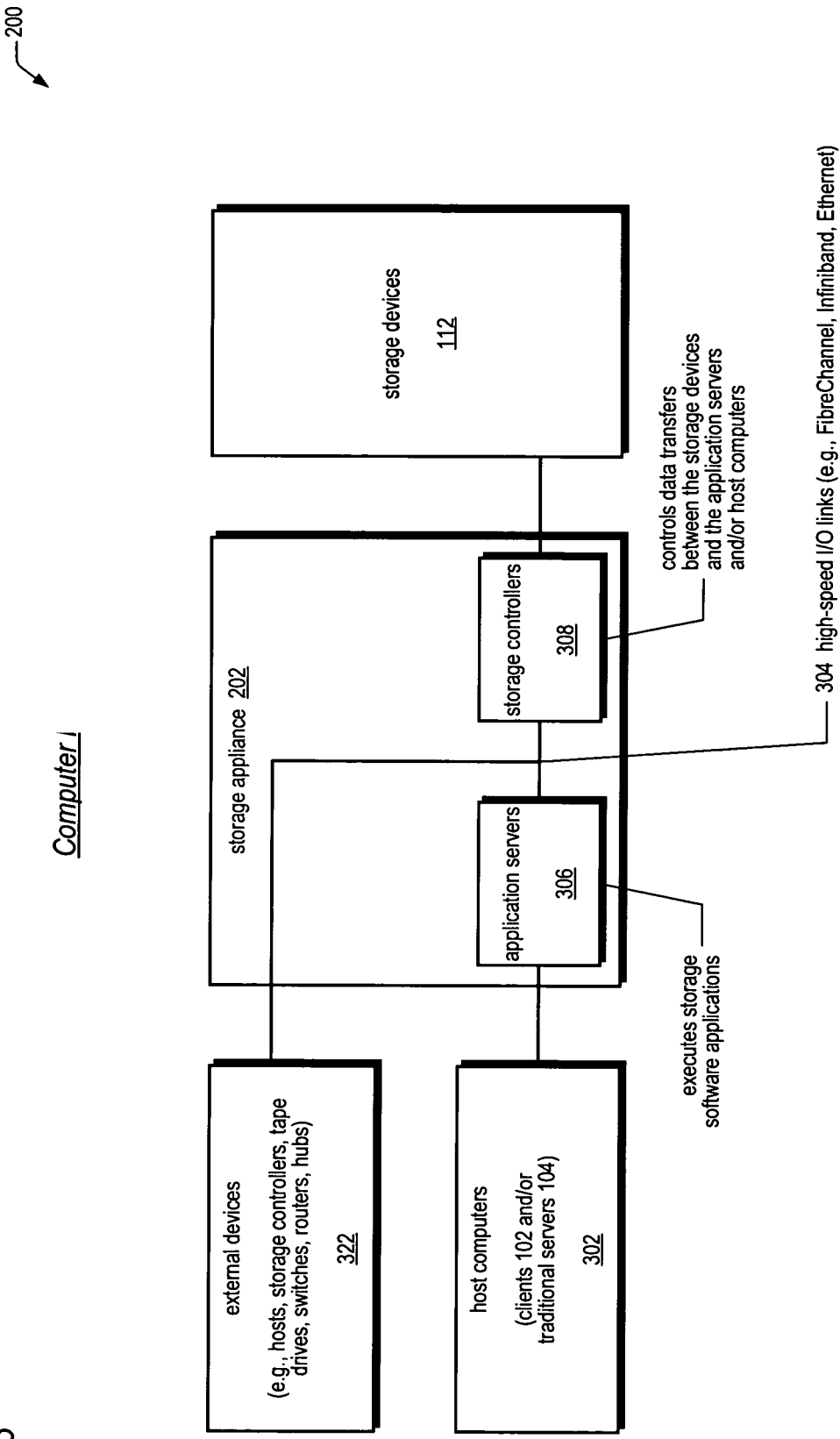
FIG. 3 is a block diagram illustrating the computer network of FIG. 2 including the storage appliance of FIG. 2.

Referring now to FIG. 3, a block diagram illustrating the computer network 200 of FIG. 2 including the storage appliance 202 of FIG. 2 is shown. The computer network 200 includes the clients 102 and/or traditional servers 104 of FIG. 2, referred to collectively as host computers 302, networked to the storage appliance 202. The computer network 200 also includes external devices 322 networked to the storage appliance 202, i.e., devices external to the storage appliance 202. The external devices 322 may include, but are not limited to, host computers, tape drives or other backup type devices, storage controllers or storage appliances, switches, routers, or hubs. The computer network 200 also includes the storage devices 112 of FIG. 2 coupled to the storage appliance 202. The storage appliance 202 includes application servers 306 coupled to storage controllers 308. The host computers 302 are coupled to the application servers 306, and the storage devices 112 are coupled to the storage controllers 308. In one embodiment, the application servers 306 are coupled to the storage controllers 308 via high speed I/O links 304, such as FibreChannel, Infiniband, or Ethernet links, as described below in detail. The high speed I/O links 304 are also provided by the storage appliance 202 external to its chassis 414 (of FIG. 4) via port combiners 842 (shown in FIG. 8) and expansion I/O connectors 754 (shown in FIG. 7) to which the external devices 1232 are coupled. The externalizing of the I/O links 304 advantageously enables the storage controllers 308 to be directly accessed by other external network devices 322, such as the host computers, switches, routers, or hubs. Additionally, the externalizing of the I/O links 304 advantageously enables the application servers 306 to directly access other external storage devices 322, such as tape drives, storage controllers, or other storage appliances, as discussed below.

The application servers 306 execute storage software applications, such as those described above that are executed by the storage application servers 106 of FIG. 1. However, other embodiments are contemplated in which the application servers 306 execute software applications such as those described above that are executed by the traditional servers 104 of FIG. 1. In these embodiments, the hosts 302 may comprise clients 102 such as those of FIG. 2 networked to the storage appliance 202. The storage controllers 308 control the storage devices 112 and interface with the application servers 306 to provide storage for the host computers 302 and to perform data transfers between the storage devices 112 and the application servers 306 and/or host computers 302. The storage controllers 308 may include, but are not limited to, redundant array of inexpensive disks (RAID) controllers.

Figure 4:
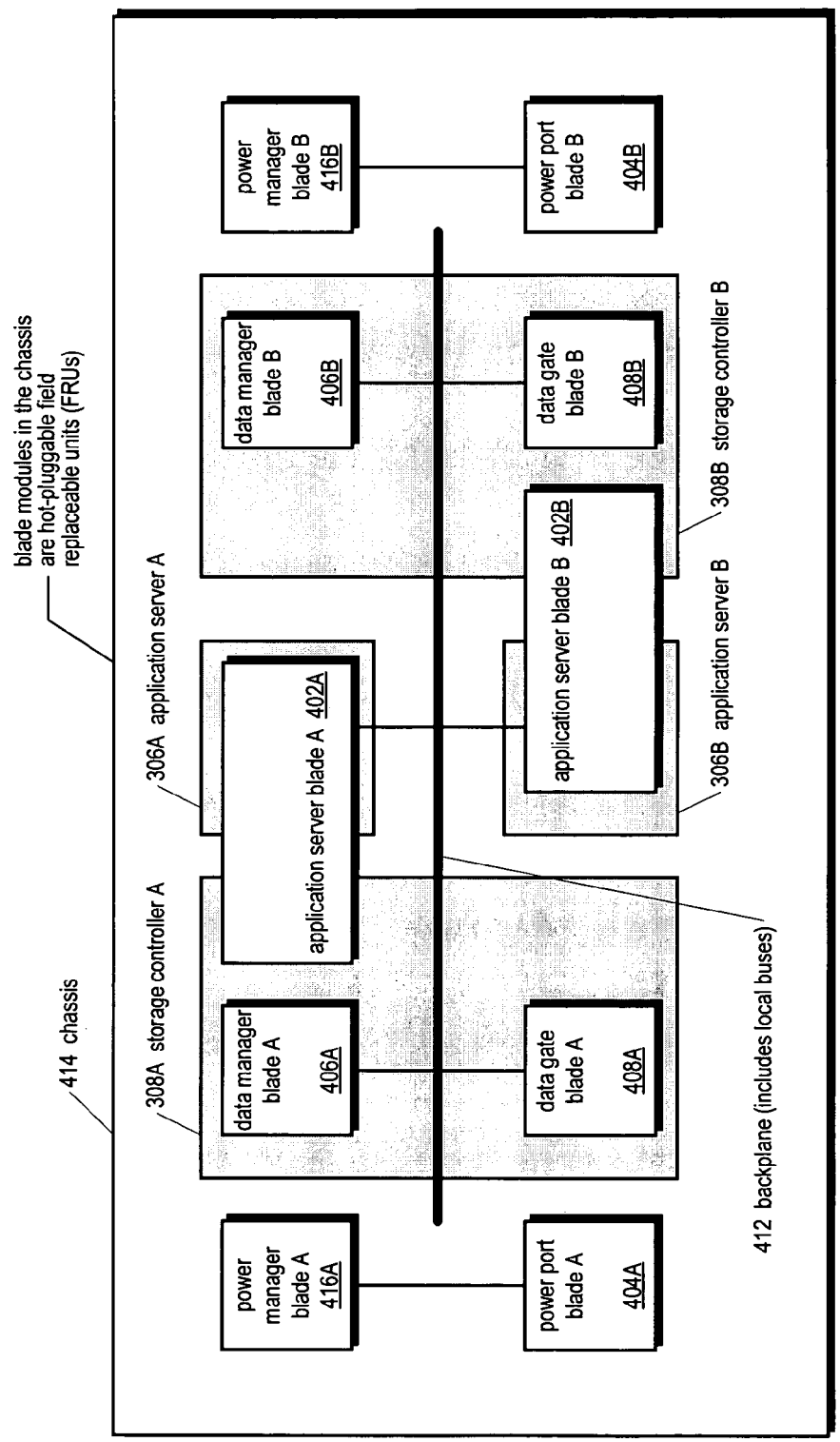
FIG. 4 is a block diagram of one embodiment of the storage appliance of FIG. 3.

Referring now to FIG. 4, a block diagram of one embodiment of the storage appliance 202 of FIG. 3 is shown. The storage appliance 202 includes a plurality of hot-replaceable field replaceable units (FRUs), referred to as modules or blades, as shown, enclosed in a chassis 414. The blades plug into a backplane 412, or mid-plane 412, enclosed in the chassis 414 which couples the blades together and provides a communication path between them. In one embodiment, each of the blades plugs into the same side of the chassis 414. In one embodiment, the backplane 412 comprises an active backplane. In one embodiment, the backplane 412 comprises a passive backplane. In the embodiment of FIG. 4, the blades include two power manager blades 416 (referred to individually as power manager blade A 416A and power manager blade B 416B), two power port blades 404 (referred to individually as power port blade A 404A and power port blade B 404B), two application server blades 402 (referred to individually as application server blade A 402A and application server blade B 402B), two data manager blades 406 (referred to individually as data manager blade A 406A and data manager blade B 406B), and two data gate blades 408 (referred to individually as data gate blade A 408A and data gate blade B 408B), as shown.

The power manager blades 416 each comprise a power supply for supplying power to the other blades in the storage appliance 202. In one embodiment, each power manager blade 416 comprises a 240 watt AC-DC power supply. In one embodiment, the power manager blades 416 are redundant. That is, if one of the power manager blades 416 fails, the other power manager blade 416 continues to provide power to the other blades in order to prevent failure of the storage appliance 202, thereby enabling the storage appliance 202 to continue to provide the host computers 302 access to the storage devices 112.

The power port blades 404 each comprise a cooling system for cooling the blades in the chassis 414. In one embodiment, each of the power port blades 404 comprises direct current fans for cooling, an integrated EMI filter, and a power switch. In one embodiment, the power port blades 404 are redundant. That is, if one of the power port blades 404 fails, the other power port blade 404 continues to cool the storage appliance 202 in order to prevent failure of the storage appliance 202, thereby enabling the storage appliance 202 to continue to provide the host computers 302 access to the storage devices 112.

Data manager blade A 406A, data gate blade A 408A, and a portion of application server blade A 402A logically comprise storage controller A 308A of FIG. 3; and the remainder of application server blade A 402A comprises application server A 306A of FIG. 3. Data manager blade B 406B, data gate blade B 408B, and a portion of application server blade B 402B comprise the other storage controller 308 of FIG. 3, and the remainder of application server blade B 402B comprises the other application server 306 of FIG. 3.

The application servers 306 comprise computers configured to execute software applications, such as storage software applications. In one embodiment, the application servers 306 function as a redundant pair such that if one of the application servers 306 fails, the remaining application server 306 takes over the functionality of the failed application server 306 such that the storage appliance 202 continues to provide the host computers 302 access to the storage devices 112. Similarly, if the application software executing on the application servers 306 performs a function independent of the host computers 302, such as a backup operation of the storage devices 112, if one of the application servers 306 fails, the remaining application server 306 continues to perform its function independent of the host computers 302. The application servers 306, and in particular the application server blades 402, are described in more detail below.

Figure 5:
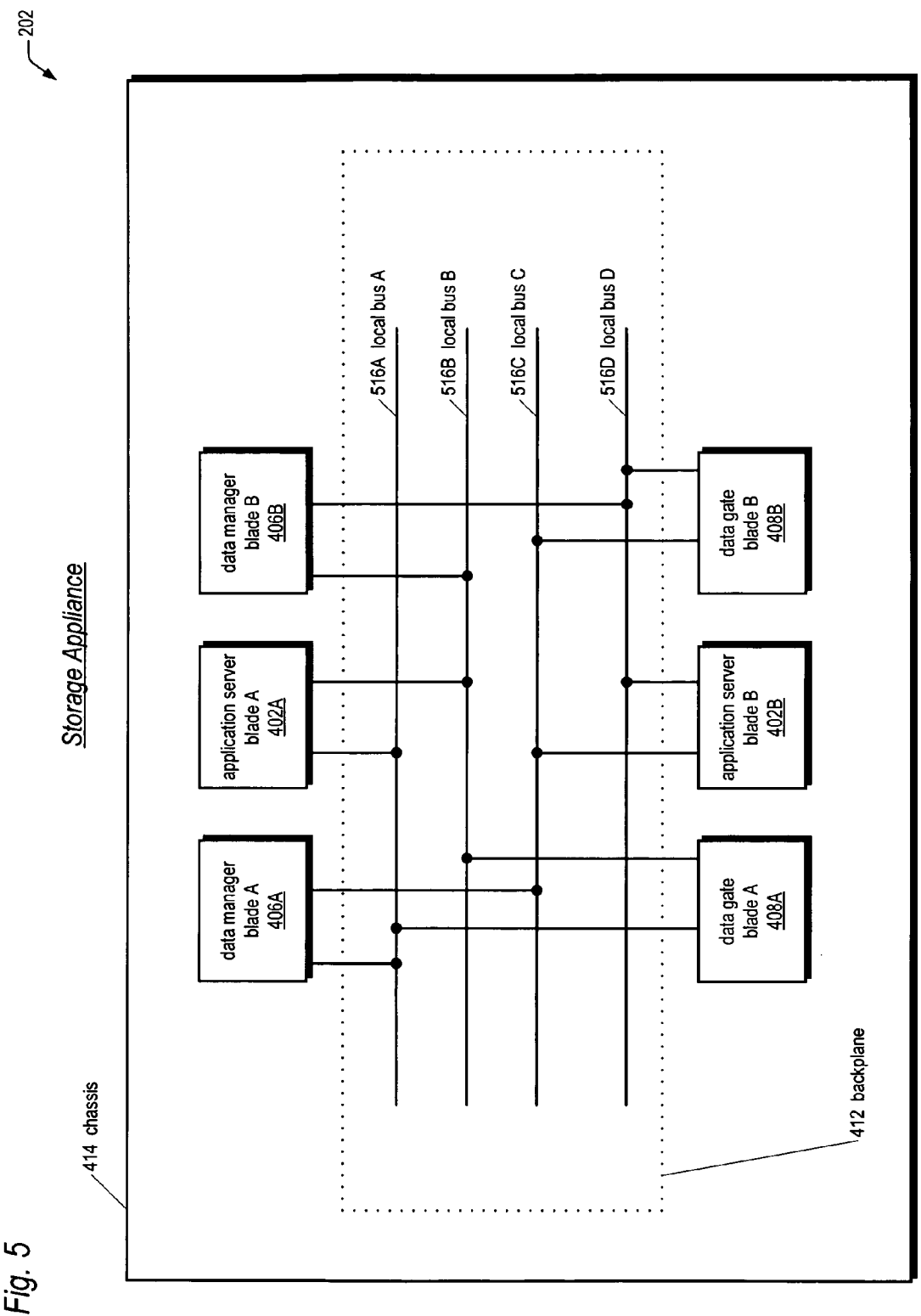
FIG. 5 is a block diagram of one embodiment of the storage appliance of FIG. 4 illustrating the interconnection of the various local bus interconnections of the blade modules of FIG. 4.
Figure 12:
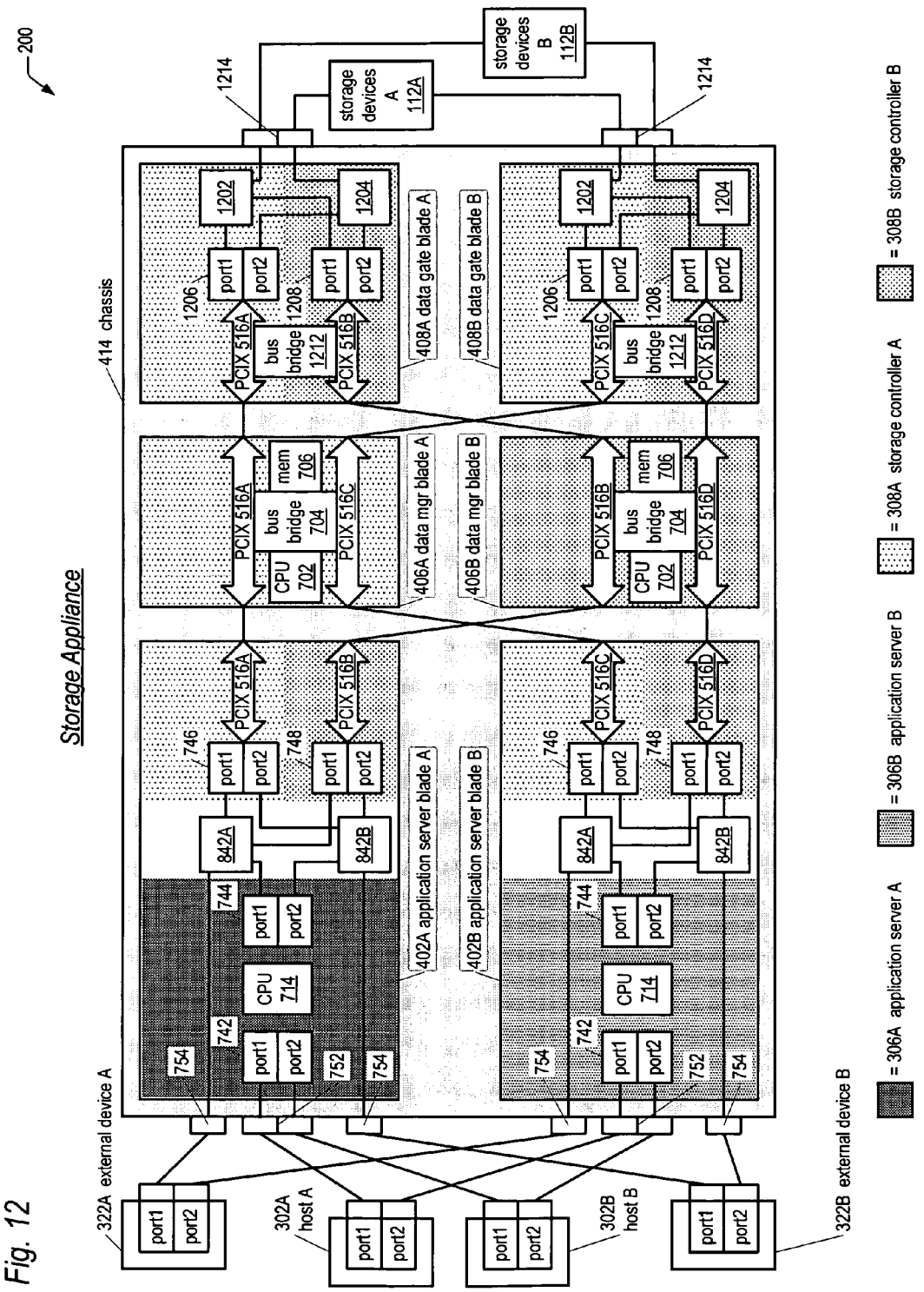
FIG. 12 is a block diagram illustrating the storage appliance of FIG. 5 in a fully fault-tolerant configuration in the computer network of FIG. 2.

Each of the data gate blades 408 comprises one or more I/O interface controllers (such as FC interface controllers 1206 and 1208 of FIG. 12) for interfacing with the storage devices 112. In one embodiment, each of the data gate blades 408 comprises redundant interface controllers for providing fault-tolerant access to the storage devices 112. In one embodiment, the interface controllers comprise dual Fibre-Channel (FC) interface controllers for interfacing to the storage devices 112 via a dual FC arbitrated loop configuration, as shown in FIG. 12. However, other embodiments are contemplated in which the data gate blades 408 interface with the storage devices 112 via other interfaces including, but not limited to, Advanced Technology Attachment (ATA), SAS, SATA, Ethernet, Infiniband, SCSI, HIPPI, ESCON, FICON, or relevant combinations thereof. The storage devices 112 and storage appliance 202 may communicate using stacked protocols, such as SCSI over FibreChannel or Internet SCSI (iSCSI). In one embodiment, at least a portion of the protocol employed between the storage appliance 202 and the storage devices 112 includes a low-level block interface, such as the SCSI protocol. Additionally, in one embodiment, at least a portion of the protocol employed between the host computers 302 and the storage appliance 202 includes a low-level block interface, such as the SCSI protocol. The interface controllers perform the protocol necessary to transfer commands and data between the storage devices 112 and the storage appliance 202. The interface controllers also include a local bus interface for interfacing to local buses (shown as local buses 516 of FIG. 5) that facilitate command and data transfers between the data gate blades 408 and the other storage appliance 202 blades. In the redundant interface controller embodiment of FIG. 4, each of the interface controllers is coupled to a different local bus (as shown in FIG. 5), and each data gate blade 408 also includes a local bus bridge (shown as bus bridge 1212 of FIG. 12) for bridging the two local buses. In one embodiment, the data gate blades 408 function as a redundant pair such that if one of the data gate blades 408 fails, the storage appliance 202 continues to provide the host computers 302 and application servers 306 access to the storage devices 112 via the remaining data gate blade 408.

Each of the data manager blades 406 comprises a processor (such as CPU 702 of FIG. 7) for executing programs to control the transfer of data between the storage devices 112 and the application servers 306 and/or host computers 302. Each of the data manager blades 406 also comprises a memory (such as memory 706 in FIG. 7) for buffering data transferred between the storage devices 112 and the application servers 306 and/or host computers 302. The processor receives commands from the application servers 306 and/or host computers 302 and responsively issues commands to the data gate blade 408 interface controllers to accomplish data transfers with the storage devices 112. In one embodiment, the data manager blades 406 also include a direct memory access controller (DMAC) (such as may be included in the local bus bridge/memory controller 704 shown in FIG. 7) for performing data transfers to and from the buffer memory on the local buses. The processor also issues commands to the DMAC and interface controllers on the application server blades 402 (such as I/O interface controllers 746/748 of FIG. 7) to accomplish data transfers between the data manager blade 406 buffer memory and the application servers 306 and/or host computers 302 via the local buses and high speed I/O links 304. The processor may also perform storage controller functions such as RAID control, logical block translation, buffer management, and data caching. Each of the data manager blades 406 also comprises a memory controller (such as local bus bridge/memory controller 704 in FIG. 7) for controlling the buffer memory. The memory controller also includes a local bus interface for interfacing to the local buses that facilitate command and data transfers between the data manager blades 406 and the other storage appliance 202 blades. In one embodiment, each of the data manager blades 406 is coupled to a different redundant local bus pair, and each data manager blade 406 also includes a local bus bridge (such as local bus bridge/memory controller 704 in FIG. 7) for bridging between the two local buses of the pair. In one embodiment, the data manager blades 406 function as a redundant pair such that if one of the data manager blades 406 fails, the remaining data manager blade 406 takes over the functionality of the failed data manager blade 406 such that the storage appliance 202 continues to provide the host computers 302 and/or application servers 306 access to the storage devices 112. In one embodiment, each data manager blade 406 monitors the status of the other storage appliance 202 blades, including the other data manager blade 406, in order to perform failover functions necessary to accomplish fault-tolerant operation, as described herein.

In one embodiment, each of the data manager blades 406 also includes a management subsystem for facilitating management of the storage appliance 202 by a system administrator. In one embodiment, the management subsystem comprises an Advanced Micro Devices® Elan™ microcontroller for facilitating communication with a user, such as a system administrator. In one embodiment, the management subsystem receives input from the user via a serial interface such as an RS-232 interface. In one embodiment, the management subsystem receives user input from the user via an Ethernet interface and provides a web-based configuration and management utility. In addition to its configuration and management functions, the management subsystem also performs monitoring functions, such as monitoring the temperature, presence, and status of the storage devices 112 or other components of the storage appliance 202, and monitoring the status of other critical components, such as fans or power supplies, such as those of the power manager blades 416 and power port blades 404.

The chassis 414 comprises a single enclosure for enclosing the blade modules and backplane 412 of the storage appliance 202. In one embodiment, the chassis 414 comprises a chassis for being mounted in well known 19" wide racks. In one embodiment, the chassis 414 comprises a one unit (1U) high chassis.

In one embodiment, the power manager blades 416, power port blades 404, data manager blades 406, and data gate blades 408 are similar in some aspects to corresponding modules in the RIO Raid Controller product sold by Chaparral Network Storage of Longmont, Colo.

Although the embodiment of FIG. 4 illustrates redundant modules, other lower cost embodiments are contemplated in which some or all of the blade modules are not redundant.

Referring now to FIG. 5, a block diagram of one embodiment of the storage appliance 202 of FIG. 4 illustrating the interconnection of the various local bus interconnections of the blade modules of FIG. 4 is shown. The storage appliance 202 in the embodiment of FIG. 5 includes four local buses, denoted local bus A 516A, local bus B 516B, local bus C 516C, and local bus D 516D, which are referred to collectively as local buses 516 or individually as local bus 516. In one embodiment, the local buses 516 comprise a high speed PCI-X local bus. Other embodiments are contemplated in which the local buses 516 include, but are not limited to a PCI, CompactPCI, PCI-Express, PCI-X2, EISA, VESA, VME, RapidIO, AGP, ISA, 3GIO, HyperTransport, Futurebus, MultiBus, or any similar local bus capable of transferring data at a high rate. As shown, data manager blade A 406A is coupled to local bus A 516A and local bus C 516C; data manager blade B 406B is coupled to local bus B 516B and local bus D 516D; data gate blade A 408A is coupled to local bus A 516A and local bus B 516B; data gate blade B 408B is coupled to local bus C 516C and local bus D 516D; application server blade A 402A is coupled to local bus A 516A and local bus B 516B; application server blade B 402B is coupled to local bus C 516C and local bus D 516D. As may be observed, the coupling of the blades to the local buses 516 enables each of the application server blades 402 to communicate with each of the data manager blades 406, and enables each of the data manager blades 406 to communicate with each of the data gate blades 408 and each of the application server blades 402. Furthermore, the hot-pluggable coupling of the FRU blades to the backplane 412 comprising the local buses 516 enables fault-tolerant operation of the redundant storage controllers 308 and application servers 306, as described in more detail below.

Figure 6:
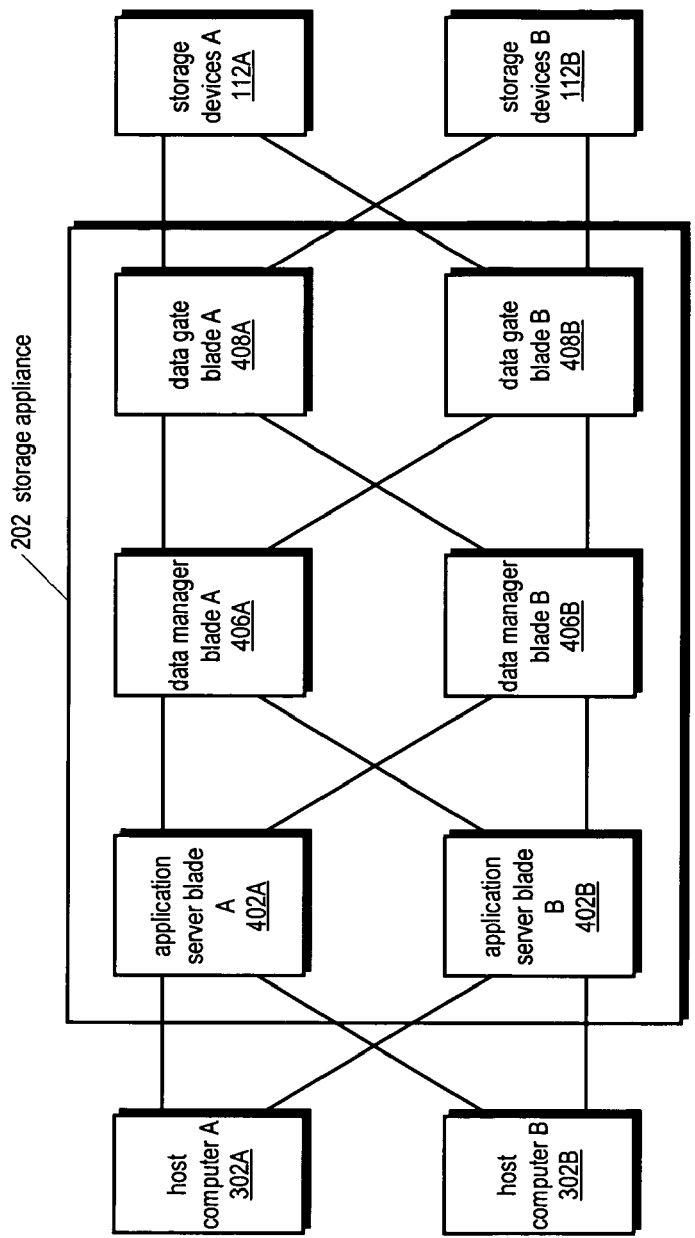
FIG. 6 is a block diagram illustrating the logical flow of data through the storage appliance of FIG. 4.

Referring now to FIG. 6, a block diagram illustrating the logical flow of data through the storage appliance 202 of FIG. 4 is shown. The application server blades 402 receive data transfer requests from the host computers 302 of FIG. 3, such as SCSI read and write commands, over an interface protocol link, including but not limited to FibreChannel, Ethernet, or Infiniband. The application server blades 402 process the requests and issue commands to the data manager blades 406 to perform data transfers to or from the storage devices 112 based on the type of request received from the host computers 302. The data manager blades 406 process the commands received from the application server blades 402 and issue commands to the data gate blades 408, such as SCSI over FC protocol commands, which the data gate blades 408 transmit to the storage devices 112. The storage devices 112 process the commands and perform the appropriate data transfers to or from the data gate blades 408. In the case of a write to the storage devices 112, the data is transmitted from the host computers 302 to the application server blades 402 and then to the data manager blades 406 and then to the data gate blades 408 and then to the storage devices 112. In the case of a read from the storage devices 112, the data is transferred from the storage devices 112 to the data gate blades 408 then to the data manager blades 406 then to the application server blades 402 then to the host computers 302.

As shown in FIG. 6, each of the application server blades 402 has a path to each of the data manager blades 406, and each of the data manager blades 406 has a path to each of the data gate blades 408. In one embodiment, the paths comprise the local buses 516 of FIG. 5. Additionally, in one embodiment, each of the host computers 302 has a path to each of the application server blades 402, and each of the data gate blades 408 has a path to each of the storage devices 112, as shown. Because each of the stages in the command and data transfers is a redundant pair, and a redundant communication path exists between each of the redundant pairs of each stage of the transfer, a failure of any one of the blades of a redundant pair does not cause a failure of the storage appliance 202.

In one embodiment, the redundant application server blades 402 are capable of providing an effective data transfer bandwidth of approximately 800 megabytes per second (MBps) between the host computers 302 and the redundant storage controllers 308.

Figure 7:
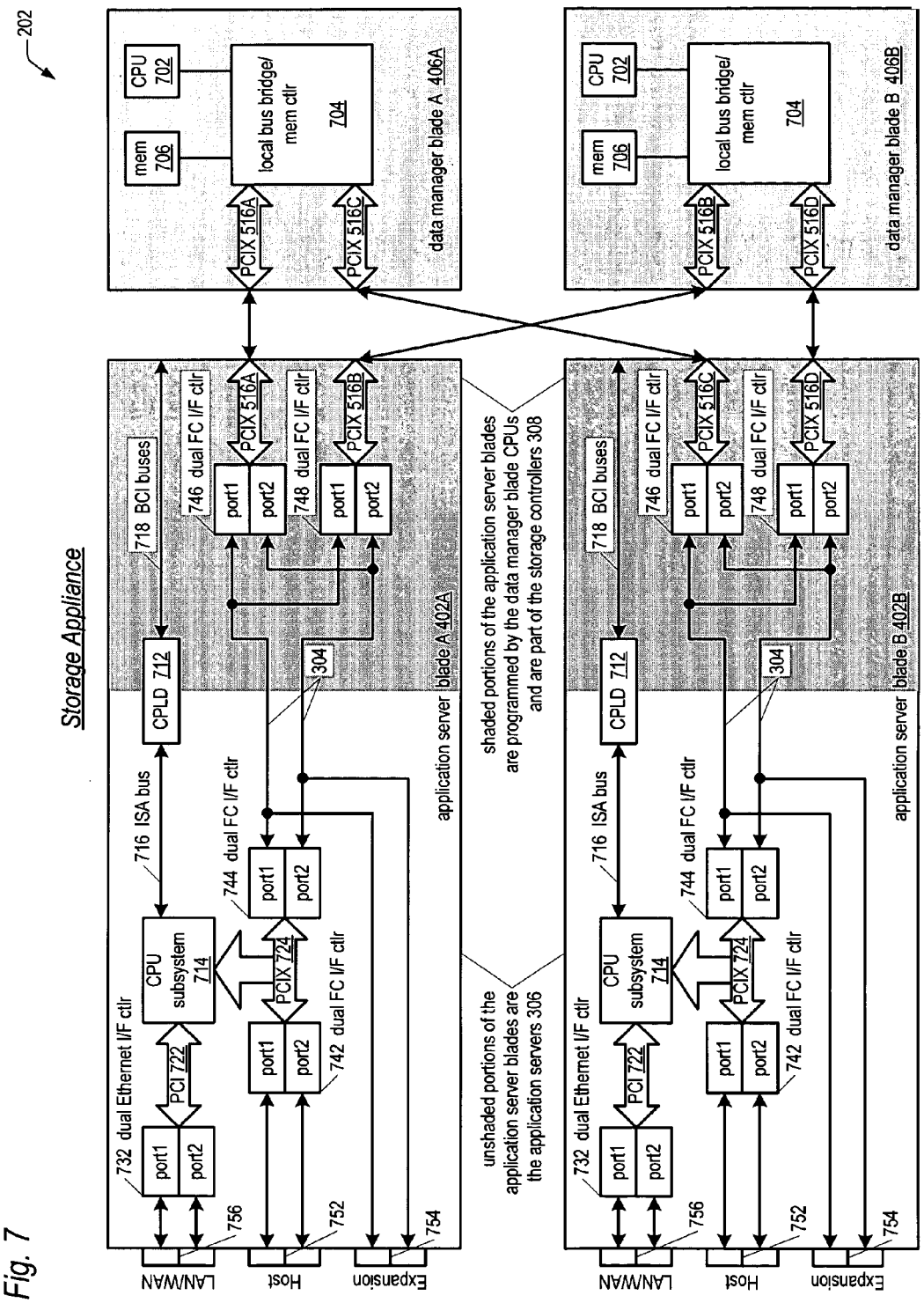
FIG. 7 is a block diagram of one embodiment of the storage appliance of FIG. 5 illustrating the application server blades and data manager blades in more detail.

Referring now to FIG. 7, a block diagram of one embodiment of the storage appliance 202 of FIG. 5 illustrating the application server blades 402 and data manager blades 406 in more detail is shown. The data gate blades 408 of FIG. 5 are not shown in FIG. 7. In the embodiment of FIG. 7, the local buses 516 of FIG. 5 comprise PCIX buses 516. FIG. 7 illustrates application server blade 402A and 402B coupled to data manager blade 406A and 406B via PCIX buses 516A, 516B, 516C, and 516D according to the interconnection shown in FIG. 5. The elements of the application server blades 402A and 402B are identical; however, their interconnections to the particular PCIX buses 516 are different as shown; therefore, the description of application server blade A 402A is identical for application server blade B 402B except as noted below with respect to the PCIX bus 516 interconnections. Similarly, with the exception of the PCIX bus 516 interconnections, the elements of the data manager blades 406A and 406B are identical; therefore, the description of data manager blade A 406A is identical for data manager blade B 406B except as noted below with respect to the PCIX bus 516 interconnections.

In the embodiment of FIG. 7, application server blade A 402A comprises two logically-distinct portions, an application server 306 portion and a storage controller 308 portion, physically coupled by the I/O links 304 of FIG. 3 and integrated onto a single FRU. The application server 306 portion includes a CPU subsystem 714, Ethernet controller 732, and first and second FC controllers 742/744, which comprise a server computer employed to execute server software applications, similar to those executed by the storage application servers 106 and/or traditional servers 104 of FIG. 1. The storage controller 308 portion of application server blade A 402A, shown in the shaded area, includes third and fourth FC controllers 746/748, which are programmed by a data manager blade 406 CPU 702 and are logically part of the storage controller 308 of FIG. 3. The storage controller 308 portions of the application server blades 402 may be logically viewed as the circuitry of a data gate blade 408 integrated onto the application server blade 402 to facilitate data transfers between the data manager blades 406 and the application server 306 portion of the application server blade 402. The storage controller 308 portions of the application server blades 402 also facilitate data transfers between the data manager blades 406 and external devices 322 of FIG. 3 coupled to expansion I/O connectors 754 of the application server blade 402.

Application server blade A 402A includes a CPU subsystem 714, described in detail below, which is coupled to a PCI bus 722. The PCI bus 722 is coupled to a dual port Ethernet interface controller 732, whose ports are coupled to connectors 756 on the application server blade 402 faceplate (shown in FIG. 10) to provide local area network (LAN) or wide area network (WAN) access to application server blade A 402A by the host computers 302 of FIG. 3. In one embodiment, one port of the Ethernet interface controller 732 of application server blade A 402A is coupled to one port of the Ethernet interface controller 732 of application server blade B 402B to provide a heartbeat link (such as heartbeat link 1712 of FIG. 17) between the servers for providing redundant fault-tolerant operation of the two application server blades 402, as described below. In one embodiment, the Ethernet controller 732 ports may be used as a management interface to perform device management of the storage appliance 202. In one embodiment, the application servers 306 may function as remote mirroring servers, and the Ethernet controller 732 ports may be used to transfer data to a remote mirror site. The CPU subsystem 714 is also coupled to a PCIX bus 724.

A first dual FibreChannel (FC) interface controller 742 is coupled to the PCIX bus 724. The first FC interface controller 742 ports (also referred to as front-end ports) are coupled to the I/O connectors 752 on the application server blade 402 faceplate (shown in FIG. 10) to provide the host computers 302 NAS/SAN access to the application servers 306. The first FC controller 742 functions as a target device and may be connected to the host computers 302 in a point-to-point, arbitrated loop, or switched fabric configuration. In FIG. 7 and the remaining Figures, a line connecting two FC ports, or a FC port and a FC connector, indicates a bi-directional FC link, i.e., an FC link with a transmit path and a receive path between the two FC ports, or between the FC port and the FC connector.

A second dual FC interface controller 744 is also coupled to the PCIX bus 724. The second FC controller 744 functions as an initiator device. The second FC interface controller 744 ports are coupled to the expansion I/O connectors 754 on the application server blade 402 faceplate (shown in FIG. 10) to provide a means for the CPU subsystem 714 of the application server blade 402 to directly access devices 322 of FIG. 3 external to the storage appliance 202 chassis 414, such as other storage controllers or storage appliances, tape drives, host computers, switches, routers, and hubs. In addition, the expansion I/O connectors 754 provide the external devices 322 direct NAS/SAN access to the storage controllers 308, rather than through the application servers 306, as described in detail below. Advantageously, the expansion I/O connectors 754 provide externalization of the internal I/O links 304 between the servers 306 and storage controllers 308 of FIG. 3, as described in more detail below.

Figure 21:
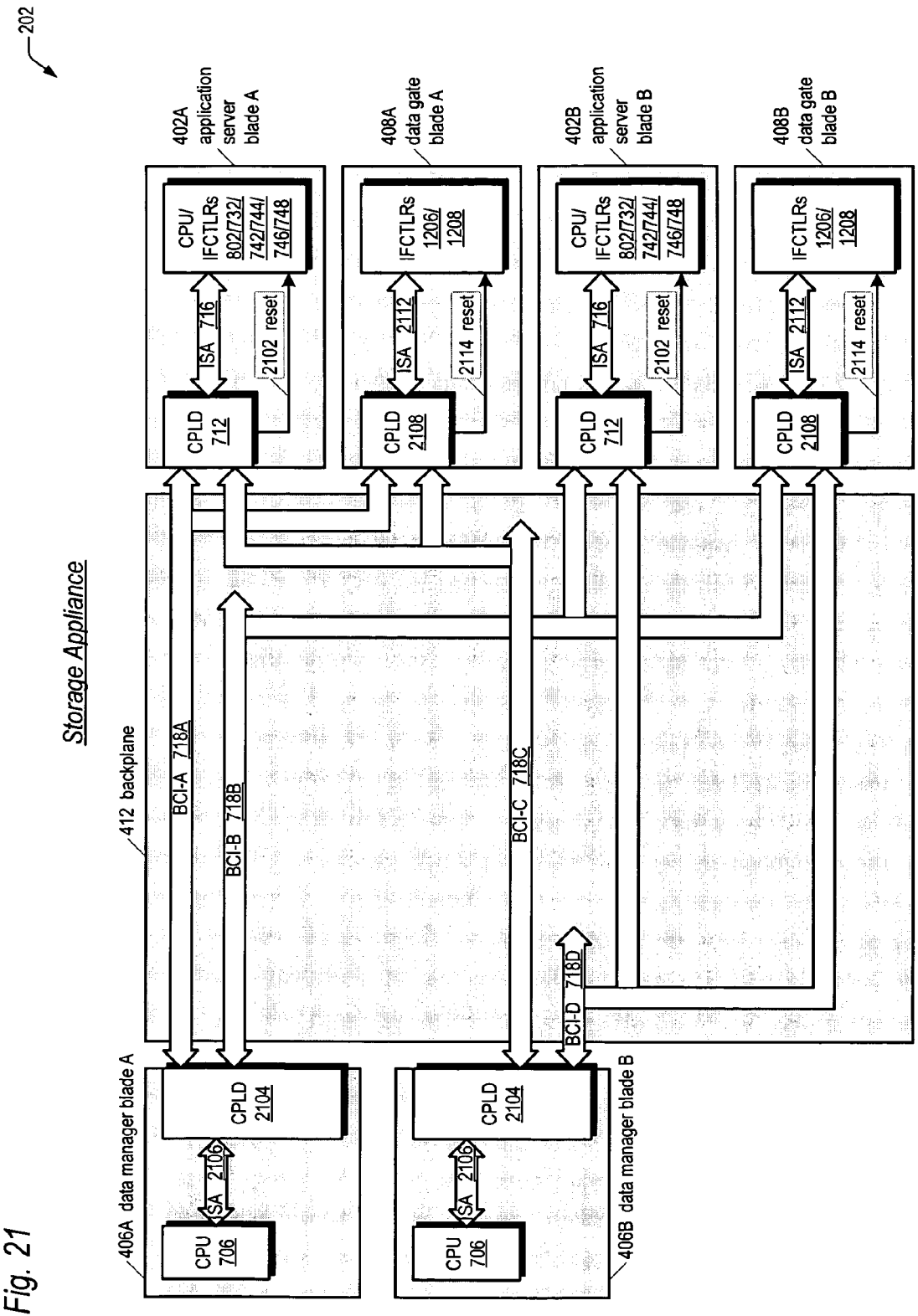
FIG. 21 is a block diagram illustrating the interconnection of the various storage appliance blades via the BCI buses of FIG. 7.

An industry standard architecture (ISA) bus 716 is also coupled to the CPU subsystem 714. A complex programmable logic device (CPLD) 712 is coupled to the ISA bus 716. The CPLD 712 is also coupled to dual blade control interface (BCI) buses 718. Although not shown in FIG. 7, one of the BCI buses 718 is coupled to data manager blade A 406A and data gate blade A 408A, and the other BCI bus 718 is coupled to data manager blade B 406B and data gate blade B 408B, as shown in FIG. 21. The BCI buses 718 are a proprietary 8-bit plus parity asynchronous multiplexed address/data bus supporting up to a 256 byte addressable region that interfaces the data manager blades 406 to the data gate blades 408 and application server blades 402. The BCI buses 718 enable each of the data manager blades 406 to independently configure and monitor the application server blades 402 and data gate blades 408 via the CPLD 712. The BCI buses 718 are included in the backplane 412 of FIG. 4. The CPLD 712 is described in more detail with respect to FIGS. 8, 21, and 22 below.

Application server blade A 402A also includes a third dual FibreChannel interface controller 746, coupled to PCIX bus 516A of FIG. 5, whose FC ports are coupled to respective ones of the second dual FC interface controller 744. Application server blade A 402A also includes a fourth dual FibreChannel interface controller 748, coupled to PCIX bus 516B of FIG. 5, whose FC ports are coupled to respective ones of the second dual FC interface controller 744 and to respective ones of the third dual FC interface controller 746. In the case of application server blade B 402B, its third FC interface controller 746 PCIX interface couples to PCIX bus 516C of FIG. 5 and its fourth FC interface controller 748 PCIX interface couples to PCIX bus 516D of FIG. 5. The third and fourth FC interface controllers 746/748 function as target devices.

Data manager blade A 406A includes a CPU 702 and a memory 706, each coupled to a local bus bridge/memory controller 704. In one embodiment, the processor comprises a Pentium III microprocessor. In one embodiment, the memory 706 comprises DRAM used to buffer data transferred between the storage devices 112 and the application server blade 402. The CPU 702 manages use of buffer memory 706. In one embodiment, the CPU 702 performs caching of the data read from the storage devices 112 into the buffer memory 706. In one embodiment, data manager blade A 406A also includes a memory coupled to the CPU 702 for storing program instructions and data used by the CPU 702. In one embodiment, the local bus bridge/memory controller 704 comprises a proprietary integrated circuit that controls the buffer memory 706. The local bus bridge/memory controller 704 also includes two PCIX bus interfaces for interfacing to PCIX bus 516A and 516C of FIG. 5. The local bus bridge/memory controller 704 also includes circuitry for bridging the two PCIX buses 516A and 516C. In the case of data manager blade B 406B, the local bus bridge/memory controller 704 interfaces to and bridges PCIX buses 516B and 516D of FIG. 5. The local bus bridge/memory controller 704 facilitates data transfers between each of the data manager blades 406 and each of the application server blades 402 via the PCIX buses 516.

Several advantages are obtained by including the third and fourth FC interface controllers 746/748 on the application server blade 402. First, the high-speed I/O links 304 between the second FC controller 744 and the third/fourth FC controller 746/748 are etched into the application server blade 402 printed circuit board rather than being discrete cables and connectors that are potentially more prone to being damaged or to other failure. Second, a local bus interface (e.g., PCIX) is provided on the application server blade 402 backplane 412 connector, which enables the application server blades 402 to interconnect and communicate via the local buses 516 of the backplane 412 with the data manager blades 406 and data gate blades 408, which also include a local bus interface on their backplane 412 connector. Third, substantial software development savings may be obtained from the storage appliance 202 architecture. In particular, the software executing on the data manager blades 406 and the application server blades 402 requires little modification to existing software. This advantage is discussed below in more detail with respect to FIG. 11.

Figure 8:
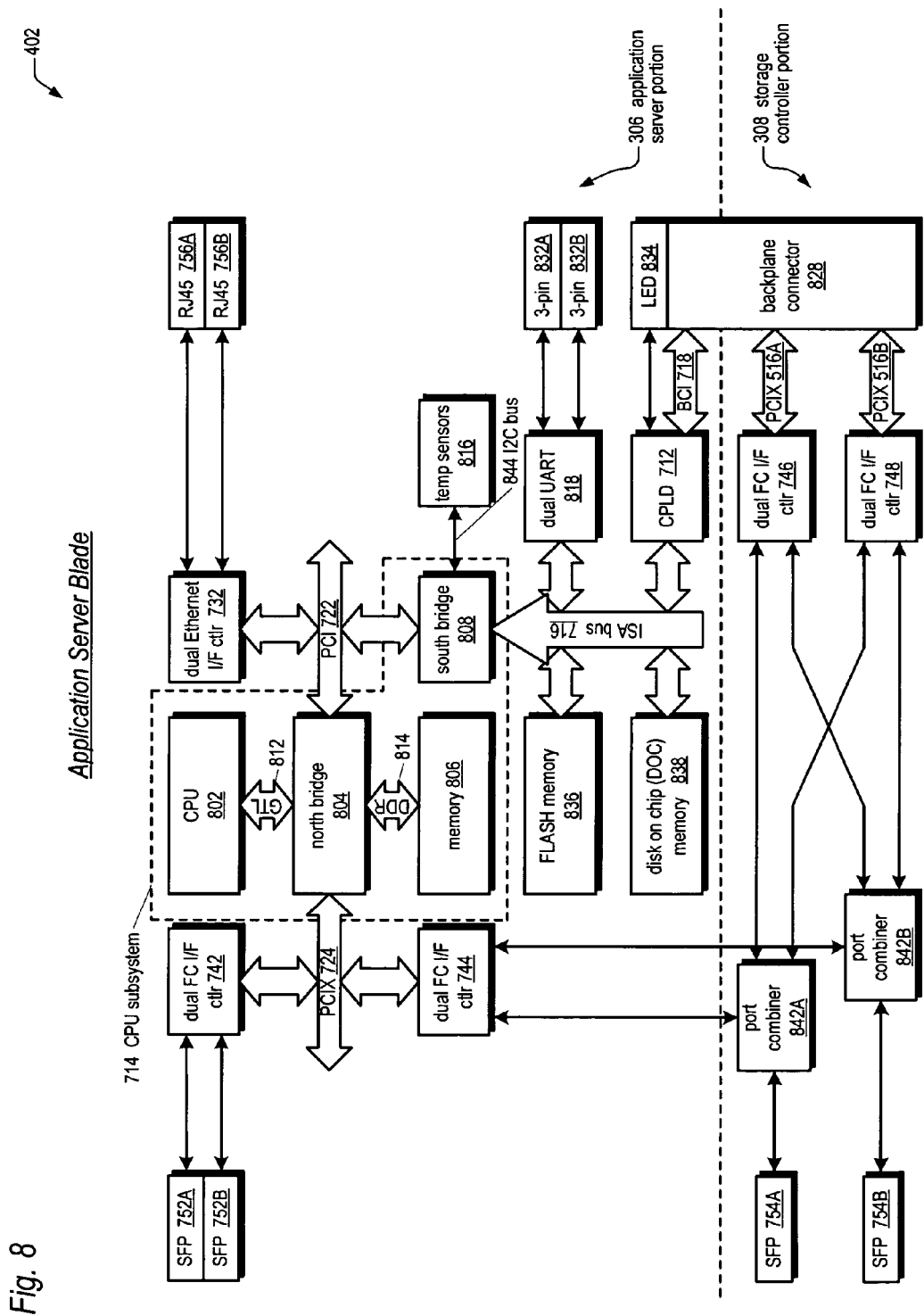
FIG. 8 is a block diagram illustrating one embodiment of the application server blade of FIG. 7.

Referring now to FIG. 8, a block diagram illustrating one embodiment of the application server blade A 402A of FIG. 7 is shown. The application server blade 402 includes the CPU subsystem 714 of FIG. 7, comprising a CPU 802 coupled to a north bridge 804 by a Gunning Transceiver Logic (GTL) bus 812 and a memory 806 coupled to the north bridge by a double-data rate (DDR) bus 814. The memory 806 functions as a system memory for the application server blade 402. That is, programs and data are loaded into the memory 806, such as from the DOC memory 838 described below, and executed by the CPU 802. Additionally, the memory 806 serves as a buffer for data transferred between the storage devices 112 and the host computers 302. In particular, data is transferred from the host computers 302 through the first FC controller 742 and north bridge 804 into the memory 806, and vice versa. Similarly, data is transferred from the memory 806 through the north bridge 804, second FC controller 744, third or forth FC controller 746 or 748, and backplane 412 to the data manager blades 406. The north bridge 804 also functions as a bridge between the GTL bus 812/DDR bus 814 and the PCIX bus 724 and the PCI bus 722 of FIG. 7. The CPU subsystem 714 also includes a south bridge 808 coupled to the PCI bus 722. The Ethernet controller 732 of FIG. 7 is coupled to the PCI bus 722. In one embodiment, the connectors 756 of FIG. 7 comprise RJ45 jacks, denoted 756A and 756B in FIG. 8, for coupling to respective ports of the Ethernet controller 732 of FIG. 7 for coupling to Ethernet links to the host computers 302. The south bridge 808 also provides an $I^2C$ bus by which temperature sensors 816 are coupled to the south bridge 808. The temperature sensors 816 provide temperature information for critical components in the chassis 414, such as of CPUs and storage devices 112, to detect potential failure sources. The south bridge 808 also functions as a bridge to the ISA bus 716 of FIG. 7.

A FLASH memory 836, disk on chip (DOC) memory 838, dual UART 818, and the CPLD 712 of FIG. 7 are coupled to the ISA bus 716. In one embodiment, the FLASH memory 836 comprises a 16 MB memory used to store firmware to bootstrap the application server blade 402 CPU 802. In one embodiment, in which the application server blade 402 conforms substantially to a personal computer (PC), the FLASH memory 836 stores a Basic Input/Output System (BIOS). In one embodiment, the DOC memory 838 comprises a 128 MB NAND FLASH memory used to store, among other things, an operating system, application software, and data, such as web pages. Consequently, the application server blade 402 is able to boot and function as a stand-alone server. Advantageously, the application server blade 402 provides the DOC memory 838 thereby alleviating the need for a mechanical mass storage device, such as a hard disk drive, for storing the operating system and application software. Additionally, the DOC memory 838 may be used by the storage application software executing on the application server blade 402 as a high speed storage device in a storage hierarchy to cache frequently accessed data from the storage devices 112. In one embodiment, the application server blade 402 includes a mechanical disk drive, such as a microdrive, for storing an operating system, application software, and data instead of or in addition to the DOC memory 838. The two UART 818 ports are coupled to respective 3-pin serial connectors denoted 832A and 832B for coupling to serial RS-232 links. In one embodiment, the two serial ports function similarly to COM1 and COM2 ports of a personal computer. Additionally, the RS-232 ports may be used for debugging and manufacturing support. The CPLD 712 is coupled to a light emitting diode (LED) 834. The CPLD 712 is coupled via the BCI buses 718 of FIG. 7 to a connector 828 for plugging into the backplane 412 of FIG. 4.

The CPLD 712 includes a 2K×8 SRAM port for accessing a shared mailbox memory region. The CPLD 712 also provides the ability to program chip select decodes for other application server blade 402 devices such as the FLASH memory 836 and DOC memory 838. The CPLD 712 provides dual independent BCI bus interfaces by which the data manager blades 406 can control and obtain status of the application server blades 402. For example, the CPLD 712 provides the ability for the data manager blade 406 to reset the application server blades 402 and data gate blades 408, such as in the event of detection of a failure. The CPLD 712 also provides the ability to determine the status of activity on the various FibreChannel links and to control the status indicator LED 834. The CPLD 712 also enables monitoring of the I/O connectors 752/754 and control of port combiners 842, as described below. The CPLD 712 also enables control of hot-plugging of the various modules, or blades, in the storage appliance 202. The CPLD 712 also provides general purpose registers for use as application server blade 402 and data manager blade 406 mailboxes and doorbells.

The first and second FC controllers 742/744 of FIG. 7 are coupled to the PCIX bus 724. In the embodiment of FIG. 8, the I/O connectors 752 and 754 of FIG. 7 comprise FC small form-factor pluggable sockets (SFPs). The two ports of the first FC controller 742 are coupled to respective SFPs 752A and 752B for coupling to FC links to the host computers 302. The two ports of the second FC controller 744 are coupled to respective port combiners denoted 842A and 842B. The port combiners 842 are also coupled to respective SFPs 754A and 754B for coupling to FC links to the external devices 322 of FIG. 3. One port of each of the third and fourth FC controllers 746 and 748 of FIG. 7 are coupled to port combiner 842A, and one port of each of the third and fourth FC controllers 746 and 748 are coupled to port combiner 842B. The PCIX interface of each of the third and fourth FC controllers 746 and 748 are coupled to the backplane connector 828 via PCIX bus 516A and 516B, respectively, of FIG. 5.

In one embodiment, each of the port combiners 842 comprises a FibreChannel arbitrated loop hub that allows devices to be inserted into or removed from an active FC arbitrated loop. The arbitrated loop hub includes four FC port bypass circuits (PBCs), or loop resiliency circuits (LRCs), serially coupled in a loop configuration, as described in detail with respect to FIG. 25. A PBC or LRC is a circuit that may be used to keep a FC arbitrated loop operating when a FC L_Port location is physically removed or not populated, L_Ports are powered-off, or a failing L_Port is present. A PBC or LRC provides the means to route the serial FC channel signal past an L_Port. A FC L_Port is an FC port that supports the FC arbitrated loop topology. Hence, for example, if port1 of each of the second, third, and fourth FC controllers 744/746/748 are all connected and operational, and SFP 754A has an operational device coupled to it, then each of the four FC devices may communicate with one another via port combiner 842A. However, if the FC device connected to any one or two of the ports is removed, or becomes non-operational, then the port combiner 842A will bypass the non-operational ports keeping the loop intact and enabling the remaining two or three FC devices to continue communicating through the port combiner 842A. Hence, port combiner 842A enables the second FC controller 744 to communicate with each of the third and fourth FC controllers 746/748, and consequently to each of the data manager blades 406; additionally, port combiner 842A enables external devices 322 of FIG. 3 coupled to SFP 754A to also communicate with each of the third and fourth FC controllers 746/748, and consequently to each of the data manager blades 406. Although an embodiment is described herein in which the port combiners 842 are FC LRC hubs, other embodiments are contemplated in which the port combiners 842 are FC loop switches. Because the FC loop switches are cross-point switches, they provide higher performance since more than one port pair can communicate simultaneously through the switch. Furthermore, the port combiners 842 may comprise Ethernet or Infiniband switches, rather than FC devices.

In one embodiment, the application servers 306 substantially comprise personal computers without mechanical hard drives, keyboard, and mouse connectors. That is, the application servers 306 portion of the application server blade 402 includes off-the-shelf components mapped within the address spaces of the system just as in a PC. The CPU subsystem 714 is logically identical to a PC, including the mappings of the FLASH memory 836 and system RAM 806 into the CPU 802 address space. The system peripherals, such as the UARTs 818, interrupt controllers, real-time clock, etc., are logically identical to and mapping the same as in a PC. The PCI 722, PCIX 724, ISA 716 local buses and north bridge 804 and south bridge 808 are similar to those commonly used in high-end PC servers. The Ethernet controller 732 and first and second FC interface controllers 742/744 function as integrated Ethernet network interface cards (NICs) and FC host bus adapters (HBAs), respectively. All of this advantageously potentially results in the ability to execute standard off-the-shelf software applications on the application server 306, and the ability to run a standard operating system on the application servers 306 with little modification. The hard drive functionality may be provided by the DOC memory 838, and the user interface may be provided via the Ethernet controller 732 interfaces and web-based utilities, or via the UART 818 interfaces.

As indicated in FIG. 8, the storage controller 308 portion of the application server blade 402 includes the third and fourth interface controllers 746/748, and the SFPs 754; the remainder comprises the application server 306 portion of the application server blade 402.

Figure 9:
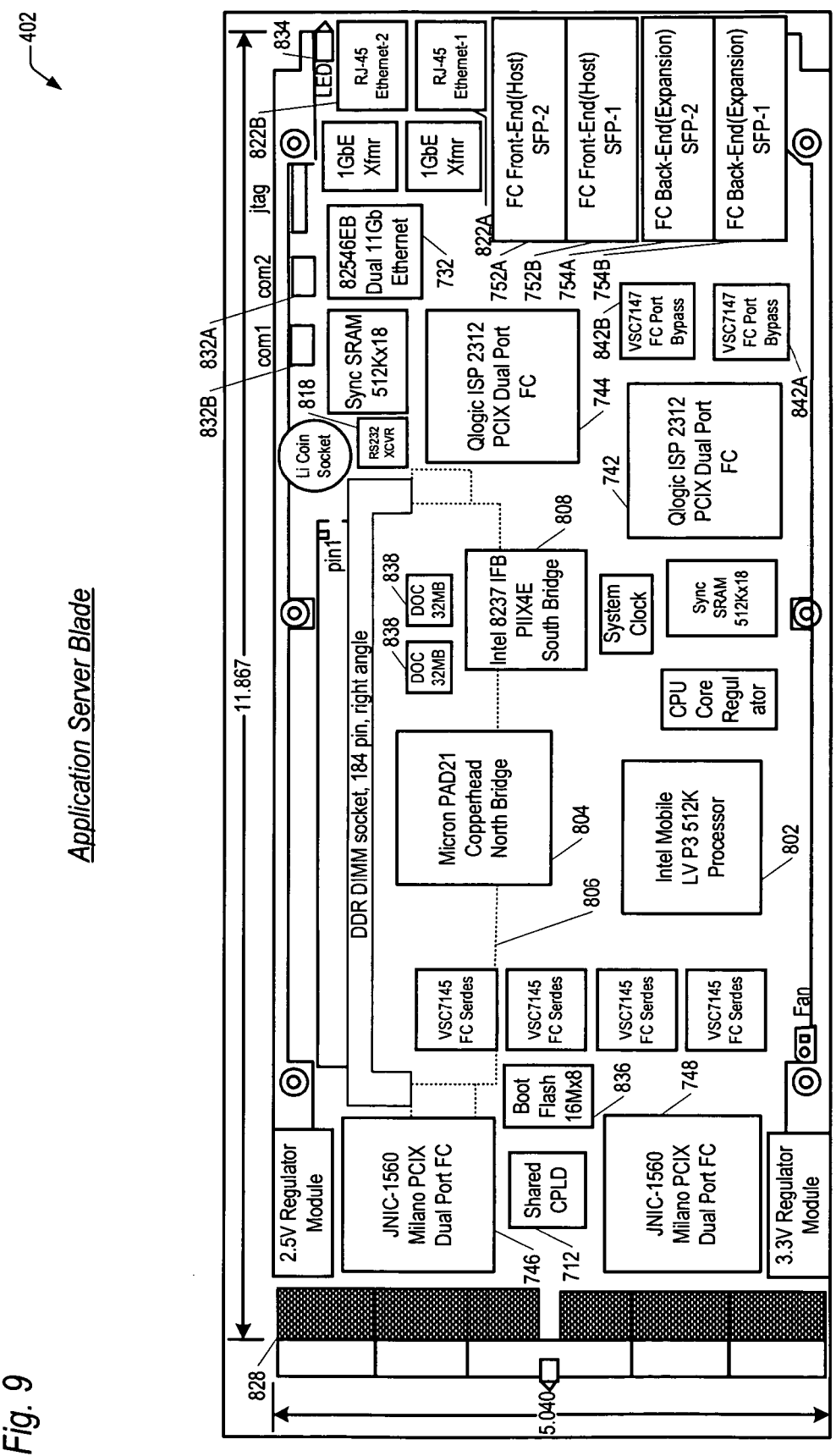
FIG. 9 is a diagram illustrating the physical layout of a circuit board of one embodiment of the application server blade of FIG. 8.

Referring now to FIG. 9, a diagram illustrating the physical layout of a circuit board of one embodiment of the application server blade 402 of FIG. 8 is shown. The layout diagram is drawn to scale. As shown, the board is 5.040 inches wide and 11.867 inches deep. The elements of FIG. 8 are included in the layout and numbered similarly. The first and second FC controllers 742/744 each comprise an ISP2312 dual channel FibreChannel to PCI-X controller produced by the QLogic Corporation of Aliso Viejo, Calif. Additionally, a 512K×18 synchronous SRAM is coupled to each of the first and second FC controllers 742/744. The third and fourth FC controllers 746/748 each comprise a JNIC-1560 Milano dual channel FibreChannel to PCI-X controller. The south bridge 808 comprises an Intel PIIX4E, which includes internal peripheral interrupt controller (PIC), programmable interval timer (PIT), and real-time clock (RTC). The north bridge 804 comprises a Micron PAD21 Copperhead. The memory 806 comprises up to 1 GB of DDR SDRAM ECC-protected memory DIMM. FIG. 9 illustrates an outline for a memory 806 DIMM to be plugged into a 184 pin right angle socket. The CPU 802 comprises a 933 MHz Intel Tualatin low voltage mobile Pentium 3 with a 32 KB on-chip L1 cache and a 512K on-chip L2 cache. The FLASH memory 836 comprises a 16 MB×8 FLASH memory chip. The DOC memory 838 comprises two 32 MB each NAND FLASH memory chips that emulate an embedded IDE hard drive. The port combiners 842 each comprise a Vitesse VSC7147-01. The Ethernet controller 732 comprises an Intel 82546EB 10/100/1000 Mbit Ethernet controller.

Although an embodiment is described using particular components, such as particular microprocessors, interface controllers, bridge circuits, memories, etc., other similar suitable components may be employed in the storage appliance 202.

Figure 10:
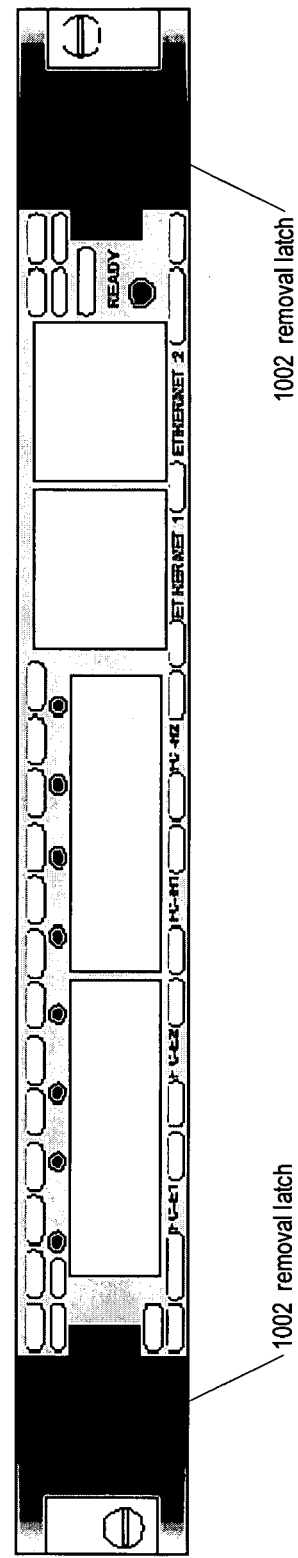
FIG. 10 is an illustration of one embodiment of the faceplate of the application server blade of FIG. 9.

Referring now to FIG. 10, an illustration of one embodiment of the faceplate 1000 of the application server blade 402 of FIG. 9 is shown. The faceplate 1000 includes two openings for receiving the two RJ45 Ethernet connectors 756 of FIG. 7. The faceplate 1000 also includes two openings for receiving the two pairs of SFPs 752 and 754 of FIG. 7. The face plate 1000 is one unit (1 U) high for mounting in a standard 19 inch wide chassis 414. The faceplate 1000 includes removal latches 1002, or removal mechanisms 1002, such as those well-known in the art of blade modules, that work together with mechanisms on the chassis 414 to enable a person to remove the application server blade 402 from the chassis 414 backplane 412 and to insert the application server blade 402 into the chassis 414 backplane 412 while the storage appliance 202 is operational without interrupting data availability on the storage devices 112. In particular, during insertion, the mechanisms 1002 cause the application server blade 402 connector to mate with the backplane 412 connector and immediately begin to receive power from the backplane 412; conversely, during removal, the mechanisms 1002 cause the application server blade 402 connector to disconnect from the backplane 412 connector to which it mates, thereby removing power from the application server blade 402. Each of the blades in the storage appliance 202 includes removal latches similar to the removal latches 1002 of the application server blade 402 faceplate 1000 shown in FIG. 10. Advantageously, the removal mechanism 1002 enables a person to remove and insert a blade module without having to open the chassis 414.

Figure 11:
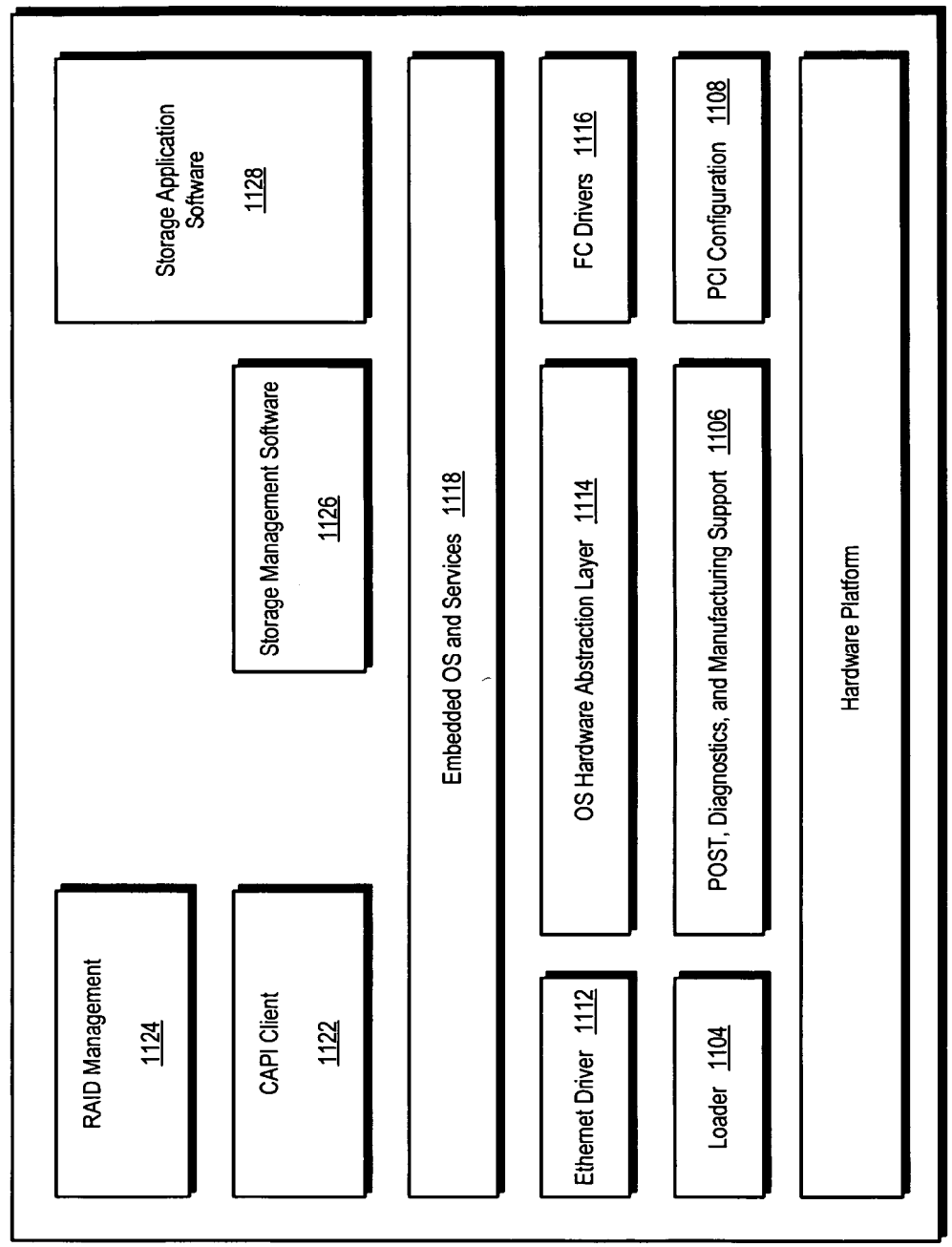
FIG. 11 is a block diagram illustrating the software architecture of the application server blade of FIG. 8.

Referring now to FIG. 11, a block diagram illustrating the software architecture of the application server blade 402 of FIG. 8 is shown. The software architecture includes a loader 1104. The loader 1104 executes first when power is supplied to the CPU 802. The loader 1104 performs initial boot functions for the hardware and loads and executes the operating system. The loader 1104 is also capable of loading and flashing new firmware images into the FLASH memory 836. In one embodiment, the loader 1104 is substantially similar to a personal computer BIOS. In one embodiment, the loader 1104 comprises the RedBoot boot loader product by Red Hat, Inc. of Raleigh, N.C. The architecture also includes power-on self-test (POST), diagnostics, and manufacturing support software 1106. In one embodiment, the diagnostics software executed by the CPU 802 does not diagnose the third and fourth FC controllers 746/748, which are instead diagnosed by firmware executing on the data manager blades 406. The architecture also includes PCI configuration software 1108, which configures the PCI bus 722, the PCIX bus 724, and each of the devices connected to them. In one embodiment, the PCI configuration software 1108 is executed by the loader 1104.

The architecture also includes an embedded operating system and associated services 1118. In one embodiment, the operating system 1118 comprises an embedded version of the Linux operating system distributed by Red Hat, Inc. Other operating systems 1118 are contemplated including, but not limited to, Hard Hat Linux from Monta Vista Software, VA Linux, an embedded version of Windows NT from Microsoft Corporation, VxWorks from Wind River of Alameda, Calif., Microsoft Windows CE, and Apple Mac OS X 10.2. Although the operating systems listed above execute on Intel x86 processor architecture platforms, other processor architecture platforms are contemplated. The operating system services 1118 include serial port support, interrupt handling, a console interface, multi-tasking capability, network protocol stacks, storage protocol stacks, and the like. The architecture also includes device driver software for execution with the operating system 1118. In particular, the architecture includes an Ethernet device driver 1112 for controlling the Ethernet controller 732, and FC device drivers 1116 for controlling the first and second FC controllers 742/744. In particular, an FC device driver 1116 must include the ability for the first controller 742 to function as a FC target to receive commands from the host computers 302 and an FC device driver 1116 must include the ability for the second controller 744 to function as a FC initiator to initiate commands to the storage controller 308 and to any target external devices 322 of FIG. 3 connected to the expansion I/O connectors 754. The architecture also includes a hardware abstraction layer (HAL) 1114 that abstracts the underlying application server blade 402 hardware to reduce the amount of development required to port a standard operating system to the hardware platform.

The software architecture also includes an operating system-specific Configuration Application Programming Interface (CAPI) client 1122 that provides a standard management interface to the storage controllers 308 for use by application server blade 402 management applications. The CAPI client 1122 includes a CAPI Link Manager Exchange (LMX) that executes on the application server blade 402 and communicates with the data manager blades 406. In one embodiment, the LMX communicates with the data manager blades 406 via the high-speed I/O links 304 provided between the second FC controller 744 and the third and fourth FC controllers 746/748. The CAPI client 1122 also includes a CAPI client application layer that provides an abstraction of CAPI services for use by device management applications executing on the application server blade 402. The software architecture also includes storage management software 1126 that is used to manage the storage devices 112 coupled to the storage appliance 202. In one embodiment, the software architecture also includes RAID management software 1124 that is used to manage RAID arrays comprised of the storage devices 112 controlled by the data manager blades 406.

Finally, the software architecture includes one or more storage applications 1128. Examples of storage applications 1128 executing on the application servers 306 include, but are not limited to, the following applications: data backup, remote mirroring, data snapshot, storage virtualization, data replication, hierarchical storage management (HSM), data content caching, data storage provisioning, and file services—such as network attached storage (NAS). An example of storage application software is the IPStor product provided by FalconStor Software, Inc. of Melville, N.Y. The storage application software may also be referred to as "middleware" or "value-added storage functions." Other examples of storage application software include products produced by Network Appliance, Inc. of Sunnyvale, Calif., Veritas Software Corporation of Mountain View, Calif., and Computer Associates, Inc. of Islandia, N.Y. similar to the FalconStor IPStor product.

Advantageously, much of the software included in the application server blade 402 software architecture may comprise existing software with little or no modification required. In particular, because the embodiment of the application server blade 402 of FIG. 8 substantially conforms to the x86 personal computer (PC) architecture, existing operating systems that run on an x86 PC architecture require a modest amount of modification to run on the application server blade 402. Similarly, existing boot loaders, PCI configuration software, and operating system HALs also require a relatively small amount of modification to run on the application server blade 402. Furthermore, because the DOC memories 838 provide a standard hard disk drive interface, the boot loaders and operating systems require little modification, if any, to run on the application server blade 402 rather than on a hardware platform with an actual hard disk drive. Additionally, the use of popular FC controllers 742/744/746/748 and Ethernet controllers 732 increases the likelihood that device drivers already exist for these devices for the operating system executing on the application server blade 402. Finally, the use of standard operating systems increases the likelihood that many storage applications will execute on the application server blade 402 with a relatively small amount of modification required.

Advantageously, although in the embodiment of the storage appliance 202 of FIG. 7 the data manager blades 406 and data gate blades 408 are coupled to the application server blades 402 via local buses as is typical with host bus adapter-type (or host-dependent) storage controllers, the storage controllers 308 logically retain their host-independent (or stand-alone) storage controller nature because of the application server blade 402 architecture. That is, the application server blade 402 includes the host bus adapter-type second interface controller 744 which provides the internal host-independent I/O link 304 to the third/fourth interface controllers 746/748, which in turn provide an interface to the local buses for communication with the other blades in the chassis 414 via the backplane 412. Because the third/fourth interface controllers 746/748 are programmable by the data manager blades 406 via the local buses 516, the third/fourth interface controllers 746/748 function as target interface controllers belonging to the storage controllers 308. This fact has software reuse and interoperability advantages, in addition to other advantages mentioned. That is, the storage controllers 308 appear to the application servers 306 and external devices 322 coupled to the expansion I/O connectors 754 as stand-alone storage controllers. This enables the application servers 306 and external devices 322 to communicate with the storage controllers 308 as a FC device using non-storage controller-specific device drivers, rather than as a host bus adapter storage controller, which would require development of a proprietary device driver for each operating system running on the application server 306 or external host computers 322.

Notwithstanding the above advantages, another embodiment is contemplated in which the second, third, and fourth FC controllers 744/746/748 of FIG. 7 are not included in the application server blade 402 and are instead replaced by a pair of PCIX bus bridges that couple the CPU subsystem 714 directly to the PCIX buses 516 of the backplane 412. One advantage of this embodiment is potentially lower component cost, which may lower the cost of the application server blade 402. Additionally, the embodiment may also provide higher performance, particularly in reduced latency and higher bandwidth without the intermediate I/O links. However, this embodiment may also require substantial software development, which may be costly both in time and money, to develop device drivers running on the application server blade 402 and to modify the data manager blade 406 firmware and software. In particular, the storage controllers in this alternate embodiment are host-dependent host bus adapters, rather than host-independent, stand-alone storage controllers. Consequently, device drivers must be developed for each operating system executing on the application server blade 402 to drive the storage controllers.

Figure 13:
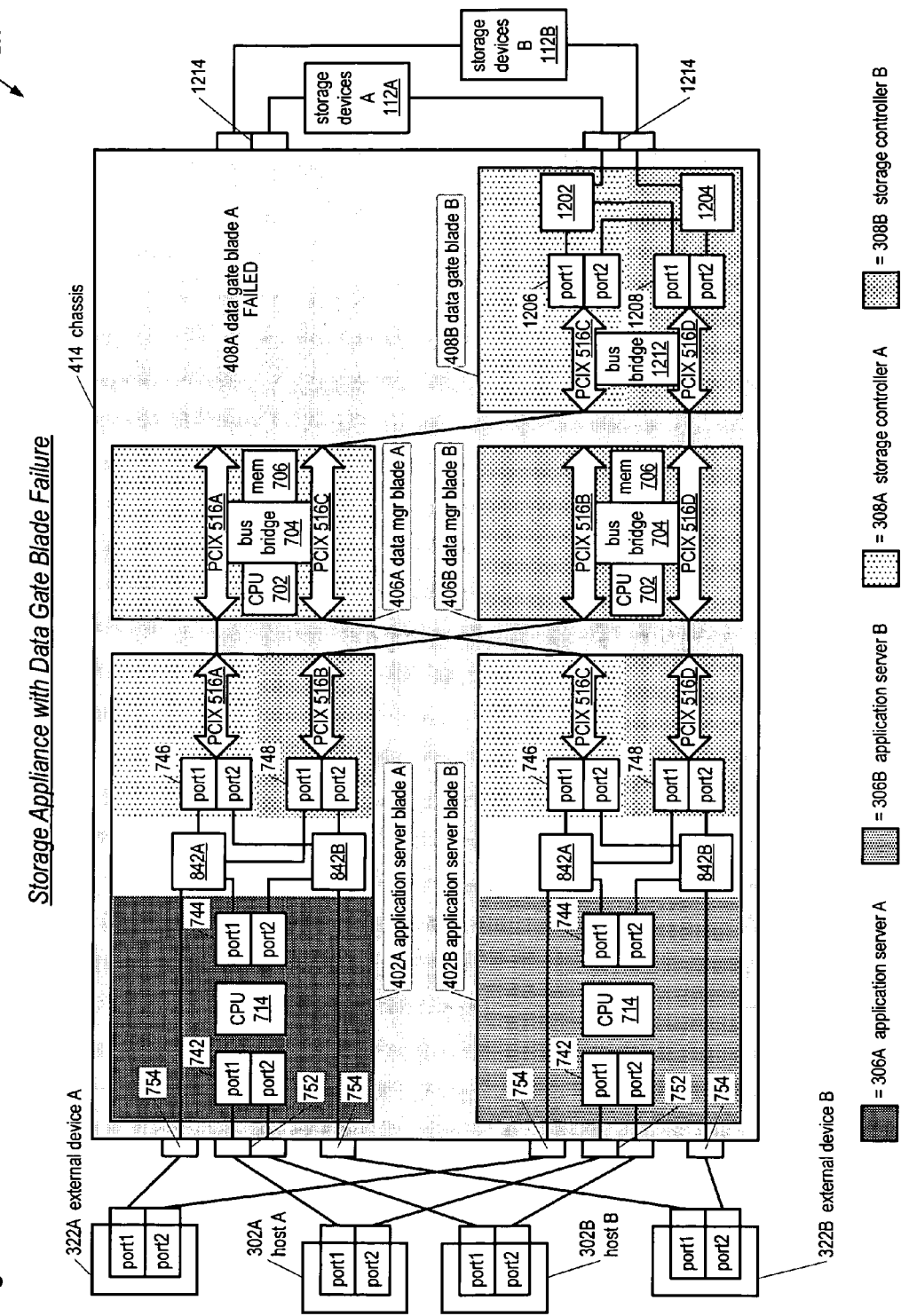
FIG. 13 is a block diagram illustrating the computer network of FIG. 12 in which a data gate blade has failed.
Figure 14:
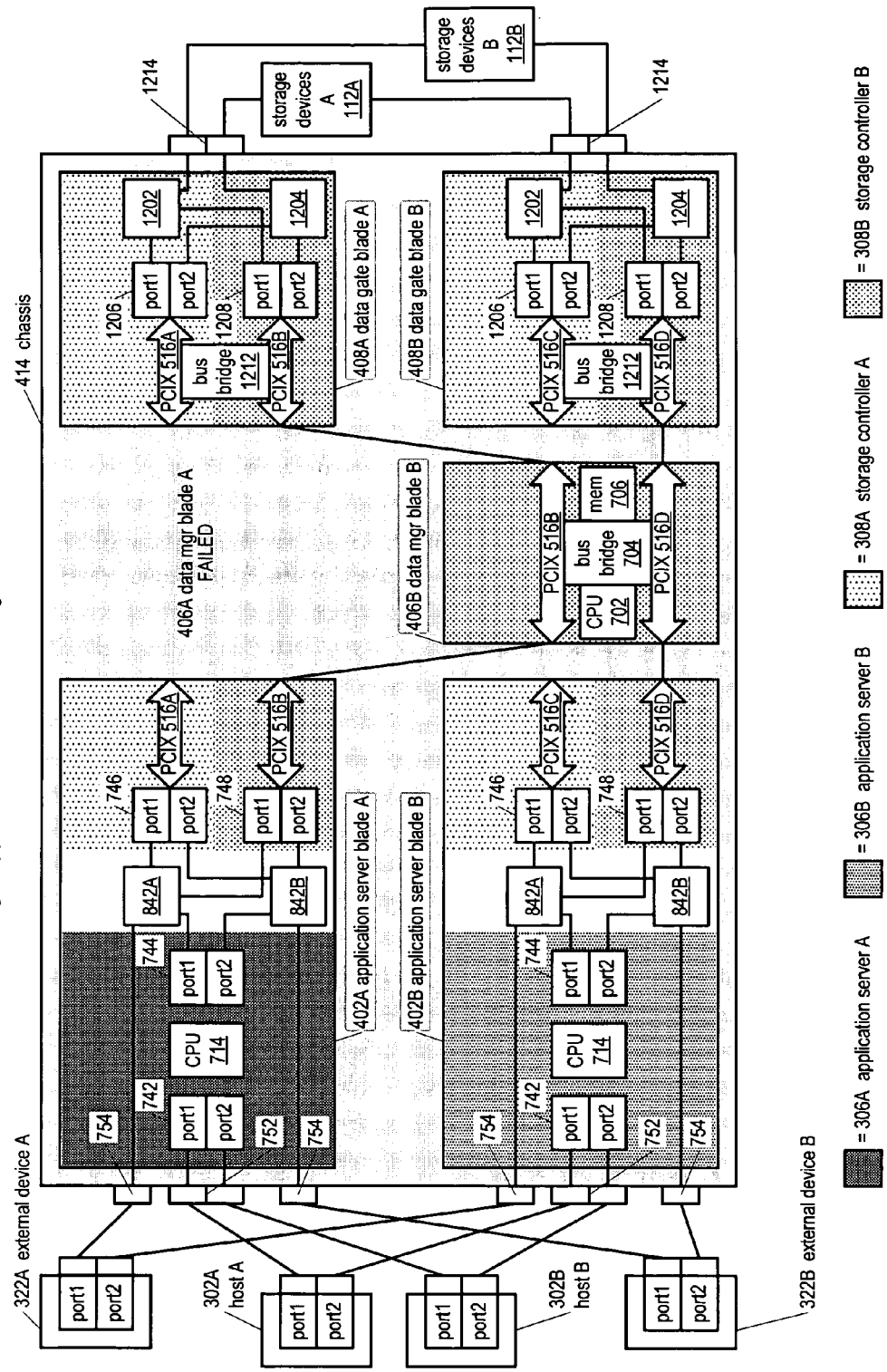
FIG. 14 is a block diagram illustrating the computer network of FIG. 12 in which a data manager blade has failed.
Figure 15:
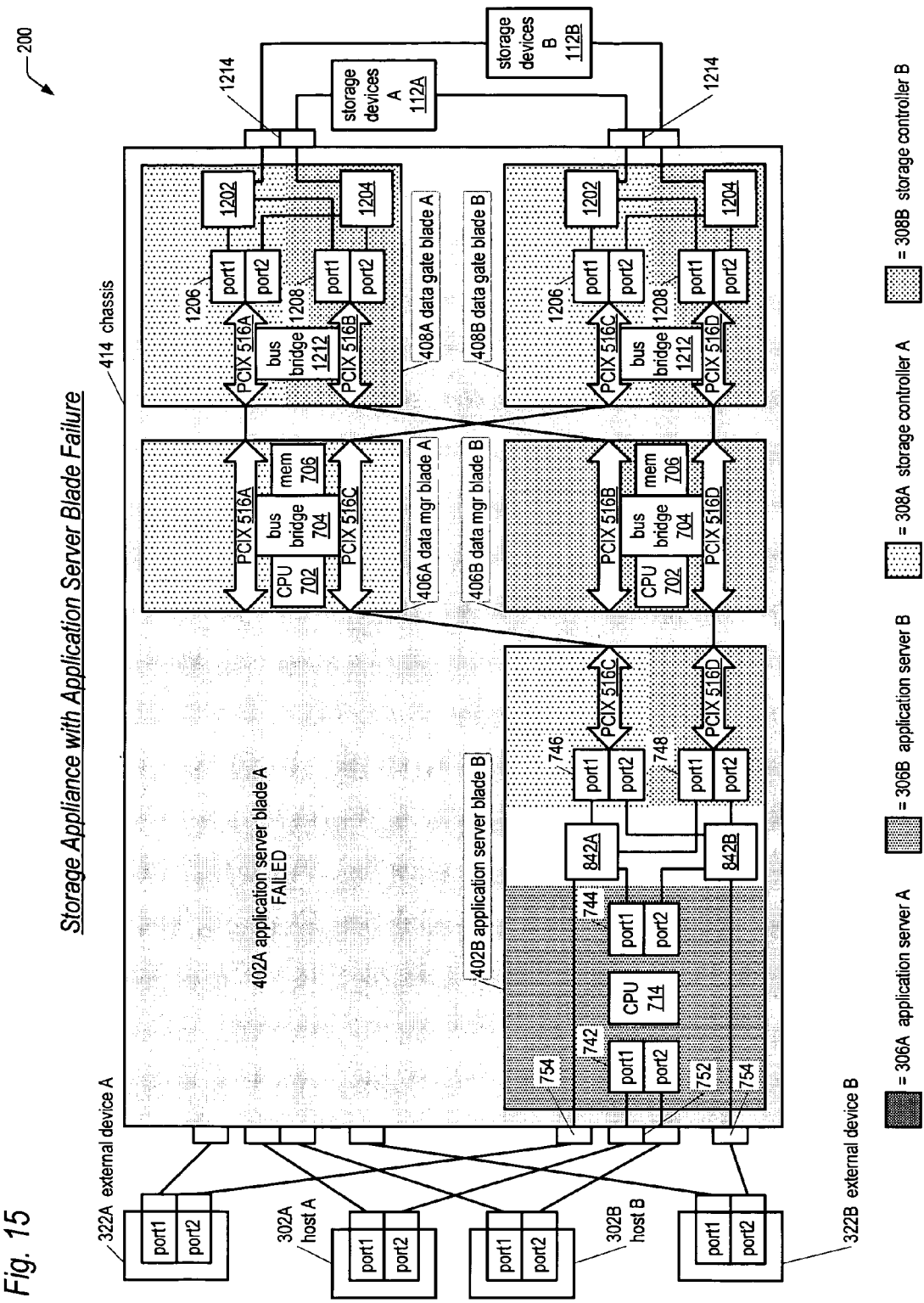
FIG. 15 is a block diagram illustrating the computer network of FIG. 12 in which an application server blade has failed.

Referring now to FIG. 12, a block diagram illustrating the storage appliance 202 of FIG. 5 in a fully fault-tolerant configuration in the computer network 200 of FIG. 2 is shown. That is, FIG. 12 illustrates a storage appliance 202 in which all blades are functioning properly. In contrast, FIGS. 13 through 15 illustrate the storage appliance 202 in which one of the blades has failed and yet due to the redundancy of the various blades, the storage appliance 202 continues to provide end-to-end connectivity, thereby maintaining the availability of the data stored on the storage devices 112. The storage appliance 202 comprises the chassis 414 of FIG. 4 for enclosing each of the blades included in FIG. 12. The embodiment of FIG. 12 includes a storage appliance 202 with two representative host computers 302A and 302B of FIG. 3 redundantly coupled to the storage appliance 202 via I/O connectors 752. Each of the host computers 302 includes two I/O ports, such as FibreChannel, Ethernet, Infiniband, or other high-speed I/O ports. Each host computer 302 has one of its I/O ports coupled to one of the I/O connectors 752 of application server blade A 402A and the other of its I/O ports coupled to one of the I/O connectors 752 of application server blade B 402B. Although the host computers 302 are shown directly connected to the application server blade 402 I/O connectors 752, the host computers 302 may be networked to a switch, router, or hub of network 114 that is coupled to the application server blade 402 I/O connectors 752/754.

The embodiment of FIG. 12 also includes two representative external devices 322 of FIG. 3 redundantly coupled to the storage appliance 202 via expansion I/O connectors 754.

Although the external devices 322 are shown directly connected to the application server blade 402 I/O connectors 754, the external devices 322 may be networked to a switch, router, or hub that is coupled to the application server blade 402 I/O connectors 754. Each external device 322 includes two I/O ports, such as FibreChannel, Ethernet, Infiniband, or other high-speed I/O ports. Each external device 322 has one of its I/O ports coupled to one of the expansion I/O connectors 754 of application server blade A 402A and the other of its I/O ports coupled to one of the expansion I/O connectors 754 of application server blade B 402B. The external devices 322 may include, but are not limited to, other host computers, a tape drive or other backup type device, a storage controller or storage appliance, a switch, a router, or a hub. The external devices 322 may communicate directly with the storage controllers 308 via the expansion I/O connectors 754 and port combiners 842 of FIG. 8, without the need for intervention by the application servers 306. Additionally, the application servers 306 may communicate directly with the external devices 322 via the port combiners 842 and expansion I/O connectors 754, without the need for intervention by the storage controllers 308. These direct communications are possible, advantageously, because the I/O link 304 between the second interface controller 744 ports of the application server 306 and the third interface controller 746 ports of storage controller A 308A and the I/O link 304 between the second interface controller 744 ports of the application server 306 and the fourth interface controller 748 ports of storage controller B 308B are externalized by the inclusion of the port combiners 842. That is, the port combiners 842 effectively create a blade area network (BAN) on the application server blade 402 that allows inclusion of the external devices 322 in the BAN to directly access the storage controllers 308. Additionally, the BAN enables the application servers 306 to directly access the external devices 322.

In one embodiment, the storage application software 1128 executing on the application server blades 402 includes storage virtualization/provisioning software and the external devices 322 include storage controllers and/or other storage appliances that are accessed by the second interface controllers 744 of the application servers 306 via port combiners 842 and expansion I/O port connectors 754. Advantageously, the virtualization/provisioning servers 306 may combine the storage devices controlled by the external storage controllers/appliances 322 and the storage devices 112 controlled by the internal storage controllers 308 when virtualizing/provisioning storage to the host computers 302.

In another embodiment, the storage application software 1128 executing on the application server blades 402 includes storage replication software and the external devices 322 include a remote host computer system on which the data is replicated that is accessed by the second interface controllers 744 of the application servers 306 via port combiners 842 and expansion I/O port connectors 754. If the remote site is farther away than the maximum distance supported by the I/O link type, then the external devices 322 may include a repeater or router to enable communication with the remote site.

In another embodiment, the storage application software 1128 executing on the application server blades 402 includes data backup software and the external devices 322 include a tape drive or tape farm, for backing up the data on the storage devices 112, which is accessed by the second interface controllers 744 of the application servers 306 via port combiners 842 and expansion I/O port connectors 754. The backup server 306 may also back up to the tape drives data of other storage devices on the network 200, such as direct attached storage of the host computers 302.

In another embodiment, the external devices 322 include host computers—or switches or routers or hubs to which host computers are networked—which directly access the storage controllers 308 via the third/fourth interface controllers 746/748 via expansion I/O connectors 754 and port combiners 842. In one embodiment, the storage controllers 308 may be configured to present, or zone, two different sets of logical storage devices, or logical units, to the servers 306 and to the external host computers 322.

The embodiment of FIG. 12 includes two groups of physical storage devices 112A and 112B each redundantly coupled to the storage appliance 202. In one embodiment, each physical storage device of the two groups of storage devices 112A and 112B includes two FC ports, for communicating with the storage appliance 202 via redundant FC arbitrated loops. For illustration purposes, the two groups of physical storage devices 112A and 112B may be viewed as two groups of logical storage devices 112A and 112B presented for access to the application servers 306 and to the external devices 322. The logical storage devices 112A and 112B may be comprised of a grouping of physical storage devices A 112A and/or physical storage devices B 112B using any of well-known methods for grouping physical storage devices, including but not limited to mirroring, striping, or other redundant array of inexpensive disks (RAID) methods. The logical storage devices 112A and 112B may also comprise a portion of a single physical storage device or a portion of a grouping of physical storage devices. In one embodiment, under normal operation, i.e., prior to a failure of one of the blades of the storage appliance 202, the logical storage devices A 112A are presented to the application servers 306 and to the external devices 322 by storage controller A 308A, and the logical storage devices B 112B are presented to the application servers 306 and external devices 322 by storage controller B 308B. However, as described below, if the data manager blade 406 of one of the storage controllers 308 fails, the logical storage devices 112A or 112B previously presented by the failing storage controller 308 will also be presented by the remaining, i.e., non-failing, storage controller 308. In one embodiment, the logical storage devices 112 are presented as SCSI logical units.

The storage appliance 202 physically includes two application server blades 402A and 402B of FIG. 7, two data manager blades 406A and 406B of FIG. 7, and two data gate blades 408A and 408B of FIG. 5. FIG. 12 is shaded to illustrate the elements of application server A 306A, application server B 306B, storage controller A 308A, and storage controller B 308B of FIG. 4 based on the key at the bottom of FIG. 12. Storage controller A 308A comprises data manager blade A 406A, the first interface controllers 1206 of the data gate blades 408, and the third interface controllers 746 of the application server blades 402; storage controller B 308B comprises data manager blade B 406B, the second interface controllers 1208 of the data gate blades 408, and the fourth interface controllers 748 of the application server blades 402; application server A 306A comprises CPU subsystem 714 and the first and second interface controllers 742/744 of application server blade A 402A; application server B 306B comprises CPU subsystem 714 and the first and second interface controllers 742/744 of application server blade B 402B. In one embodiment, during normal operation, each of the application server blades 402 accesses the physical storage devices 112 via each of the storage controllers 308 in order to obtain maximum throughput.

As in FIG. 7, each of the application server blades 402 includes first, second, third, and fourth dual channel FC controllers 742/744/746/748. Port1 of the first FC controller 742 of each application server blade 402 is coupled to a respective one of the I/O ports of host computer A 302A, and port2 of the first FC controller 742 of each application server blade 402 is coupled to a respective one of the I/O ports of host computer B 302B. Each of the application server blades 402 also includes a CPU subsystem 714 coupled to the first and second FC controllers 742/744. Port1 of each of the second, third, and fourth FC controllers 744/746/748 of each application server blade 402 are coupled to each other via port combiner 842A of FIG. 8, and port2 of each controller 744/746/748 of each application server blade 402 are coupled to each other via port combiners 842B of FIG. 8. As in FIG. 7, the third FC controller 746 of application server blade A 402A is coupled to PCIX bus 516A, the fourth FC controller 748 of application server blade A 402A is coupled to PCIX bus 516B, the third FC controller 746 of application server blade B 402B is coupled to PCIX bus 516C, and the fourth FC controller 748 of application server blade B 402B is coupled to PCIX bus 516D. The Ethernet interface controllers 732, CPLDs 712, and BCI buses 718 of FIG. 7 are not shown in FIG. 12.

As in FIG. 7, data manager blade A 406A includes a bus bridge/memory controller 704 that bridges PCIX bus 516A and PCIX bus 516C and controls memory 706, and data manager blade B 406B includes a bus bridge/memory controller 704 that bridges PCIX bus 516B and PCIX bus 516D and controls memory 706. Hence, the third FC controllers 746 of both application server blades 402A and 402B are coupled to transfer data to and from the memory 706 of data manager blade A 406A via PCIX buses 516A and 516C, respectively, and the fourth FC controllers 748 of both application server blades 402A and 402B are coupled to transfer data to and from the memory 706 of data manager blade B 406B via PCIX buses 516B and 516D, respectively. Additionally, the data manager blade A 406A CPU 702 of FIG. 7 is coupled to program the third FC controllers 746 of both the application server blades 402A and 402B via PCIX bus 516A and 516C, respectively, and the data manager blade B 406B CPU 702 of FIG. 7 is coupled to program the fourth FC controllers 748 of both the application server blades 402A and 402B via PCIX bus 516B and 516D, respectively.

Each of data gate blades 408A and 408B include first and second dual FC controllers 1206 and 1208, respectively. In one embodiment, the FC controllers 1206/1208 each comprise a JNIC-1560 Milano dual channel FibreChannel to PCI-X controller developed by the JNI Corporation™ that performs the FibreChannel protocol for transferring Fibre-Channel packets between the storage devices 112 and the storage appliance 202. The PCIX interface of the data gate blade A 408A first FC controller 1206 is coupled to PCIX bus 516A, the PCIX interface of the data gate blade A 408A second FC controller 1208 is coupled to PCIX bus 516B, the PCIX interface of the data gate blade B 408B first FC controller 1206 is coupled to PCIX bus 516C, and the PCIX interface of the data gate blade B 408B second FC controller 1208 is coupled to PCIX bus 516D. The first and second FC controllers 1206/1208 function as FC initiator devices for initiating commands to the storage devices 112. In one embodiment, such as the embodiment of FIG. 24, one or more of the first and second FC controllers 1206/1208 ports may function as FC target devices for receiving commands from other FC initiators, such as the external devices 322. In the embodiment of FIG. 12, a bus bridge 1212 of data gate blade A 408A couples PCIX buses 516A and 516B and a bus bridge 1212 of data gate blade B 408B couples PCIX buses 516C and 516D. Hence, the first FC controllers 1206 of both data gate blades 408A and 408B are coupled to transfer data to and from the memory 706 of data manager blade A 406A via PCIX buses 516A and 516C, respectively, and the second FC controllers 1208 of both data gate blades 408A and 408B are coupled to transfer data to and from the memory 706 of data manager blade B 406B via PCIX buses 516B and 516D, respectively. Additionally, the data manager blade A 406A CPU 702 of FIG. 7 is coupled to program the first FC controllers 1206 of both the data gate blades 408A and 408B via PCIX bus 516A and 516C, respectively, and the data manager blade B 406B CPU 702 of FIG. 7 is coupled to program the second FC controllers 1208 of both the data gate blades 408A and 408B via PCIX bus 516B and 516D, respectively.

In the embodiment of FIG. 12, port1 of each of the first and second interface controllers 1206/1208 of data gate blade A 408A and of storage devices B 112B is coupled to a port combiner 1202 of data gate blade A 408A, similar to the port combiner 842 of FIG. 8, for including each of the FC devices in a FC arbitrated loop configuration. Similarly, port2 of each of the first and second interface controllers 1206/1208 of data gate blade A 408A and of storage devices A 112A is coupled to a port combiner 1204 of data gate blade A 408A; port1 of each of the first and second interface controllers 1206/1208 of data gate blade B 408B and of storage devices A 112A is coupled to a port combiner 1202 of data gate blade B 408B; port2 of each of the first and second interface controllers 1206/1208 of data gate blade B 408B and of storage devices B 112B is coupled to a port combiner 1204 of data gate blade B 408B. In another embodiment, the storage devices 112 are coupled to the data gate blades 408 via point-to-point links through a FC loop switch. The port combiners 1202/1204 are coupled to external connectors 1214 to connect the storage devices 112 to the data gate blades 408. In one embodiment, the connectors 1214 comprise FC SFPs, similar to SFPs 752A and 752B of FIG. 7, for coupling to FC links to the storage devices 112.

Advantageously, the redundant storage controllers 308 and application servers 306 of the embodiment of FIG. 12 of the storage appliance 202 provide active-active failover fault-tolerance, as described below with respect to FIGS. 13 through 15 and 17 through 22, such that if any one of the storage appliance 202 blades fails, the redundant blade takes over for the failed blade to provide no loss of availability to data stored on the storage devices 112. In particular, if one of the application server blades 402 fails, the primary data manager blade 406 deterministically kills the failed application server blade 402, and programs the I/O ports of the third and fourth interface controllers 746/748 of the live application server blade 402 to take over the identity of the failed application server blade 402, such that the application server 306 second interface controller 744 (coupled to the third or fourth interface controllers 746/748 via the port combiners 842) and the external devices 322 (coupled to the third or fourth interface controllers 746/748 via the port combiners 842 and expansion I/O connectors 754) continue to have access to the data on the storage devices 112; additionally, the live application server blade 402 programs the I/O ports of the first interface controller 742 to take over the identity of the failed application server blade 402, such that the host computers 302 continue to have access to the data on the storage devices 112, as described in detail below.

FIGS. 13 through 15 will now be described. FIGS. 13 through 15 illustrate three different failure scenarios in which one blade of the storage appliance 202 has failed and how the storage appliance 202 continues to provide access to the data stored on the storage devices 112.

Referring now to FIG. 13, a block diagram illustrating the computer network 200 of FIG. 12 in which data gate blade 408A has failed is shown. FIG. 13 is similar to FIG. 12, except that data gate blade 408A is not shown in order to indicate that data gate blade 408A has failed. However, as may be seen, storage appliance 202 continues to make the data stored in the storage devices 112 available in spite of the failure of a data gate blade 408. In particular, data gate blade B 408B continues to provide a data path to the storage devices 112 for each of the data manager blades 406A and 406B. Data manager blade A 406A accesses data gate blade B 408B via PCIX bus 516C and data manager blade B 406B accesses data gate blade B 408B via PCIX bus 516D through the chassis 414 backplane 412. In one embodiment, data manager blade A 406A determines that data gate blade A 408A has failed because data manager blade A 406A issues a command to data gate blade A 408A and data gate blade A 408A has not completed the command within a predetermined time period. In another embodiment, data manager blade A 406A determines that data gate blade A 408A has failed because data manager blade A 406A determines that a heartbeat of data gate blade A 408A has stopped.

If data gate blade A 408A fails, the data manager blade A 406A CPU 702 programs the data gate blade B 408B first interface controller 1206 via data manager blade A 406A bus bridge 704 and PCIX bus 516C to access storage devices A 112A via data gate blade B 408B first interface controller 1206 port1, and data is transferred between storage devices A 112A and data manager blade A 406A memory 706 via data gate blade B 408B port combiner 1202, data gate blade B 408B first interface controller 1206 port1, PCIX bus 516C, and data manager blade A 406A bus bridge 704. Similarly, data manager blade A 406A CPU 702 programs the data gate blade B 408B first interface controller 1206 via data manager blade A 406A bus bridge 704 and PCIX bus 516C to access storage devices B 112B via data gate blade B 408B first interface controller 1206 port2, and data is transferred between storage devices B 112B and data manager blade A 406A memory 706 via data gate blade B 408B port combiner 1204, data gate blade B 408B first interface controller 1206 port2, PCIX bus 516C, and data manager blade A 406A bus bridge 704. Advantageously, the storage appliance 202 continues to provide availability to the storage devices 112 data until the failed data gate blade A 408A can be replaced by hot-unplugging the failed data gate blade A 408A from the chassis 414 backplane 412 and hot-plugging a new data gate blade A 408A into the chassis 414 backplane 412.

Referring now to FIG. 14, a block diagram illustrating the computer network 200 of FIG. 12 in which data manager blade A 406A has failed is shown. FIG. 14 is similar to FIG. 12, except that data manager blade A 406A is not shown in order to indicate that data manager blade A 406A has failed. However, as may be seen, storage appliance 202 continues to make the data stored in the storage devices 112 available in spite of the failure of a data manager blade 406. In particular, data manager blade B 406B provides a data path to the storage devices 112 for the application server blade A 402A CPU subsystem 714 and the external devices 322 via the application server blade A 402A fourth interface controller 748 and PCIX bus 516B; additionally, data manager blade B 406B continues to provide a data path to the storage devices 112 for the application server blade B 402B CPU subsystem 714 and external devices 322 via the application server blade B 402B fourth interface controller 748 and PCIX bus 516D, as described after a brief explanation of normal operation.

In one embodiment, during normal operation (i.e., in a configuration such as shown in FIG. 12 prior to failure of data manager blade A 406A), data manager blade A 406A owns the third interface controller 746 of each of the application server blades 402 and programs each of the ports of the third interface controllers 746 with an ID for identifying itself on its respective arbitrated loop, which includes itself, the corresponding port of the respective application server blade 402 second and fourth interface controllers 744/748, and any external devices 322 connected to the respective application server blade 402 corresponding expansion I/O connector 754. In one embodiment, the ID comprises a unique world-wide name. Similarly, data manager blade B 406B owns the fourth interface controller 748 of each of the application server blades 402 and programs each of the ports of the fourth interface controllers 748 with an ID for identifying itself on its respective arbitrated loop. Consequently, when a FC packet is transmitted on one of the arbitrated loops by one of the second interface controllers 744 or by an external device 322, the port of the third interface controller 746 or fourth interface controller 748 having the ID specified in the packet obtains the packet and provides the packet on the appropriate PCIX bus 516 to either data manager blade A 406A or data manager blade B 406B depending upon which of the data manager blades 406 owns the interface controller.

When data manager blade B 406B determines that data manager blade A 406A has failed, data manager blade B 406B disables the third interface controller 746 of each of the application server blades 402. In one embodiment, data manager blade B 406B disables, or inactivates, the application server blade 402 third interface controllers 746 via the BCI bus 718 and CPLD 712 of FIG. 7, such that the third interface controller 746 ports no longer respond to or transmit packets on their respective networks. Next, in one embodiment, data manager blade B 406B programs the fourth interface controllers 748 to add the FC IDs previously held by respective ports of the now disabled respective third interface controllers 746 to each of the respective ports of the respective fourth interface controllers 748 of the application server blades 402. This causes the fourth interface controllers 748 to impersonate, or take over the identity of, the respective now disabled third interface controller 746 ports. That is, the fourth interface controller 748 ports respond as targets of FC packets specifying the new IDs programmed into them, which IDs were previously programmed into the now disabled third interface controller 746 ports. In addition, the fourth interface controllers 748 continue to respond as targets of FC packets with their original IDs programmed at initialization of normal operation. Consequently, commands and data previously destined for data manager blade A 406A via the third interface controllers 746 are obtained by the relevant fourth interface controller 748 and provided to data manager blade B 406B. Additionally, commands and data previously destined for data manager blade B 406B via the fourth interface controllers 748 continue to be obtained by the relevant fourth interface controller 748 and provided to data manager blade B 406B. This operation is referred to as a multi-ID operation since the ports of the non-failed data gate blade 408 fourth interface controllers 748 are programmed with multiple FC IDs and therefore respond to two FC IDs per port rather than one. Additionally, as described above, in one embodiment, during normal operation, data manager blade A 406A and data manager blade B 406B present different sets of logical storage devices to the application servers 306 and external devices 322 associated with the FC IDs held by the third and fourth interface controllers 746/748. Advantageously, when data manager blade A 406A fails, data manager blade B 406B continues to present the sets of logical storage devices to the application servers 306 and external devices 322 associated with the FC IDs according to the pre-failure ID assignments using the multi-ID operation.

Data manager blade B 406B CPU 702 programs the application server blade A 402A fourth interface controller 748 via data manager blade B 406B bus bridge 704 and PCIX bus 516B and programs the application server blade B 402B fourth interface controller 748 via data manager blade B 406B bus bridge 704 and PCIX bus 516D; data is transferred between application server blade A 402A CPU subsystem 714 memory 806 of FIG. 8 and data manager blade B 406B memory 706 via application server blade A 402A second interface controller 744, port combiner 842A or 842B, application server blade A 402A fourth interface controller 748, PCIX bus 516B, and data manager blade B 406B bus bridge 704; data is transferred between application server blade B 402B CPU subsystem 714 memory 806 of FIG. 8 and data manager blade B 406B memory 706 via application server blade B 402B second interface controller 744, port combiner 842A or 842B, application server blade B 402B fourth interface controller 748, PCIX bus 516D, and data manager blade B 406B bus bridge 704; data may be transferred between the application server blade A 402A expansion I/O connectors 754 and data manager blade B 406B memory 706 via port combiner 842A or 842B, application server blade A 402A fourth interface controller 748, PCIX bus 516B, and data manager blade B 406B bus bridge 704; data may be transferred between the application server blade B 402B expansion I/O connectors 754 and data manager blade B 406B memory 706 via port combiner 842A or 842B, application server blade B 402B fourth interface controller 748, PCIX bus 516D, and data manager blade B 406B bus bridge 704.

Furthermore, if data manager blade A 406A fails, data manager blade B 406B continues to provide a data path to the storage devices 112 via both data gate blade A 408A and data gate blade B 408B via PCIX bus 516B and 516D, respectively, for each of the application server blade 402 CPU subsystems 714 and for the external devices 322. In particular, the data manager blade B 406B CPU 702 programs the data gate blade A 408A second interface controller 1208 via data manager blade B 406B bus bridge 704 and PCIX bus 516B to access the storage devices 112 via data gate blade A 408A second interface controller 1208; and data is transferred between the storage devices 112 and data manager blade B 406B memory 706 via data gate blade A 408A port combiner 1202 or 1204, data gate blade A 408A second interface controller 1208, PCIX bus 516B, and data manager blade B 406B bus bridge 704. Similarly, the data manager blade B 406B CPU 702 programs the data gate blade B 408B second interface controller 1208 via data manager blade B 406B bus bridge 704 and PCIX bus 516D to access the storage devices 112 via data gate blade B 408B second interface controller 1208; and data is transferred between the storage devices 112 and data manager blade B 406B memory 706 via data gate blade B 408B port combiner 1202 or 1204, data gate blade B 408B second interface controller 1208, PCIX bus 516D, and data manager blade B 406B bus bridge 704. Advantageously, the storage appliance 202 continues to provide availability to the storage devices 112 data until the failed data manager blade A 406A can be replaced by removing the failed data manager blade A 406A from the chassis 414 backplane 412 and hot-plugging a new data manager blade A 406A into the chassis 414 backplane 412.

In one embodiment, the backplane 412 includes dedicated out-of-band signals used by the data manager blades 406 to determine whether the other data manager blade 406 has failed or been removed from the chassis 414. One set of backplane 412 signals includes a heartbeat signal generated by each of the data manager blades 406. Each of the data manager blades 406 periodically toggles a respective backplane 412 heartbeat signal to indicate it is functioning properly. Each of the data manager blades 406 periodically examines the heartbeat signal of the other data manager blade 406 to determine whether the other data manager blade 406 is functioning properly. In addition, the backplane 412 includes a signal for each blade of the storage appliance 202 to indicate whether the blade is present in the chassis 414. Each data manager blade 406 examines the presence signal for the other data manager blade 406 to determine whether the other data manager blade 406 has been removed from the chassis 414. In one embodiment, when one of the data manager blades 406 detects that the other data manager blade 406 has failed, e.g., via the heartbeat signal, the non-failed data manager blade 406 asserts and holds a reset signal to the failing data manager blade 406 via the backplane 412 in order to disable the failing data manager blade 406 to reduce the possibility of the failing data manager blade 406 disrupting operation of the storage appliance 202 until the failing data manager blade 406 can be replaced, such as by hot-swapping.

Referring now to FIG. 15, a block diagram illustrating the computer network 200 of FIG. 12 in which application server blade A 402A has failed is shown. FIG. 15 is similar to FIG. 12, except that application server blade A 402A is not shown in order to indicate that application server blade A 402A has failed. However, as may be seen, storage appliance 202 continues to make the data stored in the storage devices 112 available in spite of the failure of an application server blade 402. In particular, application server blade B 402B provides a data path to the storage devices 112 for the host computers 302 and external devices 322.

If application server blade A 402A fails, application server blade B 402B continues to provide a data path to the storage devices 112 via both data manager blade A 406A and data manager blade B 406B via PCIX bus 516C and 516D, respectively, for the application server blade B 402B CPU subsystem 714 and the external devices 322. In particular, the data manager blade A 406A CPU 702 programs the application server blade B 402B third interface controller 746 via bus bridge 704 and PCIX bus 516C; data is transferred between the data manager blade A 406A memory 706 and the application server blade B 402B CPU subsystem 714 memory 806 of FIG. 8 via data manager blade A 406A bus bridge 704, PCIX bus 516C, application server blade B 402B third interface controller 746, port combiner 842A or 842B, and application server blade B 402B second interface controller 744; data is transferred between the data manager blade A 406A memory 706 and the external devices 322 via data manager blade A 406A bus bridge 704, PCIX bus 516C, application server blade B 402B third interface controller 746, and port combiner 842A or 842B; data is transferred between the application server blade B 402B memory 806 and host computer A 302A via port1 of the application server blade B 402B first interface controller 742; and data is transferred between the application server blade B 402B memory 806 and host computer B 302B via port2 of the application server blade B 402B first interface controller 742.

Host computer A 302A, for example among the host computers 302, re-routes requests to application server blade B 402B I/O connector 752 coupled to port1 of the first interface controller 742 in one of two ways.

In one embodiment, host computer A 302A includes a device driver that resides in the operating system between the filesystem software and the disk device drivers, which monitors the status of I/O paths to the storage appliance 202. When the device driver detects a failure in an I/O path, such as between host computer A 302A and application server A 306A, the device driver begins issuing I/O requests to application server B 306B instead. An example of the device driver is software substantially similar to the DynaPath agent product developed by FalconStor Software, Inc.

In a second embodiment, application server blade B 402B detects the failure of application server blade A 402A, and reprograms the ports of its first interface controller 742 to take over the identity of the first interface controller 742 of now failed application server blade A 402A via a multi-ID operation. Additionally, the data manager blades 406 reprogram the ports of the application server blade B 402B third and fourth interface controllers 746/748 to take over the identities of the third and fourth interface controllers 746/748 of now failed application server blade A 402A via a multi-ID operation. This embodiment provides failover operation in a configuration in which the host computers 302 and external devices 322 are networked to the storage appliance 202 via a switch or router via network 114. In one embodiment, the data manager blades 406 detect the failure of application server blade A 402A and responsively inactivate application server blade A 402A to prevent it from interfering with application server blade B 402B taking over the identity of application server blade A 402A. Advantageously, the storage appliance 202 continues to provide availability to the storage devices 112 data until the failed application server blade A 402A can be replaced by removing the failed application server blade A 402A from the chassis 414 backplane 412 and hot-replacing a new application server blade A 402A into the chassis 414 backplane 412. The descriptions associated with FIGS. 17 through 22 provide details of how the data manager blades 406 determine that an application server blade 402 has failed, how the data manager blades 406 inactivate the failed application server blade 406, and how the identity of the failed application server blade 406 is taken over by the remaining application server blade 406.

Figure 16:
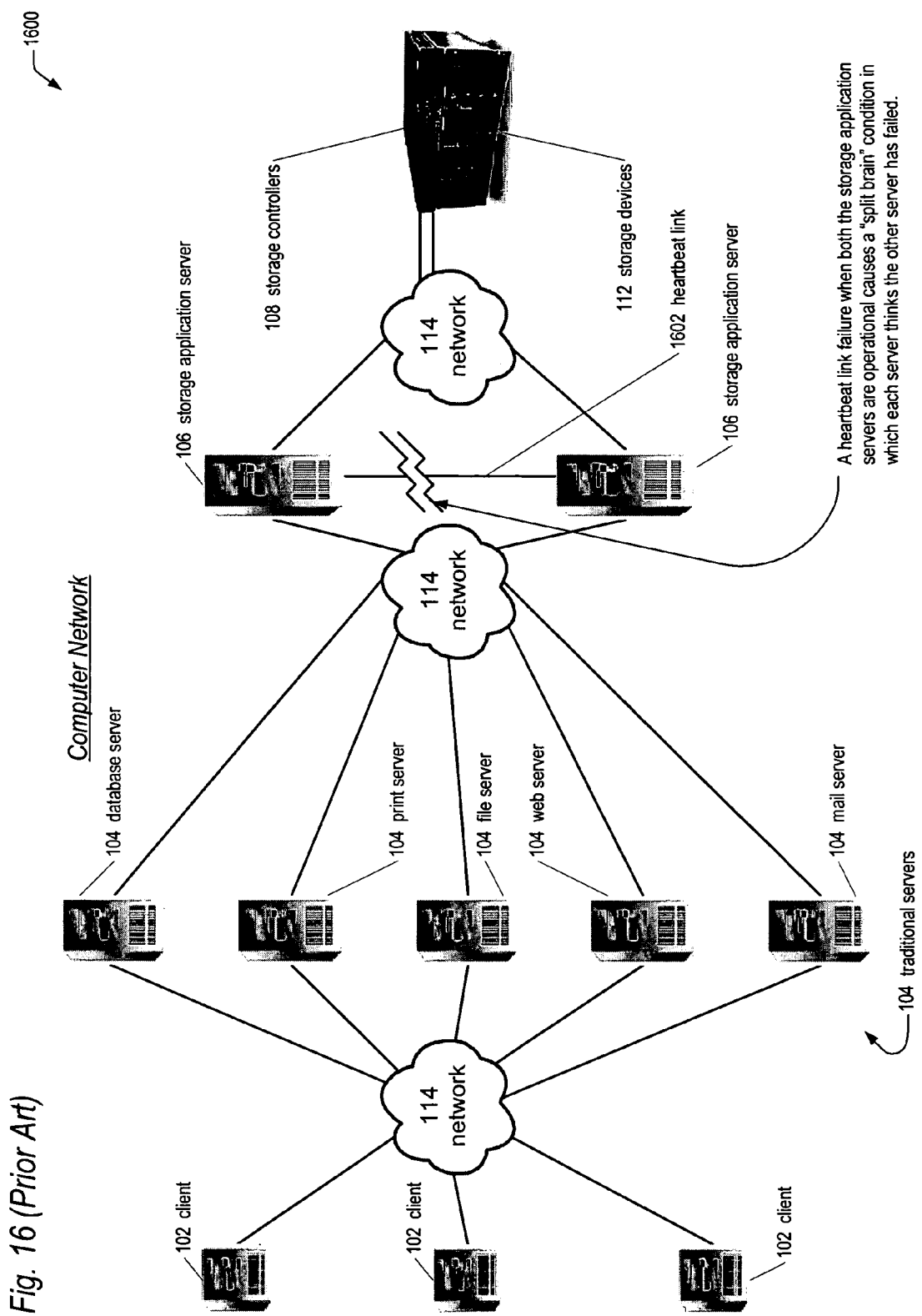
FIG. 16 is a diagram of a prior art computer network.

Referring now to FIG. 16, a diagram of a prior art computer network 1600 is shown. The computer network 1600 of FIG. 16 is similar to the computer network 100 of FIG. 1 and like-numbered items are alike. However, the computer network 1600 of FIG. 16 also includes a heartbeat link 1602 coupling the two storage application servers 106, which are redundant active-active failover servers. That is, the storage application servers 106 monitor one another's heartbeat via the heartbeat link 1602 to detect a failure in the other storage application server 106. If one of the storage application servers 106 fails as determined from the heartbeat link 1602, then the remaining storage application server 106 takes over the identify of the other storage application server 106 on the network 114 and services requests in place of the failed storage application server 106. Typically, the heartbeat link 1602 is an Ethernet link or FibreChannel link. That is, each of the storage application servers 106 includes an Ethernet or FC controller for communicating its heartbeat on the heartbeat link 1602 to the other storage application server 106. Each of the storage application servers 106 periodically transmits the heartbeat to the other storage application server 106 to indicate that the storage application server 106 is still operational. Similarly, each storage application server 106 periodically monitors the heartbeat from the other storage application server 106 to determine whether the heartbeat stopped, and if so, infers a failure of the other storage application server 106. In response to inferring a failure, the remaining storage application server 106 takes over the identity of the failed storage application server 106 on the network 114, such as by taking on the MAC address, world wide name, or IP address of the failed storage application server 106.

As indicated in FIG. 16, a situation may occur in which both storage application servers 106 are fully operational and yet a failure occurs on the heartbeat link 1602. For example, the heartbeat link 1602 cable may be damaged or disconnected. In this situation, each server 106 infers that the other server 106 has failed because it no longer receives a heartbeat from the other server 106. This condition may be referred to as a "split brain" condition. An undesirable consequence of this condition is that each server 106 attempts to take over the identity of the other server 106 on the network 114, potentially causing lack of availability of the data on the storage devices 112 to the traditional server 104 and clients 102.

A means of minimizing the probability of encountering the split brain problem is to employ dual heartbeat links. However, even this solution is not a deterministic solution since the possibility still exists that both heartbeat links will fail. Advantageously, an apparatus, system and method for deterministically solving the split brain problem are described herein.

A further disadvantage of the network 1600 of FIG. 16 will now be described. A true failure occurs on one of the storage application servers 106 such that the failed server 106 no longer transmits a heartbeat to the other server 106. In response, the non-failed server 106 sends a command to the failed server 106 on the heartbeat link 1602 commanding the failed server 106 to inactivate itself, i.e., to abandon its identity on the network 114, namely by not transmitting or responding to packets on the network 114 specifying its ID. The non-failed server 106 then attempts to take over the identity of the failed server 106 on the network 114. However, the failed server 106 may not be operational enough to receive and perform the command to abandon its identity on the network 114; yet, the failed server 106 may still be operational enough to maintain its identity on the network, namely to transmit and/or respond to packets on the network 114 specifying its ID. Consequently, when the non-failed server 106 attempts to take over the identity of the failed server 106, this may cause lack of availability of the data on the storage devices 112 to the traditional server 104 and clients 102. Advantageously, an apparatus, system and method for the non-failed server 106 to deterministically inactivate on the network 114 a failed application server 306 integrated into the storage appliance 202 of FIG. 2 is described herein.

Figure 17:
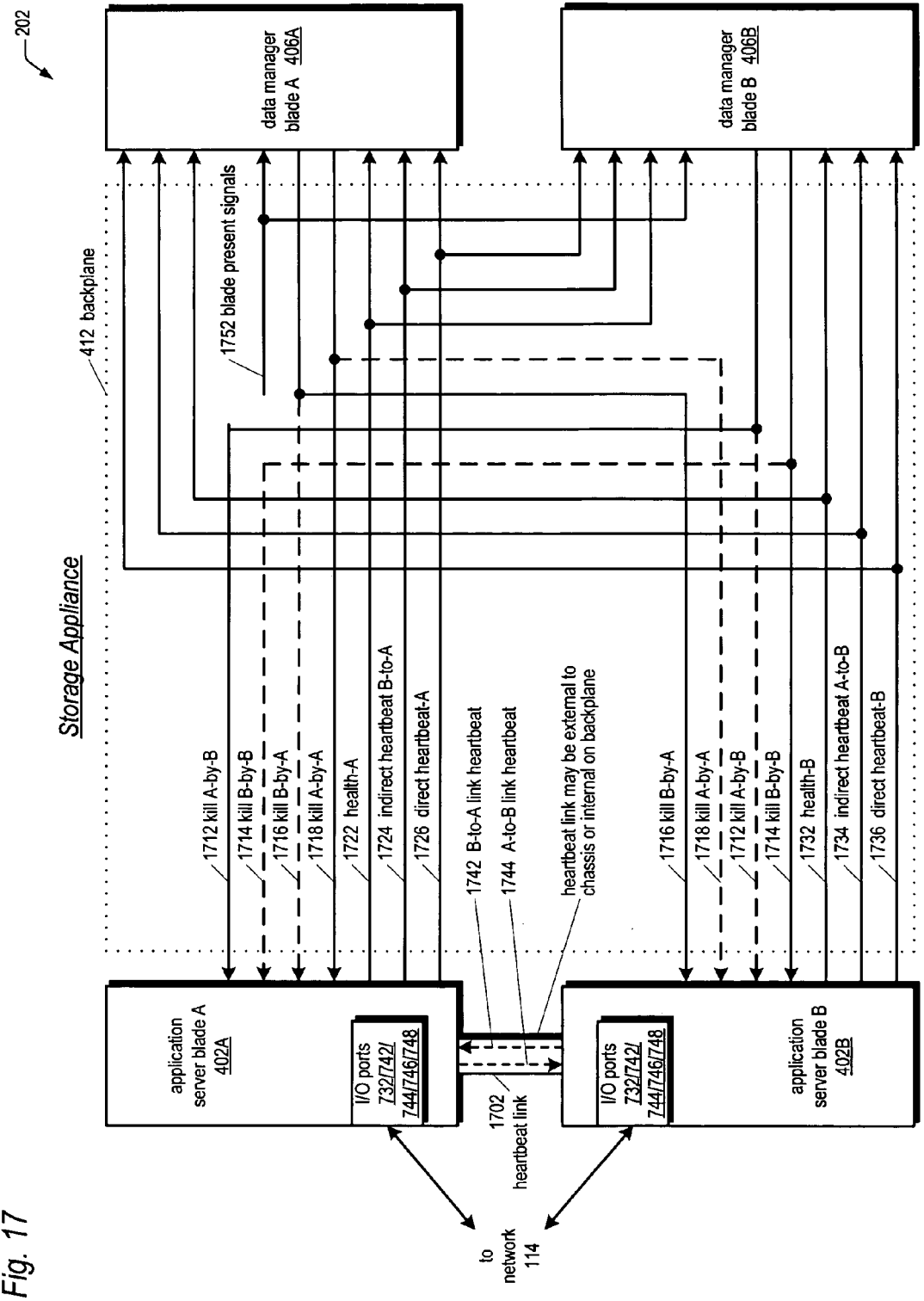
FIG. 17 is a block diagram illustrating the storage appliance of FIG. 2.

Referring now to FIG. 17, a block diagram illustrating the storage appliance 202 of FIG. 2 is shown. The storage appliance 202 of FIG. 17 includes application server blade A 402A, application server blade B 402B, data manager blade A 406A, data manager blade B 406B, and backplane 412 of FIG. 4. The storage appliance 202 also includes a heartbeat link 1702 coupling application server blade A 402A and application server blade B 402B. The heartbeat link 1702 of FIG. 17 serves a similar function as the heartbeat link 1602 of FIG. 16. In one embodiment, the heartbeat link 1702 may comprise a link external to the storage appliance 202 chassis 414 of FIG. 4, such as an Ethernet link coupling an Ethernet port of the Ethernet interface controller 732 of FIG. 7 of each of the application server blades 402, or such as a FC link coupling a FC port of the first FC interface controller 742 of FIG. 7 of each of the application server blades 402, or any other suitable communications link for transmitting and receiving a heartbeat. In another embodiment, the heartbeat link 1702 may comprise a link internal to the storage appliance 202 chassis 414, and in particular, may be comprised in the backplane 412. In this embodiment, a device driver sends the heartbeat over the internal link. By integrating the application server blades 402 into the storage appliance 202 chassis 414, the heartbeat link 1702 advantageously may be internal to the chassis 414, which is potentially more reliable than an external heartbeat link 1702. Application server blade A 402A transmits on heartbeat link 1702 to application server blade B 402B an A-to-B link heartbeat 1744, and application server blade B 402B transmits on heartbeat link 1702 to application server blade A 402A a B-to-A link heartbeat 1742. In one of the internal heartbeat link 1702 embodiments, the heartbeat link 1702 comprises discrete signals on the backplane 412.

Each of the data manager blades 406 receives a blade present status indicator 1752 for each of the blade slots of the chassis 414. Each of the blade present status indicators 1752 indicates whether or not a blade—such as the application server blades 402, data manager blades 406, and data gate blades 408—are present in the respective slot of the chassis 414. That is, whenever a blade is removed from a slot of the chassis 414, the corresponding blade present status indicator 1752 indicates the slot is empty, and whenever a blade is inserted into a slot of the chassis 414, the corresponding blade present status indicator 1752 indicates that a blade is present in the slot.

Application server blade A 402A generates a health-A status indicator 1722, which is provided to each of the data manager blades 406, to indicate the health of application server blade A 402A. In one embodiment, the health comprises a three-bit number indicating the relative health (7 being totally healthy, 0 being least healthy) of the application server blade A 402A based on internal diagnostics periodically executed by the application server blade A 402A to diagnose its health. That is, some subsystems of application server blade A 402A may be operational, but others may not, resulting in the report of a health lower than totally healthy. Application server blade B 402B generates a similar status indicator, denoted health-B status indicator 1732, which is provided to each of the data manager blades 406, to indicate the health of application server blade B 402B.

Application server blade A 402A also generates a direct heartbeat-A status indicator 1726, corresponding to the A-to-B link heartbeat 1744, but which is provided directly to each of the data manager blades 406 rather than to application server blade B 402B. That is, when application server blade A 402A is operational, it generates a heartbeat both to application server blade B 402B via A-to-B link heartbeat 1744 and to each of the data manager blades 406 via direct heartbeat-A 1726. Application server blade B 402B generates a similar direct heartbeat-B status indicator 1736, which is provided directly to each of the data manager blades 406.

Application server blade A 402A generates an indirect heartbeat B-to-A status indicator 1724, which is provided to each of the data manager blades 406. The indirect heartbeat B-to-A status indicator 1724 indicates the receipt of B-to-A link heartbeat 1742. That is, when application server blade A 402A receives a B-to-A link heartbeat 1742, application server blade A 402A generates a heartbeat on indirect heartbeat B-to-A status indicator 1724, thereby enabling the data manager blades 406 to determine whether the B-to-A link heartbeat 1742 is being received by application server blade A 402A. Application server blade B 402B generates an indirect heartbeat A-to-B status indicator 1734, similar to indirect heartbeat B-to-A status indicator 1724, which is provided to each of the data manager blades 406 to indicate the receipt of A-to-B link heartbeat 1744. The indirect heartbeat B-to-A status indicator 1724 and indirect heartbeat A-to-B status indicator 1734, in conjunction with the direct heartbeat-A status indicator 1726 and direct heartbeat-B status indicator 1736, enable the data manager blades 406 to deterministically detect when a split brain condition has occurred, i.e., when a failure of the heartbeat link 1702 has occurred although the application server blades 402 are operational.

Data manager blade B 406B generates a kill A-by-B control 1712 provided to application server blade A 402A to kill, or inactivate, application server blade A 402A. In one embodiment, killing or inactivating application server blade A 402A denotes inactivating the I/O ports of the application server blade A 402A coupling the application server blade A 402A to the network 114, particularly the ports of the interface controllers 732/742/744/746/748 of FIG. 7. The kill A-by-B control 1712 is also provided to application server blade B 402B as a status indicator to indicate to application server blade B 402B whether data manager blade B 406B has killed application server blade A 402A. Data manager blade B 406B also generates a kill B-by-B control 1714 provided to application server blade B 402B to kill application server blade B 402B, which is also provided to application server blade A 402A as a status indicator. Similarly, data manager blade A 406A generates a kill B-by-A control 1716 provided to application server blade B 402B to kill application server blade B 402B, which is also provided to application server blade A 402A as a status indicator, and data manager blade A 406A generates a kill A-by-A control 1718 provided to application server blade A 402A to kill application server blade A 402A, which is also provided to application server blade B 402B as a status indicator.

Advantageously, the kill controls 1712-1718 deterministically inactivate the respective application server blade 402. That is, the kill controls 1712-1718 inactivate the application server blade 402 without requiring any operational intelligence or state of the application server blade 402, in contrast to the system of FIG. 16, in which the failed storage application server 106 must still have enough operational intelligence or state to receive the command from the non-failed storage application server 106 to inactivate itself.

In one embodiment, a data manager blade 406 kills an application server blade 402 by causing power to be removed from the application server blade 402 specified for killing. In this embodiment, the kill controls 1712-1718 are provided on the backplane 412 to power modules, such as power manager blades 416 of FIG. 4, and instruct the power modules to remove power from the application server blade 402 specified for killing.

The status indicators and controls shown in FIG. 17 are logically illustrated. In one embodiment, logical status indicators and controls of FIG. 17 correspond to discrete signals on the backplane 412. However, other means may be employed to generate the logical status indicators and controls. For example, in one embodiment, the blade control interface (BCI) buses 718 and CPLDs 712 shown in FIGS. 7, 21, and 22 may be employed to generate and receive the logical status indicators and controls shown in FIG. 17. Operation of the status indicators and controls of FIG. 17 will now be described with respect to FIGS. 18 through 20.

Figure 18:
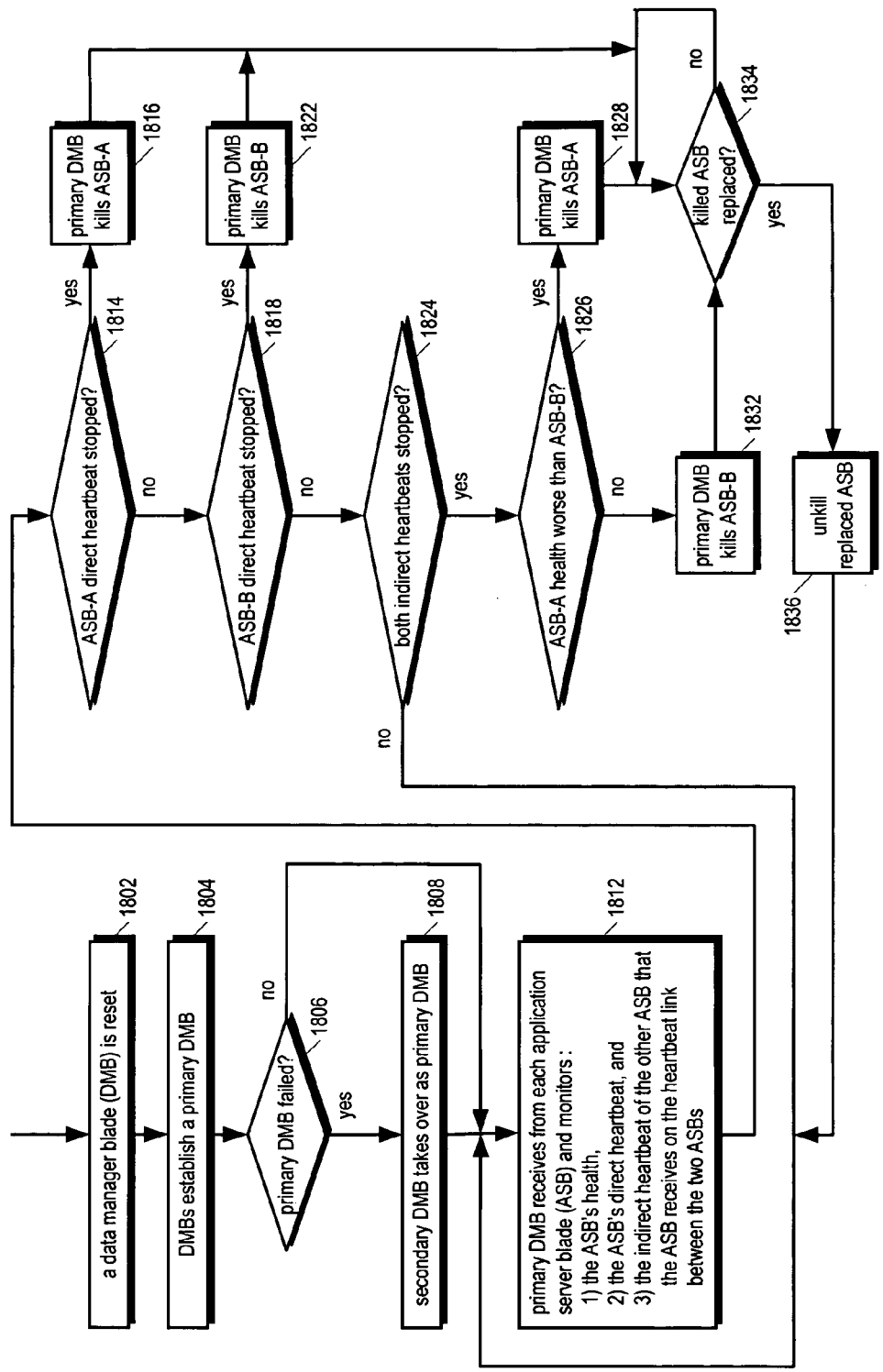
FIG. 18 is a flowchart illustrating fault-tolerant active-active failover of the application server blades of the storage appliance of FIG. 17.

Referring now to FIG. 18, a flowchart illustrating fault-tolerant active-active failover of the application server blades 402 of the storage appliance 202 of FIG. 17 is shown. FIG. 18 primarily describes the operation of the data manager blades 406, whereas FIGS. 19 and 20 primarily describe the operation of the application server blades 402. Flow begins at block 1802.

At block 1802, one or more of the data manager blades 406 is reset. The reset may occur because the storage appliance 202 is powered up, or because a data manager blade 406 is hot-plugged into a chassis 414 slot, or because one data manager blade 406 reset the other data manager blade 406. Flow proceeds to block 1804.

At block 1804, the data manager blades 406 establish between themselves a primary data manager blade 406. In particular, the primary data manager blade 406 is responsible for monitoring the health and heartbeat-related status indicators of FIG. 17 from the application server blades 402 and deterministically killing one of the application server blades 402 in the event of a heartbeat link 1702 failure or application server blade 402 failure in order to deterministically accomplish active-active failover of the application server blades 402. Flow proceeds to decision block 1806.

At decision block 1806, the data manager blades 406 determine whether the primary data manager blade 406 has failed. If so, flow proceeds to block 1808; otherwise, flow proceeds to block 1812.

At block 1808, the secondary data manager blade 406 becomes the primary data manager blade 406 in place of the failed data manager blade 406. Flow proceeds to block 1812.

At block 1812, the primary data manager blade 406 (and secondary data manager blade 406 if present) receives and monitors the status indicators from each application server blade 402. In particular, the primary data manager blade 406 receives the health-A 1722, health-B 1732, indirect heartbeat B-to-A 1724, indirect heartbeat A-to-B 1734, direct heartbeat A 1726, and direct heartbeat B 1736 status indicators of FIG. 17. Flow proceeds to decision block 1814.

At decision block 1814, the primary data manager blade 406 determines whether direct heartbeat A 1726 has stopped. If so, flow proceeds to block 1816; otherwise, flow proceeds to decision block 1818.

At block 1816, the primary data manager blade 406 kills application server blade A 402A. That is, if data manager blade A 406A is the primary data manager blade 406, then data manager blade A 406A kills application server blade A 402A via the kill A-by-A control 1718, and if data manager blade B 406B is the primary data manager blade 406, then data manager blade B 406B kills application server blade A 402A via the kill A-by-B control 1712. As described herein, various embodiments are described for the primary data manager blade 406 to kill the application server blade 402, such as by resetting the application server blade 402 or by removing power from it. In particular, the primary data manager blade 406 causes the application server blade 402 to be inactive on its network 114 I/O ports, thereby enabling the remaining application server blade 402 to reliably assume the identity of the killed application server blade 402 on the network 114. Flow proceeds to decision block 1834.

At decision block 1818, the primary data manager blade 406 determines whether direct heartbeat B 1736 has stopped. If so, flow proceeds to block 1822; otherwise, flow proceeds to decision block 1824.

At block 1822, the primary data manager blade 406 kills application server blade B 402B. That is, if data manager blade A 406A is the primary data manager blade 406, then data manager blade A 406A kills application server blade B 402B via the kill B-by-A control 1716, and if data manager blade B 406B is the primary data manager blade 406, then data manager blade B 406B kills application server blade B 402B via the kill B-by-B control 1714. Flow proceeds to decision block 1834.

At decision block 1824, the primary data manager blade 406 determines whether both indirect heartbeat B-to-A 1724 and indirect heartbeat A-to-B 1734 have stopped (i.e., the heartbeat link 1702 has failed or both servers have failed). If so, flow proceeds to decision block 1826; otherwise, flow returns to block 1812.

At decision block 1826, the primary data manager blade 406 examines the health-A status 1722 and health-B status 1732 to determine whether the health of application server blade A 402A is worse than the health of application server blade B 402B. If so, flow proceeds to block 1828; otherwise, flow proceeds to block 1832.

At block 1828, the primary data manager blade 406 kills application server blade A 402A. Flow proceeds to decision block 1834.

At block 1832, the primary data manager blade 406 kills application server blade B 402B. It is noted that block 1832 is reached in the case that both of the application server blades 402 are operational and totally healthy but the heartbeat link 1702 is failed. In this case, as with all the failure cases, the system management subsystem of the data manager blades 406 notifies the system administrator that a failure has occurred and should be remedied. Additionally, in one embodiment, status indicators on the faceplates of the application server blades 402 may be lit to indicate a failure of the heartbeat link 1702. Flow proceeds to decision block 1834.

At decision block 1834, the primary data manager blade 406 determines whether the killed application server blade 402 has been replaced. In one embodiment, the primary data manager blade 406 determines whether the killed application server blade 402 has been replaced by detecting a transition on the blade present status indicator 1752 of the slot corresponding to the killed application server blade 402 from present to not present and then to present again. If decision block 1834 was arrived at because of a failure of the heartbeat link 1702, then the administrator may repair the heartbeat link 1702, and then simply remove and then re-insert the killed application server blade 402. If the killed application server blade 402 has been replaced, flow proceeds to block 1836; otherwise, flow returns to decision block 1834.

At block 1836, the primary data manager blade 406 unkills the replaced application server blade 402. In one embodiment, unkilling the replaced application server blade 402 comprises releasing the relevant kill control 1712/1714/1716/1718 in order to bring the killed application server blade 402 out of a reset state. Flow returns to block 1812.

Other embodiments are contemplated in which the primary data manager blade 406 determines a failure of an application server blade 402 at decision blocks 1814 and 1818 by means other than the direct heartbeats 1726/1736. For example, the primary data manager blade 406 may receive an indication (such as from temperature sensors 816 of FIG. 8) that the temperature of one or more of the components of the application server blade 402 has exceeded a predetermined limit. Furthermore, the direct heartbeat status indicator 1726/1736 of an application server blade 402 may stop for any of various reasons including, but not limited to, a failure of the CPU subsystem 714 or a failure of one of the I/O interface controllers 732/742/744/746/748.

Figure 19:
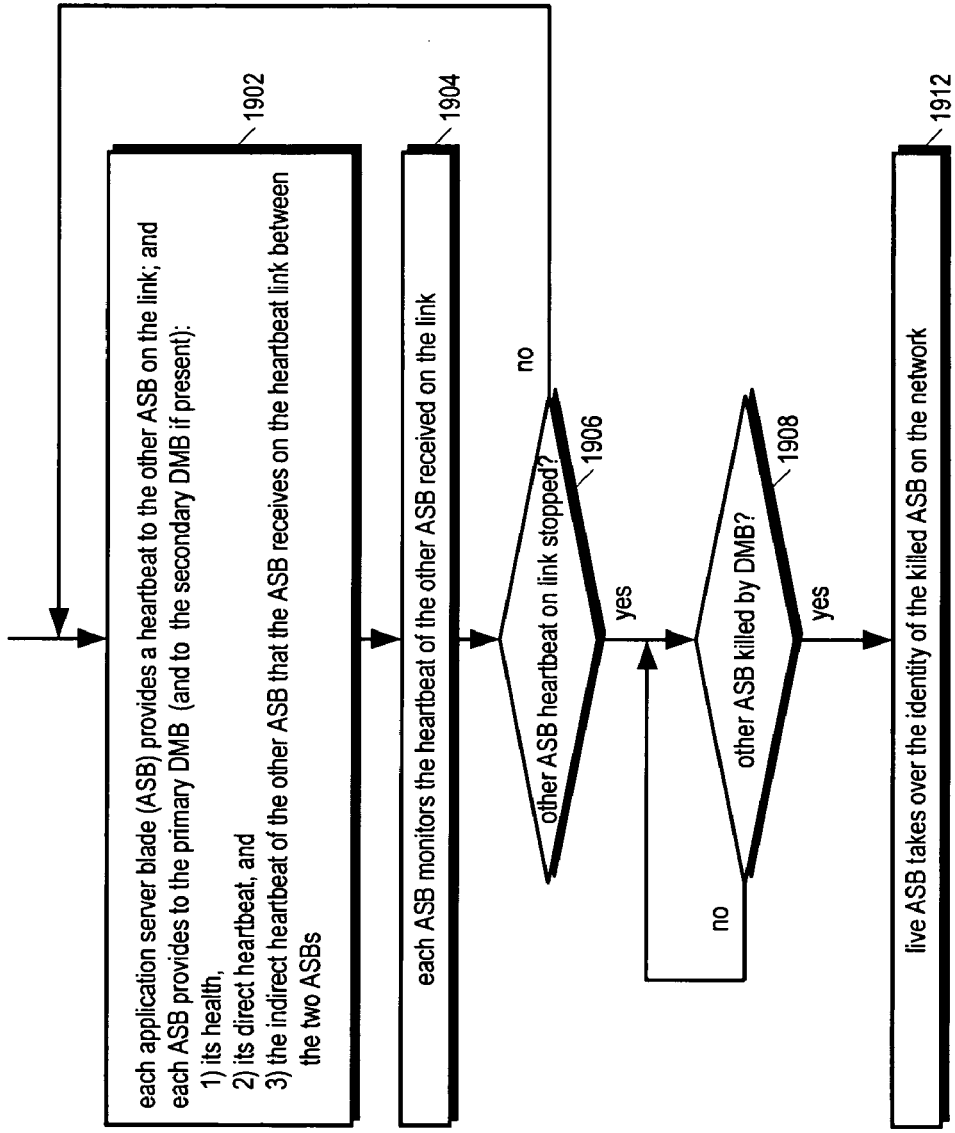
FIG. 19 is a flowchart illustrating fault-tolerant active-active failover of the application server blades of the storage appliance of FIG. 17.

Referring now to FIG. 19, a flowchart illustrating fault-tolerant active-active failover of the application server blades 402 of the storage appliance 202 of FIG. 17 is shown. Flow begins at block 1902.

At block 1902, application server blade A 402A provides it's A-to-B link heartbeat 1744 to application server blade B 402B, and application server blade B 402B provides it's B-to-A link heartbeat 1724 to application server blade A 402A of FIG. 17. Additionally, application server blade A 402A provides health-A 1722, indirect heartbeat B-to-A 1724, and direct heartbeat-A 1726 to the data manager blades 406, and application server blade B 402B provides health-B 1732, indirect heartbeat A-to-B 1734, and direct heartbeat-B 1736 to the data manager blades 406. In one embodiment, the frequency with which the application server blades 402 provide their health 1722/1732 may be different from the frequency with which the direct heartbeat 1726/1736 and/or link heartbeats 1742/1744 are provided. Flow proceeds to block 1904.

At block 1904, application server blade A 402A monitors the B-to-A link heartbeat 1742 and application server blade B 402B monitors the A-to-B link heartbeat 1744. Flow proceeds to decision block 1906.

At decision block 1906, each application server blade 402 determines whether the other application server blade 402 link heartbeat 1742/1744 has stopped. If so, flow proceeds to decision block 1908; otherwise, flow returns to block 1902.

At decision block 1908, each application server blade 402 examines the relevant kill signals 1712-1718 to determine whether the primary data manager blade 406 has killed the other application server blade 402. If so, flow proceeds to block 1912; otherwise, flow returns to decision block 1908.

At block 1912, the live application server blade 402 takes over the identity of the killed application server blade 402 on the network 114. In various embodiments, the live application server blade 402 takes over the identity of the killed application server blade 402 on the network 114 by assuming the MAC address, IP address, and/or world wide name of the corresponding killed application server blade 402 I/O ports. The I/O ports may include, but are not limited to, FibreChannel ports, Ethernet ports, and Infiniband ports. Flow ends at block 1912.

In an alternate embodiment, a portion of the I/O ports of each of the application server blades 402 are maintained in a passive state, while other of the I/O ports are active. When the primary data manager blade 406 kills one of the application server blades 402, one or more of the passive I/O ports of the live application server blade 402 take over the identity of the I/O ports of the killed application server blade 402 at block 1912.

As may be seen from FIG. 19, the storage appliance 202 advantageously deterministically performs active-active failover from the failed application server blade 402 to the live application server blade 402 by ensuring that the failed application server blade 402 is killed, i.e., inactive on the network 114, before the live application server blade 402 takes over the failed application server blade 402 identity, thereby avoiding data unavailability due to conflict of identity on the network.

Figure 20:
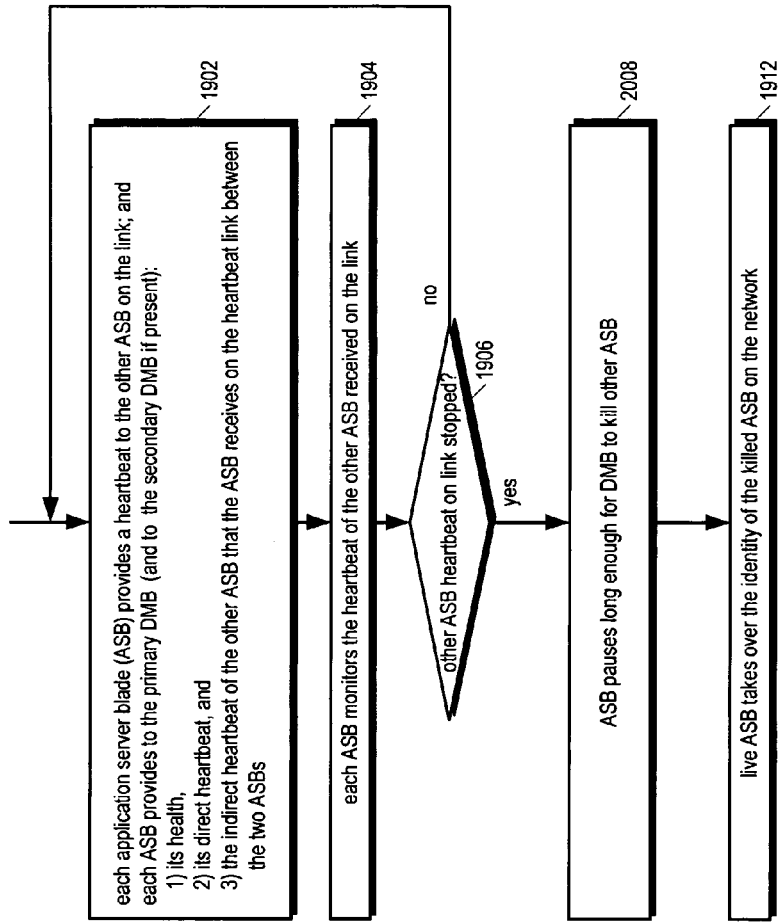
FIG. 20 is a flowchart illustrating fault-tolerant active-active failover of the application server blades of the storage appliance of FIG. 17 according to an alternate embodiment.

Referring now to FIG. 20, a flowchart illustrating fault-tolerant active-active failover of the application server blades 402 of the storage appliance 202 of FIG. 17 according to an alternate embodiment is shown. FIG. 20 is identical to FIG. 19, and like-numbered blocks are alike, except that block 2008 replaces decision block 1908. That is, if at decision block 1906 it is determined that the other application server blade 402 heartbeat stopped, then flow proceeds to block 2008 rather than decision block 1908; and flow unconditionally proceeds from block 2008 to block 1912.

At block 2008, the live application server blade 402 pauses long enough for the primary data manager blade 406 to kill the other application server blade 402. In one embodiment, the live application server blade 402 pauses a predetermined amount of time. In one embodiment, the predetermined amount of time is programmed into the application server blades 402 based on the maximum of the amount of time required by the primary data manager blade 406 to detect a failure of the link heartbeats 1742/1744 via the indirect heartbeats 1724/1734 and to subsequently kill an application server blade 402, or to detect an application server blade 402 failure via the direct heartbeats 1726/1736 and to subsequently kill the failed application server blade 402.

As may be seen from FIG. 20, the storage appliance 202 advantageously deterministically performs active-active failover from the failed application server blade 402 to the live application server blade 402 by ensuring that the failed application server blade 402 is killed, i.e., inactive on the network 114, before the live application server blade 402 takes over the failed application server blade 402 identity, thereby avoiding data unavailability due to conflict of identity on the network.

Referring now to FIG. 21, a block diagram illustrating the interconnection of the various storage appliance 202 blades via the BCI buses 718 of FIG. 7 is shown. FIG. 21 includes data manager blade A 406A, data manager blade B 406B, application server blade A 402A, application server blade B 402B, data gate blade A 408A, data gate blade B 408B, and backplane 412 of FIG. 4. Each application server blade 402 includes CPLD 712 of FIG. 7 coupled to CPU 802 of FIG. 8 and I/O interface controllers 732/742/744/746/748 via ISA bus 716 of FIG. 7. The CPLD 712 generates a reset signal 2102, which is coupled to the reset input of CPU 802 and I/O interface controllers 732/742/744/746/748, in response to predetermined control input received from a data manager blade 406 on one of the BCI buses 718 coupled to the CPLD 712. Each of the data manager blades 406 includes CPU 706 of FIG. 7 coupled to a CPLD 2104 via an ISA bus 2106. Each data gate blade 408 includes I/O interface controllers 1206/1208 of FIG. 12 coupled to a CPLD 2108 via an ISA bus 2112. The CPLD 2108 generates a reset signal 2114, which is coupled to the reset input of the I/O interface controllers 1206/1208, in response to predetermined control input received from a data manager blade 406 on one of the BCI buses 718 coupled to the CPLD 2108. The backplane 412 includes four BCI buses denoted BCI-A 718A, BCI-B 718B, BCI-C 718C, and BCI-D 718D. BCI-A 718A couples the CPLDs 712, 2104, and 2108 of data manager blade A 406A, application server blade A 402A, and data gate blade A 408A, respectively. BCI-B 718B couples the CPLDs 712, 2104, and 2108 of data manager blade A 406A, application server blade B 402B, and data gate blade B 408B, respectively. BCI-C 718C couples the CPLDs 712, 2104, and 2108 of data manager blade B 406B, application server blade A 402A, and data gate blade A 408A, respectively. BCI-D 718D couples the CPLDs 712, 2104, and 2108 of data manager blade B 406B, application server blade B 402B, and data gate blade B 408B, respectively.

In the embodiment of FIG. 21, the application server blade 402 CPUs 802 generate the health and heartbeat statuses 1722/1724/1726/1732/1734/1736 via CPLDs 712 on the BCI buses 718, which are received by the data manager blade 406 CPLDs 2104 and conveyed to the CPUs 706 via ISA buses 2106, thereby enabling the primary data manager blade 406 to deterministically distinguish a split brain condition from a true application server blade 402 failure. Similarly, the data manager blade 406 CPUs 706 generate the kill controls 1712/1714/1716/1718 via CPLDs 2104 on the BCI buses 718, which cause the application server blade 402 CPLDs 712 to generate the reset signals 2102 to reset the application server blades 402, thereby enabling a data manager blade 406 to deterministically inactivate an application server blade 402 so that the other application server blade 402 can take over its network identity, as described above. Advantageously, the apparatus of FIG. 21 does not require the application server blade 402 CPU 802 or I/O interface controllers 732/742/744/746/748 to be in a particular state or have a particular level of operational intelligence in order for the primary data manager blade 406 to inactivate them.

Figure 22:
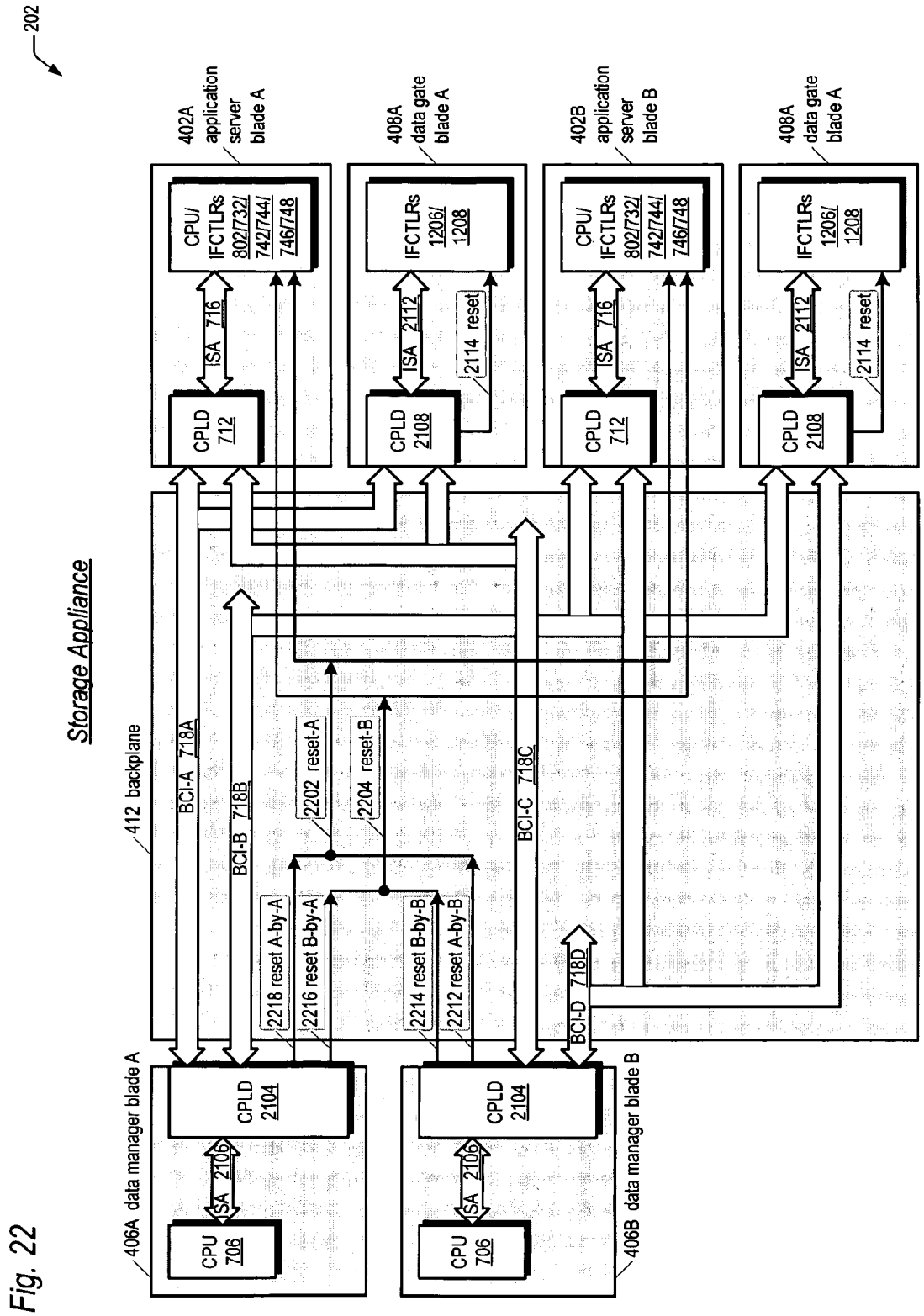
FIG. 22 is a block diagram illustrating the interconnection of the various storage appliance blades via the BCI buses of FIG. 7 and discrete reset signals according to an alternate embodiment.

Referring now to FIG. 22, a block diagram illustrating the interconnection of the various storage appliance 202 blades via the BCI buses 718 of FIG. 7 and discrete reset signals according to an alternate embodiment is shown. FIG. 22 is identical to FIG. 21, and like-numbered elements are alike, except that reset signals 2102 of FIG. 21 are not present in FIG. 22. Instead, a reset-A signal 2202 is provided from the backplane 412 directly to the reset inputs of the application server blade A 402A CPU 802 and I/O interface controllers 732/742/744/746/748, and a reset-B signal 2204 is provided from the backplane 412 directly to the reset inputs of the application server blade B 402B CPU 802 and I/O interface controllers 732/742/744/746/748. Application server blade A 402A CPU 802 also receives the reset-B signal 2204 as a status indicator, and application server blade B 402B CPU 802 also receives the reset-A signal 2202 as a status indicator. Data manager blade A 406A generates a reset A-by-A signal 2218 to reset application server blade A 402A and generates a reset B-by-A signal 2216 to reset application server blade B 402B. Data manager blade B 406B generates a reset B-by-B signal 2214 to reset application server blade B 402B and generates a reset A-by-B signal 2212 to reset application server blade A 402A. The reset-A signal 2202 is the logical OR of the reset A-by-A signal 2218 and the reset A-by-B signal 2212. The reset-B signal 2204 is the logical OR of the reset B-by-B signal 2214 and the reset B-by-A signal 2216.

In the embodiment of FIG. 22, the application server blade 402 CPUs 802 generate the health and heartbeat statuses 1722/1724/1726/1732/1734/1736 via CPLDs 712 on the BCI buses 718 which are received by the data manager blade 406 CPLDs 2104 and conveyed to the CPUs 706 via ISA buses 2106, thereby enabling the primary data manager blade 406 to deterministically distinguish a split brain condition from a true application server blade 402 failure. Similarly, the data manager blade 406 CPUs 706 generate the reset signals 2212/2214/2216/2218 via CPLDs 2104, which reset the application server blades 402, thereby enabling a data manager blade 406 to deterministically inactivate an application server blade 402 so that the other application server blade 402 can take over its network identity, as described above. Advantageously, the apparatus of FIG. 22 does not require the application server blade 402 CPU 802 or I/O interface controllers 732/742/744/746/748 to be in a particular state or having a particular level of operational intelligence in order for the primary data manager blade 406 to inactivate them.

Figure 23:
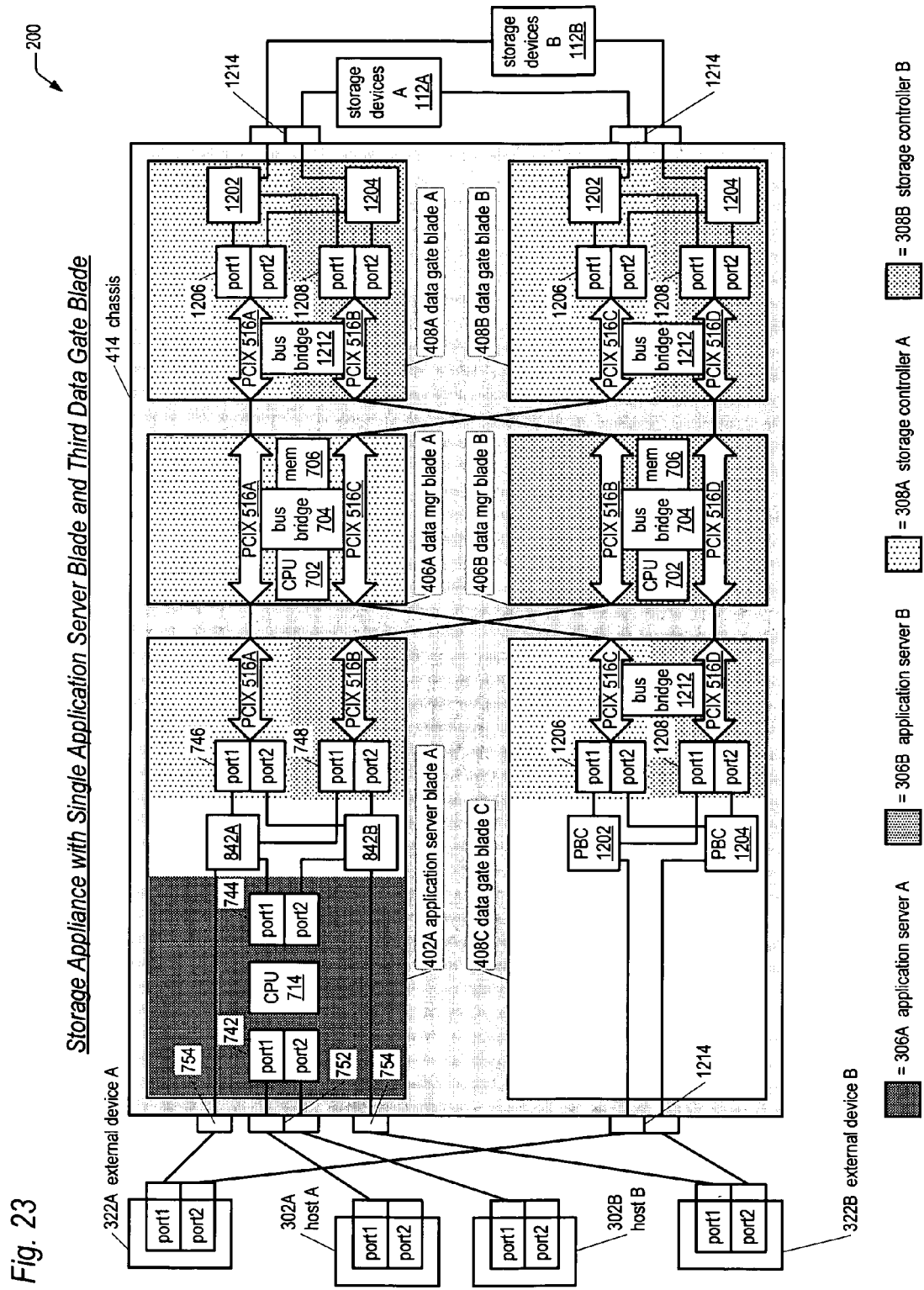
FIG. 23 is a block diagram illustrating an embodiment of the storage appliance of FIG. 2 comprising a single application server blade.

Referring now to FIG. 23, a block diagram illustrating an embodiment of the storage appliance 202 of FIG. 2 comprising a single application server blade 402 is shown. Advantageously, the storage appliance 202 embodiment of FIG. 23 may be lower cost than the redundant application server blade 402 storage appliance 202 embodiment of FIG. 12. FIG. 23 is similar to FIG. 12 and like-numbered elements are alike. However, the storage appliance 202 of FIG. 23 does not include application server blade B 402B. Instead, the storage appliance 202 of FIG. 23 includes a third data gate blade 408 similar to data gate blade B 408B, denoted data gate blade C 408C, in the chassis 414 slot occupied by application server blade B 402B in the storage appliance 202 of FIG. 12. The data gate blade C 408C first interface controller 1206 is logically a portion of storage controller A 308A, and the second interface controller 1208 is logically a portion of storage controller B 308B, as shown by the shaded portions of data gate blade C 408C. In one embodiment not shown, data gate blade C 408C comprises four I/O port connectors 1214 rather than two.

Data manager blade A 406A communicates with the data gate blade C 408C first interface controller 1206 via PCIX bus 516C, and data manager blade B 406B communicates with the data gate blade C 408C second interface controller 1208 via PCIX bus 516D. Port2 of external device A 322A is coupled to the data gate blade C 408C I/O connector 1214 coupled to port combiner 1202, and port2 of external device B 322B is coupled to the data gate blade C 408C I/O connector 1214 coupled to port combiner 1204, thereby enabling the external devices 322 to have redundant direct connections to the storage controllers 308, and in particular, redundant paths to each of the data manager blades 406 via the redundant interface controllers 746/748/1206/1208. The data manager blades 406 program the data gate blade C 408C interface controllers 1206/1208 as target devices to receive commands from the external devices 322.

In one embodiment, if application server blade A 402A fails, the data manager blades 406 program the data gate blade C 408C interface controller 1206/1208 ports to take over the identities of the application server blade A 402A third/fourth interface controller 746/748 ports. Conversely, if data gate blade C 408C fails, the data manager blades 406 program the application server blade A 402A third/fourth interface controller 746/748 ports to take over the identities of the data gate blade C 408C interface controller 1206/1208 ports. The embodiment of FIG. 23 may be particularly advantageous for out-of-band server applications, such as a data backup or data snapshot application, in which server fault-tolerance is not as crucial as in other applications, but where high data availability to the storage devices 112 by the external devices 322 is crucial.

Figure 24:
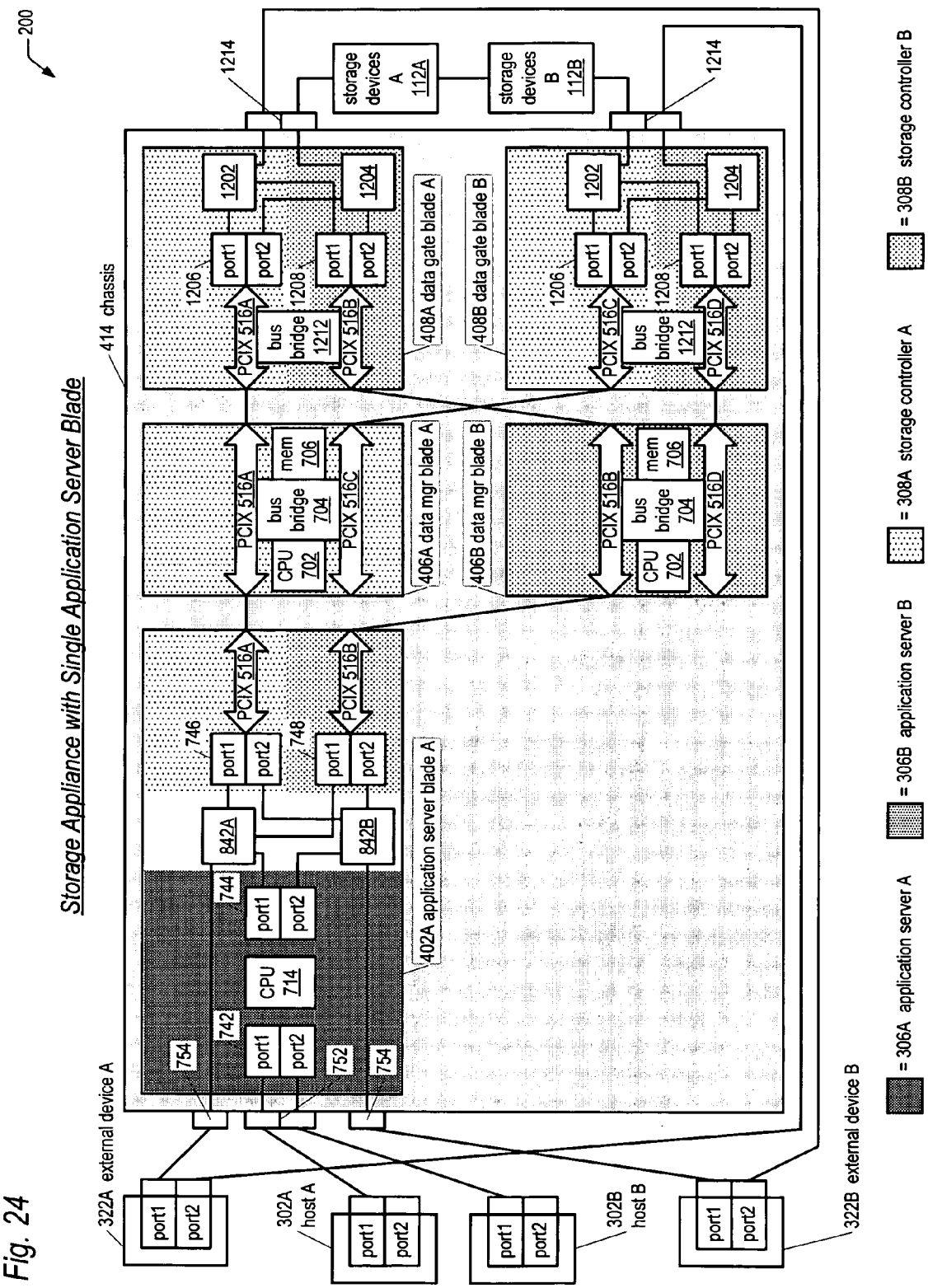
FIG. 24 is a block diagram illustrating an embodiment of the storage appliance of FIG. 2 comprising a single application server blade.

Referring now to FIG. 24, a block diagram illustrating an embodiment of the storage appliance 202 of FIG. 2 comprising a single application server blade 402 is shown. Advantageously, the storage appliance 202 embodiment of FIG. 24 may be lower cost than the redundant application server blade 402 storage appliance 202 embodiment of FIG. 12 or then the single server embodiment of FIG. 23. FIG. 24 is similar to FIG. 12 and like-numbered elements are alike. However, the storage appliance 202 of FIG. 24 does not include application server blade B 402B. Instead, the storage devices A 112A and storage devices B 112B are all coupled on the same dual loops, thereby leaving the other data gate blade 408 I/O connectors 1214 available for connecting to the external devices 322. That is, port2 of external device A 322A is coupled to one I/O connector 1214 of data gate blade B 408B, and port2 of external device B 322B is coupled to one I/O connector 1214 of data gate blade A 408A, thereby enabling the external devices 322 to have redundant direct connections to the storage controllers 308, and in particular, redundant paths to each of the data manager blades 406 via the redundant interface controllers 746/748/1206/1208. The data manager blades 406 program the data gate blade 408 interface controllers 1206/1208 as target devices to receive commands from the external devices 322.

In one embodiment, if application server blade A 402A fails, the data manager blades 406 program port1 of the data gate blade A 408A interface controllers 1206/1208 to take over the identities of port1 of the application server blade A 402A third/fourth interface controllers 746/748, and the data manager blades 406 program port2 of the data gate blade B 408B interface controllers 1206/1208 to take over the identities of port2 of the application server blade A 402A third/fourth interface controllers 746/748. Additionally, if data gate blade A 408A fails, the data manager blades 406 program port2 of the application server blade A 402A third/fourth interface controllers 746/748 to take over the identities of port1 of the data gate blade A 408A interface controller 1206/1208 ports. Furthermore, if data gate blade B 408B fails, the data manager blades 406 program port1 of the application server blade A 402A third/fourth interface controllers 746/748 to take over the identities of port2 of the data gate blade B 408B interface controller 1206/1208 ports. As with FIG. 23, the embodiment of FIG. 24 may be particularly advantageous for out-of-band server applications, such as a data backup or data snapshot application, in which server fault-tolerance is not as crucial as in other applications, but where high data availability to the storage devices 112 by the external devices 322 is crucial.

I/O interfaces typically impose a limit on the number of storage devices that may be connected on an interface. For example, the number of FC devices that may be connected on a single FC arbitrated loop is 127. Hence, in the embodiment of FIG. 24, a potential disadvantage of placing all the storage devices 112 on the two arbitrated loops rather than four arbitrated loops as in FIG. 23 is that potentially half the number of storage devices may be coupled to the storage appliance 202. Another potential disadvantage is that the storage devices 112 must share the bandwidth of two arbitrated loops rather than the bandwidth of four arbitrated loops. However, the embodiment of FIG. 24 has the potential advantage of being lower cost than the embodiments of FIG. 12 and/or FIG. 23.

Figure 25:
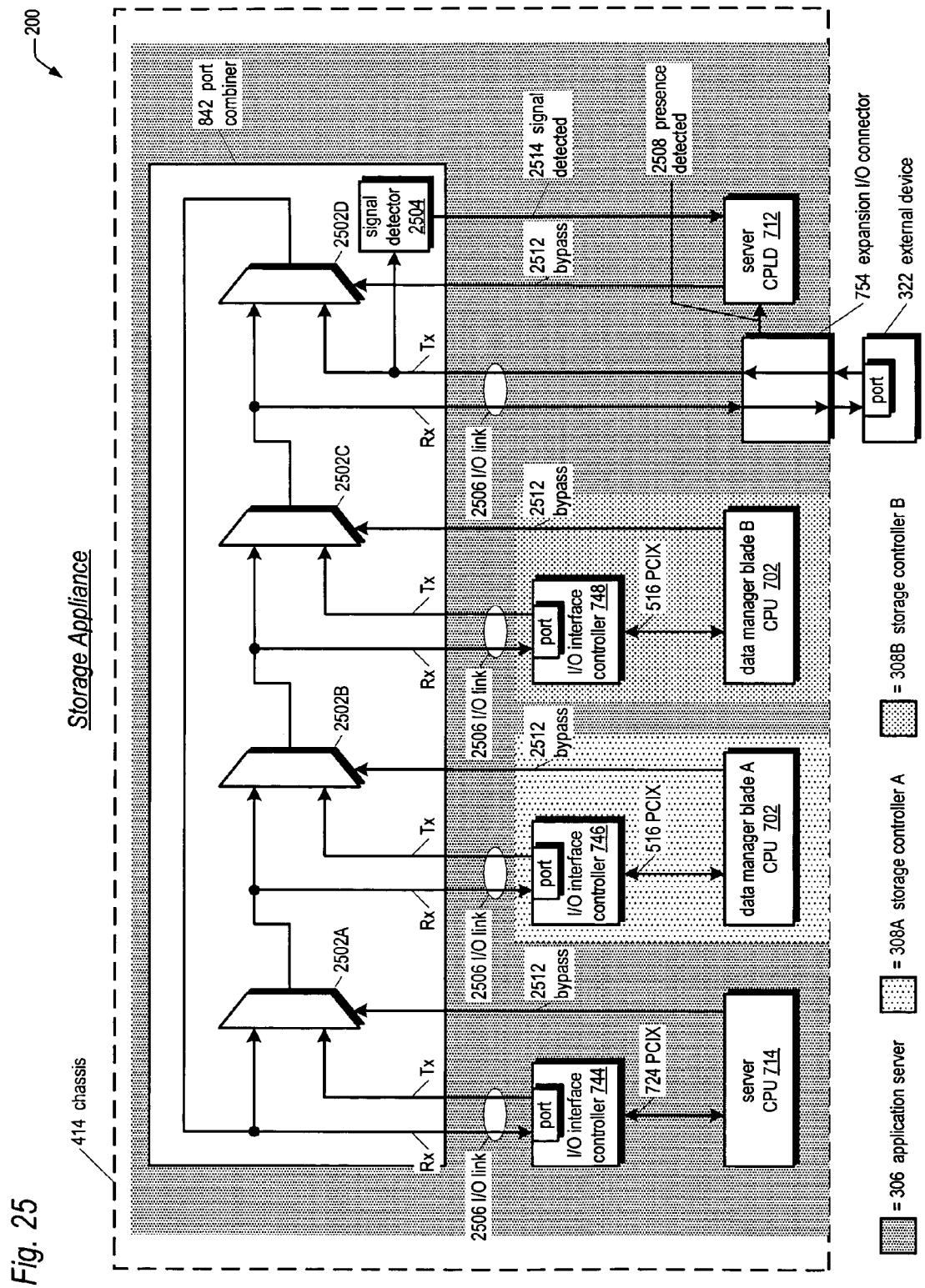
FIG. 25 is a block diagram illustrating the computer network of FIG. 2 and portions of the storage appliance of FIG. 12 and in detail one embodiment of the port combiner of FIG. 8.

Referring now to FIG. 25, a block diagram illustrating the computer network 200 of FIG. 2 and portions of the storage appliance 202 of FIG. 12 and in detail one embodiment of the port combiner 842 of FIG. 8 is shown. The storage appliance 202 includes the chassis 414 of FIG. 4 enclosing various elements of the storage appliance 202. The storage appliance 202 also illustrates one of the application server blade 402 expansion I/O connectors 754 of FIG. 7. FIG. 25 also includes an external device 322 of FIG. 3 external to the chassis 414 with one of its ports coupled to the expansion I/O connector 754. The expansion I/O connector 754 is coupled to the port combiner 842 by an I/O link 2506. The I/O link 2506 includes a transmit signal directed from the expansion I/O connector 754 to the port combiner 842, and a receive signal directed from the port combiner 842 to the expansion I/O connector 754.

The storage appliance 202 also includes the application server blade 402 CPU subsystem 714 coupled to an application server blade 402 second interface controller 744 via PCIX bus 724, the data manager blade A 406A CPU 702 coupled to the application server blade 402 third interface controller 746 via PCIX bus 516, and the data manager blade B 406B CPU 702 coupled to the application server blade 402 fourth interface controller 748 via PCIX bus 516, all of FIG. 7. The storage appliance 202 also includes the application server blade 402 CPLD 712 of FIG. 7. One port of each of the I/O interface controllers 744/746/748 is coupled to the port combiner 842 by a respective I/O link 2506.

In the embodiment of FIG. 25, the port combiner 842 comprises a FibreChannel arbitrated loop hub. The arbitrated loop hub includes four FC port bypass circuits (PBCs), or loop resiliency circuits (LRCs), denoted 2502A, 2502B, 2502C, 2502D. Each LRC 2502 includes a 2-input multiplexer. The four multiplexers are coupled in a serial loop. That is, the output of multiplexer 2502A is coupled to one input of multiplexer 2502B, the output of multiplexer 2502B is coupled to one input of multiplexer 2502C, the output of multiplexer 2502C is coupled to one input of multiplexer 2502D, and the output of multiplexer 2502D is coupled to one input of multiplexer 2502A. The second input of multiplexer 2502A is coupled to receive the transmit signal of the I/O link 2506 coupled to the second interface controller 744 port; the second input of multiplexer 2502B is coupled to receive the transmit signal of the I/O link 2506 coupled to the third interface controller 746 port; the second input of multiplexer 2502C is coupled to receive the transmit signal of the I/O link 2506 coupled to the fourth interface controller 748 port; and the second input of multiplexer 2502D is coupled to receive the transmit signal of the I/O link 2506 coupled to the expansion I/O connector 754. The output of multiplexer 2502D is provided as the receive signal of the I/O link 2506 to the second I/O interface controller port 744; the output of multiplexer 2502A is provided as the receive signal of the I/O link 2506 to the third I/O interface controller port 746; the output of multiplexer 2502B is provided as the receive signal of the I/O link 2506 to the fourth I/O interface controller port 748; the output of multiplexer 2502C is provided as the receive signal of the I/O link 2506 to the expansion I/O connector 754.

Each multiplexer 2502 also receives a bypass control input 2512 that selects which of the two inputs will be provided on the output of the multiplexer 2502. The application server blade 402 CPU subsystem 714 provides the bypass control 2512 to multiplexer 2502A; the data manager blade A 406A CPU 702 provides the bypass control 2512 to multiplexer 2502B; the data manager blade B 406B CPU 702 provides the bypass control 2512 to multiplexer 2502C; and the application server blade 402 CPLD 712 provides the bypass control 2512 to multiplexer 2502D. A value is generated on the respective bypass signal 2512 to cause the respective multiplexer 2502 to select the output of the previous multiplexer 2502, i.e., to bypass its respective interface controller 744/746/748 I/O port, if the I/O port is not operational; otherwise, a value is generated on the bypass signal 2512 to cause the multiplexer 2502 to select the input receiving the respective I/O link 2506 transmit signal, i.e., to enable the respective I/O port on the arbitrated loop. In particular, at initialization time, the application server blade 402 CPU 714, data manager blade A 406A CPU 702, and data manager blade B 406B CPU 702 each diagnose their respective I/O interface controller 744/746/748 to determine whether the respective I/O port is operational and responsively control the bypass signal 2512 accordingly. Furthermore, if at any time during operation of the storage appliance 202 the CPU 714/702/702 determines the I/O port is not operational, the CPU 714/702/702 generates a value on the bypass signal 2512 to bypass the I/O port.

With respect to multiplexer 2502D, the CPLD 712 receives a presence detected signal 2508 from the expansion I/O connector 754 to determine whether an I/O link, such as a FC cable, is plugged into the expansion I/O connector 754. The port combiner 842 also includes a signal detector 2504 coupled to receive the transmit signal of the I/O link 2506 coupled to the expansion I/O connector 754. The signal detector 2504 samples the transmit signal and generates a true value if a valid signal is detected thereon. The CPLD 712 generates a value on its bypass signal 2512 to cause multiplexer 2502D to select the output of multiplexer 2502C, (i.e., to bypass the expansion I/O connector 754, and consequently to bypass the I/O port in the external device 322 that may be connected to the expansion I/O connector 754), if either the presence detected signal 2508 or signal detected signal 2514 are false; otherwise, the CPLD 712 generates a value on its bypass signal 2512 to cause multiplexer 2502D to select the input receiving the transmit signal of the I/O link 2506 coupled to the expansion I/O connector 754 (i.e., to enable the external device 322 I/O port on the FC arbitrated loop). In one embodiment, the CPLD 712 generates the bypass signal 2512 in response to the application server blade 402 CPU 702 writing a control value to the CPLD 712.

Although FIG. 25 describes an embodiment in which the port combiner 842 of FIG. 8 is a FibreChannel hub, other embodiments are contemplated. The port combiner 842 may include, but is not limited to, a FC switch or hub, an Infiniband switch or hub, or an Ethernet switch or hub.

The I/O links 304 advantageously enable redundant application servers 306 to be coupled to architecturally host-independent, or stand-alone, redundant storage controllers 308. As may be observed from FIG. 25 and various of the other Figures, the port combiner 842 advantageously enables the I/O links 304 between the application servers 306 and storage controllers 308 to be externalized beyond the chassis 414 to external devices 322. This advantageously enables the integrated application servers 306 to access the external devices 322 and enables the external devices 322 to directly access the storage controllers 308.

Although embodiments have been described in which the I/O links 304 between the second I/O interface controller 744 and the third and fourth I/O interface controllers 746/748 is FibreChannel, other interfaces may be employed. For example, a high-speed Ethernet or Infiniband interface may be employed. If the second interface controller 744 is an interface controller that already has a device driver for the operating system or systems to be run on the application server blade 402, then an advantage is gained in terms of reduced software development. Device drivers for the QLogic ISP2312 have already been developed for many popular operating systems, for example. This advantageously reduces software development time for employment of the application server blade 402 embodiment described. Also, it is advantageous to select a link type between the second interface controller 744 and the third and fourth interface controllers 746/748 which supports protocols that are frequently used by storage application software to communicate with external storage controllers, such as Fibre-Channel, Ethernet, or Infiniband since they support the SCSI protocol and the internet protocol (IP), for example. A link type should be selected which provides the bandwidth needed to transfer data according to the rate requirements of the application for which the storage appliance 202 is sought to be used.

Similarly, although embodiments have been described in which the local buses 516 between the various blades of storage appliance 202 is PCIX, other local buses may be employed, such as PCI, CompactPCI, PCI-Express, PCI-X2 bus, EISA bus, VESA bus, Futurebus, VME bus, MultiBus, RapidIO bus, AGP bus, ISA bus, 3GIO bus, HyperTransport bus, or any similar local bus capable of transferring data at a high rate. For example, if the storage appliance 202 is to be used as a streaming video or audio storage appliance, then the sustainable data rate requirements may be very high, requiring a very high data bandwidth link between the controllers 744 and 746/748 and very high data bandwidth local buses. In other applications lower bandwidth I/O links and local buses may suffice. Also, it is advantageous to select third and fourth interface controllers 746/748 for which storage controller 308 firmware has already been developed, such as the JNIC-1560, in order to reduce software development time.

Although embodiments have been described in which the application server blades 402 execute middleware, or storage application software, typically associated with intermediate storage application server boxes, which have now been described as integrated into the storage appliance 202 as application servers 306, it should be understood that the servers 306 are not limited to executing middleware. Embodiments are contemplated in which some of the functions of the traditional servers 104 may also be integrated into the network storage appliance 202 and executed by the application server blade 402 described herein, particularly for applications in which the hardware capabilities of the application server blade 402 are sufficient to support the traditional server 104 application. That is, although embodiments have been described in which storage application servers are integrated into the network storage appliance chassis 414, it is understood that the software applications traditionally executed on the traditional application servers 104 may also be migrated to the application server blades 402 in the network storage appliance 202 chassis 414 and executed thereon.

Although the present invention and its objects, features and advantages have been described in detail, other embodiments are encompassed by the invention. For example, although embodiments have been described employing dual channel I/O interface controllers, other embodiments are contemplated using single channel interface controllers. Additionally, although embodiments have been described in which the redundant blades of the storage appliance are duplicate redundant blades, other embodiments are contemplated in which the redundant blades are triplicate redundant or greater. Furthermore, although active-active failover embodiments have been described, active-passive embodiments are also contemplated.

Also, although the present invention and its objects, features and advantages have been described in detail, other embodiments are encompassed by the invention. In addition to implementations of the invention using hardware, the invention can be implemented in computer readable code (e.g., computer readable program code, data, etc.) embodied in a computer usable (e.g., readable) medium. The computer code causes the enablement of the functions or fabrication or both of the invention disclosed herein. For example, this can be accomplished through the use of general programming languages (e.g., C, C++, JAVA, and the like); GDSII databases; hardware description languages (HDL) including Verilog HDL, VHDL, Altera HDL (AHDL), and so on; or other programming and/or circuit (i.e., schematic) capture tools available in the art. The computer code can be disposed in any known computer usable (e.g., readable) medium including semiconductor memory, magnetic disk, optical disk (e.g., CD-ROM, DVD-ROM, and the like), and as a computer data signal embodied in a computer usable (e.g., readable) transmission medium (e.g., carrier wave or any other medium including digital, optical or analog-based medium). As such, the computer code can be transmitted over communication networks, including Internets and intranets. It is understood that the invention can be embodied in computer code and transformed to hardware as part of the production of integrated circuits. Also, the invention may be embodied as a combination of hardware and computer code.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A server blade, comprising:
   a computer, having an input/output (I/O) port; and
   an I/O interface controller, comprising:
      an I/O port coupled via an I/O link to said I/O port of said computer, for transferring data therewith; and
      a local bus interface, for interfacing to a local bus;
   wherein the server blade comprises a field replaceable unit (FRU) including said computer and said I/O interface controller, configured to plug into a backplane comprising said local bus, thereby enabling data transfers with other FRUs coupled to said backplane;
   wherein said I/O interface controller comprises a portion of a storage controller whose remaining portions are comprised in said other FRUs coupled to said backplane;
   wherein said I/O interface controller is programmable via said local bus by a microprocessor of said storage controller to perform data transfers between said computer and storage devices controlled by said storage controller, wherein at least one of said other FRUs comprises said microprocessor.

2. The server blade of claim 1, wherein said storage controller comprises a redundant array of inexpensive disks (RAID) controller.

3. The server blade of claim 1, wherein said I/O ports are capable of transferring at least approximately 40 Megabytes (MB) of data per second.

4. The server blade of claim 1, wherein said I/O ports comprise FibreChannel ports.

5. The server blade of claim 1, wherein said I/O ports comprise Ethernet ports.

6. The server blade of claim 1, wherein said I/O ports comprise ports conforming to the InfiniBand Architecture Specification Release 1.0.a of Jun. 19, 2001.

7. The server blade of claim 1, wherein said I/O ports comprise SCSI ports.

8. The server blade of claim 1, wherein said local bus comprises a PCI-X bus.

9. The server blade of claim 1, wherein said local bus comprises a PCI bus.

10. The server blade of claim 1, wherein said local bus comprises a PCI-Express bus.

11. The server blade of claim 1, wherein said local bus comprises a VME bus.

12. The server blade of claim 1, wherein said local bus comprises a bus conforming to the HyperTransport I/O Link Specification Revision 1.03 of Oct. 10, 2001.

13. The server blade of claim 1, wherein said local bus comprises a bus conforming to the RapidIO Interconnect Specification Rev. 1.2 of June 2002.

14. The server blade of claim 1, further comprising:
   a second I/O interface controller, comprising:
      an I/O port coupled to said I/O port of said computer, for communication therewith; and
      a local bus interface, for interfacing to a second local bus comprised in said backplane;
   whereby said first and second I/O interface controllers enable data transfers with redundant FRUs coupled to said backplane via said first and second local buses.

15. The server blade of claim 14, wherein said second I/O interface controller I/O port is coupled to a second I/O port of said computer.

16. The server blade of claim 1, further comprising:
   a port combiner, coupled to said computer I/O port and said I/O interface controller I/O port, for enabling data transfers therebetween;
   a second interface controller, comprising:
      an I/O port coupled to said port combiner, for communication with said computer I/O port; and
      a local bus interface, for interfacing to a second local bus comprised in said backplane;
   whereby said first and second I/O interface controllers enable data transfers with redundant FRUs coupled to said backplane via said first and second local buses.

17. The server blade of claim 1, wherein said computer comprises:
   a network interface, for interfacing the server blade with host computers via a network.

18. The server blade of claim 1, wherein said I/O link is etched in a printed circuit board comprising the server blade FRU.

19. The server blade of claim 1, wherein the server blade is hot-pluggable into said backplane.

20. The server blade of claim 1, wherein said computer comprises:
   a non-volatile memory, for storing an operating system.

21. The server blade of claim 20, wherein said non-volatile memory comprises a solid state memory.

22. The server blade of claim 21, wherein said solid state memory comprises a single chip, solid-state Flash memory providing a disk drive interface.

23. The server blade of claim 20, wherein said non-volatile memory comprises a 1-inch hard disk drive.

24. The server blade of claim 20, wherein said operating system comprises an operating system compiled from a version of an open source operating system.

25. The server blade of claim 1, wherein said computer comprises:
   a non-volatile memory, for storing storage application software.

26. The server blade of claim 25, wherein said storage application software comprises a data backup application.

27. The server blade of claim 25, wherein said storage application software comprises a remote mirroring application.

28. The server blade of claim 25, wherein said storage application software comprises a data snapshot application.

29. The server blade of claim 25, wherein said storage application software comprises a storage virtualization application.

30. The server blade of claim 25, wherein said storage application software comprises a file server application.

31. The server blade of claim 1, wherein said computer comprises a diskless PC.

32. The server blade of claim 1, wherein said computer comprises a central processing unit and a plurality of peripherals, wherein said plurality of peripherals conform to the peripherals of a personal computer.

33. The server blade of claim 1, wherein said computer comprises a central processing unit and a plurality of peripherals, wherein said plurality of peripherals are mapped into an address space of said central processing unit conforming to the peripheral mappings of a personal computer.

34. The server blade of claim 1, further comprising:
 a port combiner, for coupling said computer I/O port and said I/O controller I/O port.

35. The server blade of claim 34, wherein said port combiner comprises a FibreChannel hub.

\* \* \* \* \*